US012738542B2

(12) United States Patent
Matsuoka et al.

(10) Patent No.: US 12,738,542 B2
(45) Date of Patent: Sep. 15, 2026

(54) NONAQUEOUS ELECTROLYTE SOLUTION AND NONAQUEOUS SECONDARY BATTERY

(71) Applicant: Asahi Kasei Kabushiki Kaisha, Tokyo (JP)

(72) Inventors: Naoki Matsuoka, Tokyo (JP); Makoto Ito, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 444 days.

(21) Appl. No.: 18/283,563

(22) PCT Filed: Mar. 25, 2022

(86) PCT No.: PCT/JP2022/014640

§ 371 (c)(1), (2) Date: Sep. 22, 2023

(87) PCT Pub. No.: WO2022/203072

PCT Pub. Date: Sep. 29, 2022

(65) Prior Publication Data

US 2024/0178452 A1 May 30, 2024

(30) Foreign Application Priority Data

Mar. 26, 2021 (JP) ................................ 2021-053663
Mar. 30, 2021 (JP) ................................ 2021-057976
(Continued)

(51) Int. Cl.
*H01M 10/0568* (2010.01)
*H01M 4/505* (2010.01)
(Continued)

(52) U.S. Cl.
CPC ....... *H01M 10/0568* (2013.01); *H01M 4/505* (2013.01); *H01M 4/525* (2013.01);
(Continued)

(58) Field of Classification Search
CPC ......... H01M 10/0568; H01M 10/0567; H01M 10/0569; H01M 4/505; H01M 4/525; H01M 2300/0028
See application file for complete search history.

(56) References Cited

U.S. PATENT DOCUMENTS

2010/0316908 A1 12/2010 Yoshimura et al.
2011/0020700 A1 1/2011 Iwaya
(Continued)

FOREIGN PATENT DOCUMENTS

JP H11-512563 A 10/1999
JP 2007-172990 A 7/2007
(Continued)

OTHER PUBLICATIONS

Supplementary European Search Report issued in European Patent Application No. 22775853.9 dated Mar. 28, 2025.
(Continued)

*Primary Examiner* — Jane J Rhee
(74) *Attorney, Agent, or Firm* — Morgan, Lewis & Bockius LLP

(57) ABSTRACT

The present invention provides a nonaqueous electrolyte solution which contains a nonaqueous solvent and a lithium salt, wherein: the nonaqueous solvent contains acetonitrile in an amount of 3% by volume to 97% by volume relative to the total amount of the nonaqueous solvent; the lithium salt contains a cyclic anion-containing lithium salt that is represented by formula (1) (wherein $R^f$ moieties may be the same as or different from each other, and each represents a fluorine atom or a perfluoro group having 4 or less carbon atoms); and the content of the cyclic anion-containing lithium salt that is represented by formula (1) is from 0.001 to 5 in terms of the molar ratio relative to the content of the acetonitrile.

15 Claims, 1 Drawing Sheet

(30) Foreign Application Priority Data

Mar. 30, 2021 (JP) ................................ 2021-058168
Mar. 30, 2021 (JP) ................................ 2021-058557

(51) Int. Cl.
*H01M 4/525* (2010.01)
*H01M 10/052* (2010.01)
*H01M 10/0567* (2010.01)
*H01M 10/0569* (2010.01)

(52) U.S. Cl.
CPC ..... *H01M 10/052* (2013.01); *H01M 10/0567* (2013.01); *H01M 10/0569* (2013.01); *H01M 2300/0028* (2013.01)

(56) References Cited

U.S. PATENT DOCUMENTS

| | | | |
|---|---|---|---|
| 2011/0300439 | A1 | 12/2011 | Iwaya |
| 2012/0214073 | A1 | 8/2012 | Iwaya et al. |
| 2013/0224535 | A1 | 8/2013 | Matsuoka et al. |
| 2014/0255796 | A1 | 9/2014 | Matsuoka et al. |
| 2015/0050563 | A1 | 2/2015 | Yamada et al. |
| 2017/0309960 | A1 | 10/2017 | Lim et al. |
| 2020/0091554 | A1 | 3/2020 | Matsuoka et al. |
| 2021/0344045 | A1 | 11/2021 | Shoji et al. |
| 2021/0344046 | A1 | 11/2021 | Matsuoka et al. |

FOREIGN PATENT DOCUMENTS

| | | | |
|---|---|---|---|
| JP | 2007-250191 | A | 9/2007 |
| JP | 2007-273394 | A | 10/2007 |
| JP | 2010-287431 | A | 12/2010 |
| WO | 97/11504 | A1 | 3/1997 |
| WO | 2009/133899 | A1 | 11/2009 |
| WO | 2010/110388 | A1 | 9/2010 |
| WO | 2011/052605 | A1 | 5/2011 |
| WO | 2012/057311 | A1 | 5/2012 |
| WO | 2013/062056 | A1 | 5/2013 |
| WO | 2013/146714 | A1 | 10/2013 |
| WO | 2018/169029 | A1 | 9/2018 |
| WO | 2020/054863 | A1 | 3/2020 |
| WO | 2020/262670 | A1 | 12/2020 |

OTHER PUBLICATIONS

International Search Report issued in corresponding International Patent Application No. PCT/JP2022/014640 dated Jun. 7, 2022.
Written Opinion issued in corresponding International Patent Application No. PCT/JP2022/014640 dated Jun. 7, 2022.
International Preliminary Report on Patentability issued in corresponding International Patent Application No. PCT/JP2022/014640 dated Sep. 12, 2023.
Krause et al., "Propylene carbonate-nitrile solvent blends for thermally stable gel polymer lithium ion battery electrolytes," Journal of Power Sources, 478(2020): 229047 (Oct. 15, 2020).

NONAQUEOUS ELECTROLYTE SOLUTION AND NONAQUEOUS SECONDARY BATTERY

TECHNICAL FIELD

The present invention relates to a non-aqueous electrolyte solution and a non-aqueous secondary battery.

BACKGROUND ART

Non-aqueous secondary batteries including lithium ion batteries are characterized by their light weight, high energy and long life, and have widely been used as power sources for various small electronic devices. In recent years, applications of non-aqueous electrolyte solutions have been widened to an industrial field typified by power tools such as electric tools, and in-vehicle use in electric cars and electric bicycles, and attention has also been focused on the field of a power storage field such as a residential power storage system.

As the non-aqueous electrolyte solution for lithium ion batteries, a combination of a high dielectric solvent such as a cyclic carbonate and a low viscosity solvent such as a chain carbonate is generally exemplified. In order to form a solid electrolyte interface (SEI) on a surface of a negative electrode to thereby suppress the reductive decomposition of the non-aqueous solvent, it is preferable to add an electrode protection additive such as vinylene carbonate.

In recent years, with the expansion of large-scale energy storage industry, especially in electric vehicles, there is a strong demand for higher energy density in non-aqueous secondary batteries. There has been proposed, as the non-aqueous solvent for lithium ion batteries, a nitrile-based solvent having an excellent balance between the viscosity and the dielectric constant as a high ion-conductive electrolyte solution. Of these, acetonitrile has high potential.

For example, PTL 1 describes that, when using an electrolyte solution in which lithium bis(trifluoromethanesulfonyl)imide represented by the formula $LiN(SO_2CF_3)_2$ is dissolved in acetonitrile so as to have the concentration of 4.2 mol/L, it is possible to carry out reversible lithium intercalation to and lithium deintercalation from the electrode.

PTL 2 discloses a non-aqueous secondary battery which operates with a high-capacity electrode by an electrolyte solution using acetonitrile as a non-aqueous solvent, and also discloses that SEI is enhanced by adding a plurality of electrode protection additives.

PTL 3 discloses that the use of a specific organolithium salt strengthens SEI and suppresses the decomposition of the electrolyte solution, thus providing excellent output characteristics.

PTL 4 discloses that a non-aqueous electrolyte solution containing acetonitrile and a lithium-containing imide salt can effectively suppress a decrease in ionic conductivity in a low temperature range to obtain excellent low-temperature characteristics.

PTL 5 discloses that high-temperature durability is improved by controlling the mixing ratio of a lithium salt in a non-aqueous electrolyte solution containing acetonitrile. More specifically, PTL 5 discloses a battery in which the corrosion of an aluminum (Al) current collector is avoided by controlling the content of $LiPF_6$ to 0.01 mol/L or more to generate hydrogen fluoride (HF) required for forming an aluminum passive state in a non-aqueous electrolyte solution containing acetonitrile, a lithium-containing imide salt and $LiPF_6$.

Meanwhile, studies are also being carried out to improve the battery performance by using a specific organolithium salt in the non-aqueous electrolyte solution.

For example, PTLs 6 and 7 disclose that it is possible to provide non-aqueous electrolyte solutions, which are free from a risk of electrode corrosion, and have both nonflammability and sufficient electrical conductivity for practical use, by combining a specific organolithium salt and an ether-based solvent.

PTL 8 discloses that it is possible to provide a non-aqueous electrolyte solution having both excellent nonflammability and cycle characteristics by combining a specific organolithium salt and an ether solvent.

CITATION LIST

Patent Literature

[PTL 1] WO 2013/146714 A
[PTL 2] WO 2013/062056 A
[PTL 3] WO 2012/057311 A
[PTL 4] WO 2018/169029 A
[PTL 5] WO 2020/262670 A
[PTL 6] WO 2009/133899 A
[PTL 7] WO 2010/110388 A
[PTL 8] WO 2011/052605 A

SUMMARY

Technical Problem

According to the techniques described in PTLs 1 to 4, lithium-ion batteries obtained using an acetonitrile-containing electrolyte solution are inferior in high-temperature durability to the existing lithium-ion batteries using an electrolyte solution containing a carbonate solvent.

The technique described in PTL 5 exhibits high-temperature durability which exceeds that of the existing electrolyte solutions in a long-term storage test at 85° C., but the recovery capacity retention rate after storage at 85° C. for 10 days is lower than that of the existing carbonate, and there is room for improvement.

The techniques described in PTLs 6 to 8 have not been evaluated for high-temperature durability.

As a result of disassembly analysis of the battery by the present inventors, they have found, as a new problem not described in PTLs 1 to 8, a phenomenon in which when the battery is stored for a long time in a high temperature environment, peeling points occur between a cathode current collector, and the electrical resistance increases at these peeling points, leading to deterioration of the high-temperature durability.

The present invention has been made in view of the above circumstances. An object of the present invention is to provide a non-aqueous electrolyte solution containing acetonitrile which can improve long-term high-temperature durability while exhibiting excellent output characteristics and low-temperature characteristics, and a non-aqueous secondary battery comprising the same.

Solution to Problem

As a result of intensive studies to solve the above problems, the present inventors have found that the above problems can be solved by using a non-aqueous electrolyte solution or non-aqueous secondary battery having the following configuration, and thus the present invention has been completed. Specifically, the present invention is as follows.

<1>

A non-aqueous electrolyte solution comprising a non-aqueous solvent and a lithium salt, wherein the non-aqueous solvent contains acetonitrile in an amount of 3% by volume or more and 97% by volume or less relative to the total amount of the non-aqueous solvent, and the lithium salt contains a cyclic anion-containing lithium salt represented by the following formula (1):

[Chemical Formula 1]

(1)

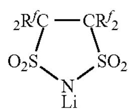

wherein $R^f$s may be the same or different and $R^f$ each represents a fluorine atom or a perfluoro group having 4 or less carbon atoms, and the content of the cyclic anion-containing lithium salt represented by the formula (1) is 0.001 or more and 5 or less, in terms of a molar ratio, relative to the content of the acetonitrile.

<2>

The non-aqueous electrolyte solution according to item 1, wherein the cyclic anion-containing lithium salt represented by the formula (1) contains one or more of cyclic anion-containing lithium salts represented by the following formulas (1-1) to (1-5).

[Chemical Formula 2]

(1-1)

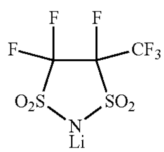

(1-2)

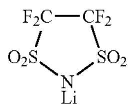

(1-3)

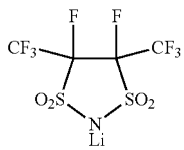

(1-4)

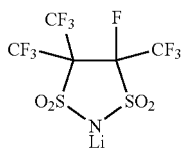

-continued (1-5)

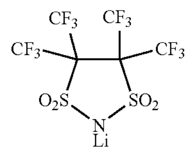

<3>

The non-aqueous electrolyte solution according to item 1 or 2, wherein the content of the cyclic anion-containing lithium salt represented by the formula (1) is 0.08 or more and 0.79 or less, in terms of a molar ratio, relative to the content of the acetonitrile.

<4>

The non-aqueous electrolyte solution according to any one of items 1 to 3, wherein the content of the acetonitrile is 10% by volume or more and 66% by volume or less relative to the total amount of the non-aqueous solvent.

<5>

The non-aqueous electrolyte solution according to any one of items 1 to 4, wherein the lithium salt further contains $LiPF_6$, and $LiPF_6$ and the cyclic anion-containing lithium salt represented by the formula (1) are contained at a molar concentration satisfying the relationship: $LiPF_6 \leq$ cyclic anion-containing lithium salt.

<6>

The non-aqueous electrolyte solution according to item 5, wherein the content of the cyclic anion-containing lithium salt represented by the formula (1) is more than 10, in terms of a molar ratio, relative to the content of $LiPF_6$.

<7>

The non-aqueous electrolyte solution according to item 5 or 6, wherein the content of $LiPF_6$ is less than 0.01 mol as the amount per 1 L of the non-aqueous solvent.

<8>

The non-aqueous electrolyte solution according to any one of items 5 to 7, wherein the content of the cyclic anion-containing lithium salt represented by the formula (1) is 150 or less, in terms of a molar ratio, relative to the content of $LiPF_6$.

<9>

The non-aqueous electrolyte solution according to any one of items 1 to 4, wherein the lithium salt does not contain $LiPF_6$.

<10>

The non-aqueous electrolyte solution according to any one of items 1 to 9, wherein the non-aqueous electrolyte solution further comprises a nitrogen-containing cyclic compound represented by the following formula (2):

[Chemical Formula 3]

(2)

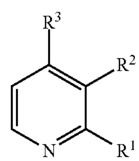

wherein substituents represented by $R^1$, $R^2$ and $R^3$ each independently represent a hydrogen atom, an alkyl group having 1 to 4 carbon atoms, a fluorine-substituted alkyl group having 1 to 4 carbon atoms, an alkoxy group having 1 to 4 carbon atoms, a fluorine-substituted alkoxy group having 1 to 4 carbon atoms, a phenyl group, a cyclohexyl group, a nitrile group, a nitro group, an amino group, an N,N'-dimethylamino group or an N,N'-diethylamino group, and two or more of these substituents are hydrogen atoms.

<11>

The non-aqueous electrolyte solution according to item 10, wherein the content of the nitrogen-containing cyclic compound represented by the formula (2) is 0.0001 or more and 3 or less, in terms of a molar ratio, relative to the content of the cyclic anion-containing lithium salt represented by the formula (1).

<12>

The non-aqueous electrolyte solution according to item 10 or 11, wherein the nitrogen-containing cyclic compound represented by the formula (2) is one or more compounds selected from the group consisting of pyridine and 4-(tert-butyl)pyridine.

<13>

The non-aqueous electrolyte solution according to any one of items 10 to 12, wherein the content of the nitrogen-containing cyclic compound represented by the formula (2) is 0.01% by weight or more and 10% by weight or less relative to the total amount of the non-aqueous electrolyte solution.

<14>

The non-aqueous electrolyte solution according to any one of items 1 to 13, wherein the non-aqueous electrolyte solution further comprises at least one silane-based compound selected from the group consisting of compounds represented by the following general formula (3):

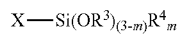

$$X—Si(OR^3)_{(3-m)}R^4_m \quad (3)$$

wherein $R^3$ and $R^4$ represent an alkyl group which may be substituted with an aryl group or an alkoxysilyl group or a halogen atom, or an aryl group which may be substituted with an alkyl group or an alkoxysilyl group or a halogen atom, and X represents at least one selected from the group consisting of groups represented by the following formula (L1):

[Chemical Formula 4]

(L1)

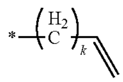

wherein k is an integer of 0 to 8, and * represents a bonding site to Si, the following formula (L2):

[Chemical Formula 5]

(L2)

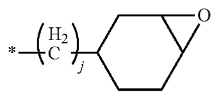

wherein j is an integer of 0 to 8, and * represents a bonding site to Si, the following formula (L3):

[Chemical Formula 6]

(L3)

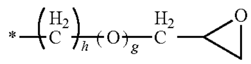

wherein h is an integer of 0 to 8, g is an integer of 0 or 1, and * represents a bonding site to Si and the following formula (L4):

[Chemical Formula 7]

(L4)

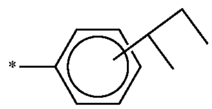

wherein * represents a bonding site to Si, and m is an integer of 0 to 2, the following general formula (4):

[Chemical Formula 8]

(4)

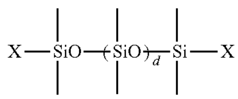

wherein X each independently represent at least one selected from the group consisting of groups represented by the formulas (L1) to (L4), and d is an integer of 0 to 10,000, the following general formula (5):

[Chemical Formula 9]

(5)

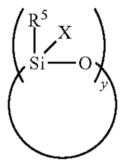

wherein $R^5$ each independently represent an alkyl group which may be substituted with an aryl group or a halogen atom, or an aryl group which may be substituted with an alkyl group or a halogen atom, y is an integer of 2 to 8, and X represents at least one selected from the group consisting of groups represented by the formulas (L1) to (L4), the following general formula (6):

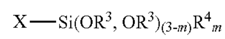

$$X—Si(OR^3, OR^3)_{(3-m)}R^4_m \quad (6)$$

wherein $R^3$, $R^4$, X and m are as defined in the general formula (3), and $R^{3'}$ is an aryl group, an alkoxysilyl group, or an alkylene group which may be substituted with a halogen atom, the following general formula (7):

[Chemical Formula 10]

(7)

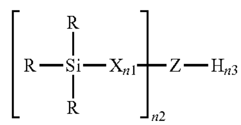

wherein, in the formula (7), R each independently represent a substituted or unsubstituted alkyl group having 1 to 20 carbon atoms, a substituted or unsubstituted alkenyl group having 2 to 20 carbon atoms, a substituted or unsubstituted alkynyl group having 2 to 20 carbon atoms, or a substituted or unsubstituted aryl group having 5 to 20 carbon atoms; X is O, S or NH; Z is P, P═O, B or Si; when Z is P or P═O, n1 is 1, n2 is an integer of 1 to 3, and n2+n3=3; when Z is B, n1 is 1, n2 is an integer of 1 to 3, and n2+n3=3; and when Z is Si, n1 is 0, n2 is an integer of 1 to 4, and n2+n3=4, and a polymer compound including a repeating unit represented by the following general formula (8):

[Chemical Formula 11]

(8)

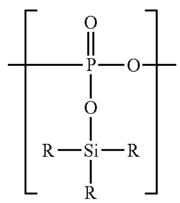

wherein R in the formula (8) has the same meaning as that of R in the formula (7), and diphenyldialkoxysilane.

<15>

The non-aqueous electrolyte solution according to item 14, wherein the content of the silane-based compound is 0.0001 or more and 1.5 or less, in terms of a molar ratio, relative to the content of the cyclic anion-containing lithium salt represented by the formula (1).

<16>

The non-aqueous electrolyte solution according to item 14 or 15, wherein the silane-based compound is at least one selected from the group consisting of triethoxyvinylsilane, tris(trimethylsilyl) phosphate, tris(trimethylsilyl)phosphite, tris(2,2,2-trifluoroethyl)phosphite, and diphenyldimethoxysilane.

<17>

The non-aqueous electrolyte solution according to any one of items 14 to 16, wherein the content of the silane-based compound is 0.01% by weight or more and 10% by weight or less relative to the total amount of the non-aqueous electrolyte solution.

<18>

A non-aqueous secondary battery comprising a positive electrode containing a positive electrode active material, a negative electrode containing a negative electrode active material, and the non-aqueous electrolyte solution according to any one of items 1 to 17.

<19>

The non-aqueous secondary battery according to item 18, wherein the positive electrode active material contains a lithium phosphorus metal oxide having an olivine crystal structure containing iron (Fe) atoms, regarding the non-aqueous electrolyte solution, the content of the cyclic anion-containing lithium salt represented by the formula (1) is 0.9 or more, in terms of a molar ratio, relative to the total content of the lithium salt, the lithium salt contains $LiPF_6$, the content of the cyclic anion-containing lithium salt represented by the formula (1) is 20 or more and 150 or less, in terms of a molar ratio, relative to the content of $LiPF_6$, the content of the cyclic anion-containing lithium salt represented by the formula (1) is 0.08 or more and 0.27 or less, in terms of a molar ratio, relative to the content of the acetonitrile, and the content of the acetonitrile is 30% by volume or more and 66% by volume or less relative to the total amount of the non-aqueous solvent.

<20>

The non-aqueous secondary battery according to item 18, wherein the positive electrode active material contains a lithium-containing metal oxide represented by the following general formula (a'):

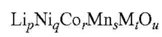

$$Li_pNi_qCo_rMn_sM_tO_u \quad (a')$$

wherein M is at least one metal selected from the group consisting of Al, Sn, In, Fe, V, Cu, Mg, Ti, Zn, Mo, Zr, Sr and Ba, and p, q, r, s, t and u are within the following ranges: $0<p<1.3$, $0<q<1.2$, $0<r<1.2$, $0\leq s<0.5$, $0\leq t<0.3$, $0.7\leq q+r+s+t\leq 1.2$ and $1.8<u<2.2$, and p is the value determined by the charging/discharging state of the battery, regarding the non-aqueous electrolyte solution, the lithium salt contains $LiPF_6$, the content of the cyclic anion-containing lithium salt represented by the formula (1) is 3 or more and 150 or less, in terms of a molar ratio, relative to the content of $LiPF_6$, the content of the cyclic anion-containing lithium salt represented by the formula (1) is 0.15 or more and 0.79 or less, in terms of a molar ratio, relative to the content of the acetonitrile, and the content of the acetonitrile is 10% by volume or more and 50% by volume or less relative to the total amount of the non-aqueous solvent.

<21>

The non-aqueous secondary battery according to any one of items 18 to 20, wherein the non-aqueous secondary battery comprises a battery exterior, and the battery exterior contains aluminum in at least a part of a liquid contact layer with the non-aqueous electrolyte solution on the positive electrode side.

<22>

The non-aqueous secondary battery according to any one of items 18 to 20, wherein at least a part of the contact portion with the non-aqueous electrolyte solution on the positive electrode side in the battery exterior body is made of iron or an iron alloy.

<23>

The non-aqueous secondary battery according to item 22, wherein the surface of the battery exterior body made of iron or an iron alloy is not coated.

<24>

The non-aqueous secondary battery according to item 22 or 23, wherein at least a part of the contact portion with the non-aqueous electrolyte solution on the positive electrode side in the battery exterior body is made of the iron alloy, and the iron alloy is stainless steel (SUS).

<25>

The non-aqueous secondary battery according to any one of items 22 to 24, wherein the potential of the positive electrode when fully charged is 5.1 V or less on a $Li/Li^+$ basis.

Advantageous Effects of Invention

According to the present invention, it is possible to provide a non-aqueous electrolyte solution in which long-term high-temperature durability is improved while exhibiting excellent output characteristics and low-temperature characteristics, and a non-aqueous secondary battery comprising the same.

DESCRIPTION OF EMBODIMENTS

Figure 1:
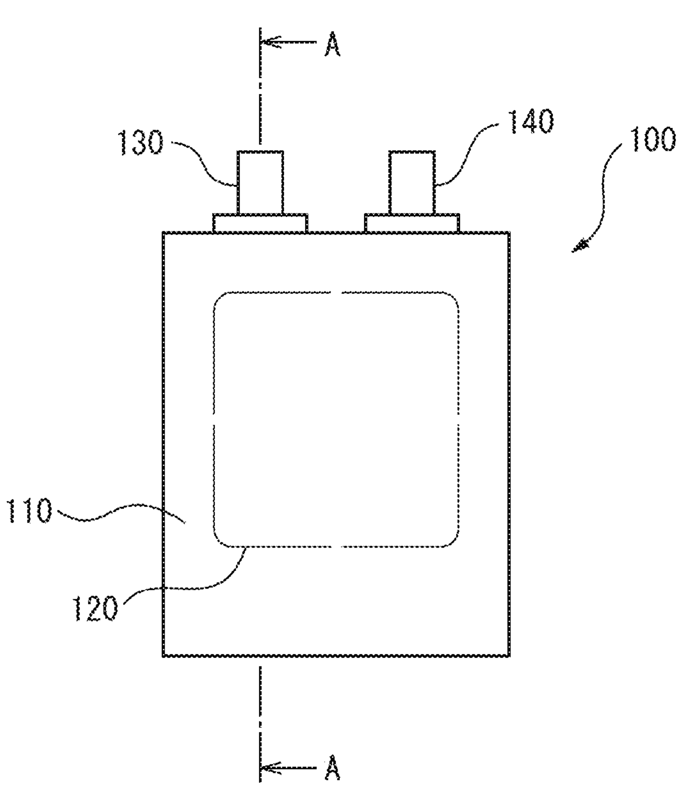
FIG. 1 is a plan view schematically showing an example of a non-aqueous secondary battery according to the present embodiment.

Embodiments for carrying out the present invention (hereinafter simply referred to as "present embodiment") will be described in detail below. The present invention is not limited to the following embodiments, and various modifications can be made without departing from the scope of the present invention. The numerical range described using "-to" in the present description includes the numerical values described before and after the numerical range.

<1. Non-Aqueous Electrolyte Solution>

The non-aqueous electrolyte solution refers to an electrolyte solution containing 1% by weight or less of water relative to the total amount of the non-aqueous electrolyte solution. The non-aqueous electrolyte solution according to the present embodiment preferably contains as little water as possible, but may contain a very small amount of water, as long as it does not interfere with the solution of the problems of the present invention. The content of such water is 300 ppm by weight or less, and preferably 200 ppm by weight or less, based on the total amount of the non-aqueous electrolyte solution. If the non-aqueous electrolyte solution has a configuration for achieving the solution of problems of the present invention, the constituent materials in a known non-aqueous electrolyte solution used in lithium ion batteries can be appropriately selected and applied, for other structural elements.

The non-aqueous electrolyte solution of the present embodiment can be produced by mixing a non-aqueous solvent with a lithium salt and, as necessary, various additives shown below (herein sometimes simply referred to as "additives") by any means. The various additives are a general term of electrode protection additives and other optional additives, and contents thereof are as shown below.

Unless otherwise specified, regarding the content of each compound in the non-aqueous solvent, the mixing ratio is defined by % by volume relative to the total amount of each components constituting the non-aqueous solvent for each components described in <2-1. Non-Aqueous Solvent> and additives for electrode protection described in <2-3. Additives for Electrode Protection>, the mixing ratio is defined by the number of mols per 1 L of the non-aqueous solvent for a lithium salt described in <2-2. Lithium Salt>, and the mixing ratio is defined by parts by weight based on 100 parts by weight of the lithium salt and the non-aqueous solvent as a whole for <2-4. Other Optional Additives>.

In the present embodiment, when the electrolyte solution contains a compound other than the compounds specifically shown in each item of <2-1> to <2-4> below, in case where the compound is liquid at room temperature (25° C.), it is handled according to the non-aqueous solvent, and the mixing ratio is represented by % by volume relative to the total amount of each component (including the compound) constituting the non-aqueous solvent. Meanwhile, in case where the compound is solid at room temperature (25° C.), the mixing ratio is represented by parts by weight based on 100 parts by weight of the lithium salt and entire the non-aqueous solvent.

From the results of various verification experiments, the reason why the lithium-ion secondary battery using the non-aqueous electrolyte solution containing acetonitrile is inferior in high-temperature durability is considered as follows.

(1) Because of having a high metal coordinating ability, the nitrile group of acetonitrile forms a complex with transition metal in the positive electrode active material, and thus promotes the metal elution by stabilization. The metal ions eluted into the non-aqueous electrolyte solution are reductive-deposited on the negative electrode side to cause damage to the SEI of the negative electrode. Therefore, the reductive decomposition of the solvent on the negative electrode is promoted, and thus the irreversible capacity increases and the reductively decomposed solvent accumulates on the negative electrode, leading to an increase in internal resistance. This phenomenon is accelerated at higher temperature and longer periods of time.

(2) As a result of disassembly analysis of a lithium ion secondary battery using an electrolyte solution containing acetonitrile, it has been found that physical peeling points occur between the positive electrode Al current collector and the positive electrode active material when stored for a long time in a high temperature environment. It is presumed that an increase in electrical resistance at peeling points causes deterioration of the high-temperature durability. These phenomena, which are supported by the results of disassembly analysis, are problems newly found by the present inventors, and are not described at all in PTLs 1 to 8.

These phenomena are remarkable in a high temperature environment exceeding 45° C., more remarkable in a high temperature environment exceeding 60° C., and still more remarkable in a high temperature environment exceeding 80° C. Such a tendency is remarkable when the time of exposure to high temperature is 4 hours or more, more remarkable when the exposure time is 100 hours or more, still more remarkable when the exposure time is 200 hours or more, yet more remarkable when the exposure time is 300 hours or more, and further remarkable when the exposure time is 400 hours or more.

<2-1. Non-Aqueous Solvent>

The term "non-aqueous solvent" as used in the present embodiment refers to an element in which the lithium salt and various additives are removed from the non-aqueous electrolyte solution. When the non-aqueous electrolyte solution contains electrode protection additives, "non-aqueous solvent" refers to an element in which the lithium salt and additives other than the electrode protection additives are removed from the non-aqueous electrolyte solution. Examples of the non-aqueous solvents include alcohols such as methanol and ethanol; and aprotic solvents. Of these, the non-aqueous solvent is preferably an aprotic solvent. The non-aqueous solvent may contain solvents other than the aprotic solvent, as long as it does not interfere with the solution of the problems of the present invention.

The non-aqueous solvent for the non-aqueous electrolyte solution of the present embodiment contains acetonitrile as the aprotic solvent. Since the non-aqueous solvent contains acetonitrile, the ionic conductivity of the non-aqueous electrolyte solution is improved, thus making it possible to enhance the diffusivity of lithium ions in the battery. Therefore, when the non-aqueous electrolyte solution contains acetonitrile, in a positive electrode in which the positive electrode active material layer is thickened to increase the filling amount of the positive electrode active material, it becomes possible for lithium ions to satisfactorily reach the region in the vicinity of the current collector where lithium ions hardly reach during high-load discharging. Therefore, it becomes possible to draw out a sufficient capacity even during high-load discharging, thus making it possible to obtain a non-aqueous secondary battery having excellent load characteristics.

When the non-aqueous solvent contains acetonitrile, it is possible to enhance quick charging characteristics of the non-aqueous secondary battery. In constant current (CC)-constant voltage (CV) charging of a non-aqueous secondary battery, the capacity per unit time during the CC charging period is larger than the charge capacity per unit time during the CV charging period. When acetonitrile is used as the non-aqueous solvent of the non-aqueous electrolyte solution, the area capable of CC charging can be increased (CC charging time can be extended) and the charging current can also be increased. Therefore, it is possible to significantly reduce the time required to fully charge the battery from the start of charging the non-aqueous secondary battery.

Acetonitrile easily undergoes electrochemical reductive decomposition. Therefore, when acetonitrile is used, it is preferable to use acetonitrile as a non-aqueous solvent in combination with other solvents (for example, aprotic solvents other than acetonitrile) and/or to add an electrode protection additive for forming a protective film on the electrode.

The content of acetonitrile is 3% by volume or more and 97% by volume or less relative to the total amount of the non-aqueous solvent. The content of acetonitrile is more preferably 5% by volume or more, or 10% by volume or more, or more preferably 20% by volume or more, or 30% by volume or more, and still more preferably 35% by volume or more, relative to the total amount of the non-aqueous solvent. This value is yet more preferably 85% by volume or less, or 66% by volume or less, and further preferably 60% by volume or less. When the content of acetonitrile is 3% by volume or more relative to the total amount of the non-aqueous solvent, the ionic conductivity tends to increase, thus making it possible to exhibit high output characteristics and excellent low-temperature characteristics, and also the dissolution of the lithium salt can be promoted. When the content of acetonitrile is 97% by volume or less relative to the total amount of the non-aqueous solvent, there is a tendency that acetonitrile suppresses the transition metal elution caused by coordination with transition metal in the positive electrode active material, and also suppress physical peeling between the positive electrode Al current collector and the positive electrode active material, thus making it possible to exhibit excellent high-temperature durability. Since the below-described additives suppress an increase in internal resistance of the battery, when the content of acetonitrile in the non-aqueous solvent is within the above range, there is a tendency that high-temperature cycle characteristics and other battery characteristics can be further improved while maintaining the excellent performance of acetonitrile.

The preferable range of the content of acetonitrile varies depending on the type of the positive electrode active material used in combination.

Examples of the aprotic solvent other than acetonitrile include cyclic carbonate, fluoroethylene carbonate, lactone, organic compound containing a sulfur atom, chain carbonate, cyclic ether, mononitrile other than acetonitrile, alkoxy group-substituted nitrile, dinitrile, cyclic nitrile, short-chain fatty acid ester, chain ether, fluorinated ether, ketone, and a compound in which H atoms of the aprotic solvent are partially or entirely substituted with a halogen atom.

Examples of the cyclic carbonate include ethylene carbonate, propylene carbonate, 1,2-butylene carbonate, trans-2,3-butylene carbonate, cis-2,3-butylene carbonate, 1,2-pentylene carbonate, trans-2,3-pentylene carbonate, cis-2,3-pentylene carbonate, vinylene carbonate, 4,5-dimethylvinylene carbonate and vinylethylene carbonate;

examples of the fluoroethylene carbonate include 4-fluoro-1,3-dioxolan-2-one, 4,4-difluoro-1,3-dioxolan-2-one, cis-4,5-difluoro-1,3-dioxolan-2-one, trans-4,5-difluoro-1,3-dioxolan-2-one, 4,4,5-trifluoro-1,3-dioxolan-2-one, 4,4,5,5-tetrafluoro-1,3-dioxolan-2-one and 4,4,5-trifluoro-5-methyl-1,3-dioxolan-2-one;

Examples of the lactone include γ-butyrolactone, α-methyl-γ-butyrolactone, γ-valerolactone, γ-caprolactone, δ-valerolactone, δ-caprolactone and ε-caprolactone;

examples of the organic compound containing a sulfur atom include ethylene sulfite, propylene sulfite, butylene sulfite, pentene sulfite, sulfolane, 3-sulfolene, 3-methyl sulfolane, 1,3-propane sultone, 1,4-butane sultone, 1-propene 1,3-sultone, dimethyl sulfoxide, tetramethylene sulfoxide and ethylene glycol sulfite;

examples of the chain carbonate include ethyl methyl carbonate, dimethyl carbonate, diethyl carbonate, methyl propyl carbonate, methyl isopropyl carbonate, dipropyl carbonate, methyl butyl carbonate, dibutyl carbonate and ethyl propyl carbonate;

examples of the cyclic ether include tetrahydrofuran, 2-methyltetrahydrofuran, 1,4-dioxane and 1,3-dioxane;

examples of the mononitrile other than acetonitrile include propionitrile, butyronitrile, valeronitrile, benzonitrile and acrylonitrile;

examples of the alkoxy group-substituted nitrile include methoxyacetonitrile and 3-methoxypropionitrile;

examples of the dinitrile include malononitrile, succinonitrile, glutaronitrile, adiponitrile, 1,4-dicyanoheptane, 1,5-dicyanopentane, 1,6-dicyanohexane, 1,7-dicyanoheptane, 2,6-dicyanoheptane, 1,8-dicyanooctane, 2,7-dicyanooctane, 1,9-dicyanononane, 2,8-dicyanononane, 1,10-dicyanodecane, 1,6-dicyanodecane and 2,4-dimethylglutaronitrile;

examples of the cyclic nitrile include benzonitrile;

examples of the short-chain fatty acid ester include methyl acetate, methyl propionate, methyl isobutyrate, methyl butyrate, methyl isovalerate, methyl valerate, methyl pivalate, methyl hydroangelate, methyl caproate, ethyl acetate, ethyl propionate, ethyl isobutyrate, ethyl butyrate, ethyl isovalerate, ethyl valerate, ethyl pivalate, ethyl hydroangelate, ethyl caproate, propyl acetate, propyl propionate, propyl isobutyrate, propyl butyrate, propyl isovalerate, propyl valerate, propyl pivalate, propyl hydroangelate, propyl caproate, isopropyl acetate, isopropyl propionate, isopropyl isobutyrate, isopropyl butyrate, isopropyl isovalerate, isopropyl valerate, isopropyl pivalate, isopropyl hydroangelate, isopropyl caproate, butyl acetate, butyl propionate, butyl isobutyrate, butyl butyrate, butyl isovalerate, butyl valerate, butyl pivalate, butyl hydroangelate, butyl caproate, isobutyl acetate, isobutyl propionate, isobutyl isobutyrate, isobutyl butyrate, isobutyl isovalerate, isobutyl valerate, isobutyl pivalate, isobutyl hydroangelate, isobutyl caproate, tert-butyl acetate, tert-butyl propionate, tert-butyl isobutyrate, tert-butyl butyrate, tert-butyl isovalerate, tert-butyl valerate, tert-butyl pivalate, tert-butyl hydroangelate and tert-butyl caproate;

examples of the chain ether include dimethoxyethane, diethyl ether, 1,3-dioxolane, diglime, triglime and tetraglime;

examples of the fluorinated ether include $Rf_{aa}$—$OR_{bb}$, wherein $Rf_{aa}$ is an alkyl group containing a fluorine atom, and $R_{bb}$ is an organic group optionally containing a fluorine atom;

examples of the ketone include acetone, methyl ethyl ketone and methyl isobutyl ketone; and examples of the compound in which H atoms of the aprotic solvent are partially or entirely substituted with a halogen atom include a compound in which a halogen atom is fluorine.

Here, examples of the fluorinated product of the chain carbonate include methyl trifluoroethyl carbonate, trifluorodimethyl carbonate, trifluorodiethyl carbonate, trifluoroethyl methyl carbonate, methyl 2,2-difluoroethyl carbonate, methyl 2,2,2-trifluoroethyl carbonate, methyl 2,2,3,3-tetrafluoropropyl carbonate and the like. The fluorinated chain carbonate can be represented by the following general formula:

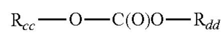

wherein $R_{cc}$ and $R_{dd}$ are at least one selected from the group consisting of $CH_3$, $CH_2CH_3$, $CH_2CH_2CH_3$, $CH(CH_3)_2$ and $CH_2R^f_{ee}$, $R^f_{ee}$ is an alkyl group having 1 to 3 carbon atoms in which a hydrogen atom is substituted with at least one fluorine atom, and $R_{cc}$ and/or $R_{dd}$ contain at least one fluorine atom.

Examples of the fluorinated product of the short-chain fatty acid ester include fluorinated short-chain fatty acid ester typified by 2,2-difluoroethyl acetate, 2,2,2-trifluoroethyl acetate and 2,2,3,3-tetrafluoropropyl acetate. The fluorinated short-chain fatty acid ester can be represented by the following general formula:

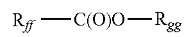

wherein $R_{ff}$ is at least one selected from the group consisting of $CH_3$, $CH_2CH_3$, $CH_2CH_2CH_3$, $CH(CH_3)_2$, $CF_3CF_2H$, $CFH_2$, $CF_2R^f_{hh}$, $CFHR^f_{hh}$ and $CH_2R^f_{ii}$, $R_{gg}$ is at least one selected from the group consisting of $CH_3$, $CH_2CH_3$, $CH_2CH_2CH_3$, $CH(CH_3)_2$ and $CH_2R_{ii}$, $R_{hh}$ is an alkyl group having 1 to 3 carbon atoms in which hydrogen atoms may be substituted with at least one fluorine atom, R ii is an alkyl group having 1 to 3 carbon atoms in which hydrogen atoms are substituted with at least one fluorine atom, $R_{ff}$ and/or $R_{gg}$ contain(s) at least one fluorine atom, and when $R_{ff}$ is $CF_2H$, $R_{gg}$ is not $CH_3$.

The aprotic solvent other than acetonitrile in the present embodiment can be used alone, or two or more thereof may be used in combination.

It is preferable to use, as the non-aqueous solvent in the present embodiment, one or more of cyclic carbonate and chain carbonate in combination with acetonitrile from the viewpoint of improving the stability of the non-aqueous electrolyte solution. From this viewpoint, it is more preferable to use, as the non-aqueous solvent in the present embodiment, cyclic carbonate in combination with acetonitrile, and still more preferable to use both cyclic carbonate and chain carbonate in combination with acetonitrile.

When the cyclic carbonate is used together with acetonitrile, it is particularly preferable that the cyclic carbonate includes ethylene carbonate, vinylene carbonate and/or fluoroethylene carbonate.

<2-2. Lithium Salt>

(Cyclic Anion-Containing Lithium Salt)

The non-aqueous electrolyte solution according to the present embodiment contains a cyclic anion-containing lithium salt represented by the following general formula (1):

[Chemical Formula 12]

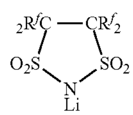

(1)

wherein $R^f$s may be the same or different and $R^f$ each represents a fluorine atom or a perfluoro group having 4 or less carbon atoms.

Long-term high-temperature durability is improved by using the cyclic anion-containing lithium salt represented by the formula (1) in the acetonitrile-containing non-aqueous electrolyte solution. The mechanism is presumed as follows.

The cyclic anion-containing lithium salt represented by the formula (1) (hereinafter also referred to as compound (1)) dissociates into lithium ions and cyclic anions in the non-aqueous electrolyte solution containing acetonitrile. The cyclic anion electrically interacts with acetonitrile and weakens the metal coordination ability of the nitrile group of acetonitrile. As a result, acetonitrile can suppress the metal elution caused by forming a complex with the transition metal in the positive electrode active material at high temperature, and the movement of the metal complex to the negative electrode can be suppressed. Therefore, deterioration of the negative electrode SEI due to reductive deposition of the metal complex on the negative electrode is suppressed, leading to an improvement in long-term high-temperature durability.

In addition, the decomposition product produced by the reductive decomposition of the cyclic anion on the negative electrode deposits on the negative electrode and acts as SEI, thus enabling an improvement in the durability of the negative electrode SEI against the reductive deposition of the metal complex on the negative electrode, and suppression of the reductive decomposition of the solvent on the negative electrode.

The use of the cyclic anion-containing lithium salt represented by the formula (1) in the acetonitrile-containing non-aqueous electrolyte solution enables suppression of the physical peeling phenomenon between the positive electrode Al current collector and the positive electrode active material. It is presumed that the peeling phenomenon is caused by the following mechanism.

The imide anions of various lithium-containing imide salts in the non-aqueous electrolyte solution coordinate with Al on the surface of the positive electrode Al current collector to form a stable Al-imide complex. Since this Al-imide complex is easily dissolved in highly polar acetonitrile, the elution is promoted in a non-aqueous electrolyte solution containing acetonitrile. As a result, the surface of the Al current collector is scraped, and the physical peeling phenomenon occurs between the positive electrode Al current collector and the positive electrode active material.

From the analytical simulation results on the behavior of various lithium-containing imide salts and cyclic anion-containing lithium salts in acetonitrile, it was found that, compared to chain lithium-containing imide salts typified by $LiN(SO_2F)_2$ and $LiN(SO_2CF_3)$, it is difficult for nitrogen atoms of the lithium ion and the imide anion to dissociate for the cyclic anion-containing lithium salt. From the results, since lithium stays near the nitrogen atom of the imide anion derived from the lithium salt for the cyclic anion-containing lithium salt, it becomes difficult for the nitrogen atom of the imide anion to coordinate with Al on the surface of the positive electrode Al current collector, leading to suppression of the formation of an Al-imide complex, thus presuming that physical peeling between the positive electrode Al current collector and the positive electrode active material was suppressed.

The detailed results of the analytical simulation are shown below.

(Molecular Dynamics Simulation of Non-Aqueous Electrolyte Solution composed of Li Salt and Acetonitrile Solvent)

A solution model of LiX and an acetonitrile solvent (X=CTFSI, TFSI, FSI, represented by the following structural formula) was created and solution molecular motion was simulated. The existence probability distribution (radial distribution function) of the distance between the Li ion and the nitrogen atom (derived from imide anion X) was analyzed to evaluate the dissociation state of the Li salt. As a result, it was found that CTFSI is more difficult to dissociate Li ions and nitrogen atoms than TFSI and FSI, and that Li ions stay closer to the nitrogen atom of the imide anion.

[Chemical Formula 13]

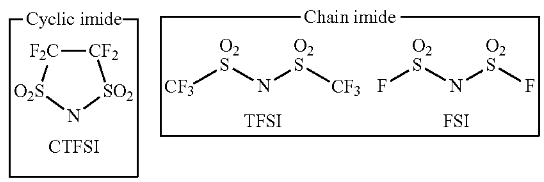

Next, the present inventors focused on specific Li salt in the solution model and analyzed the migration of Li ions in more detail. As a result, it was found that Li ion migration occurs from the vicinity of the nitrogen atom of the imide anion to the vicinity of the oxygen atom for TFSI and FSI. Meanwhile, it was found that Li ion migration is less likely to occur and the Li ions continue to stay near the nitrogen atom of the imide anion for CTFSI. It is considered that Li ion migration occurs from the vicinity of the nitrogen atom to the vicinity of the oxygen atom with intramolecular rotation for TFSI and FSI. Meanwhile, it is considered that since the cyclic CTFSI has low degree of freedom of the intramolecular rotation, Li ions are less likely to migrate from the vicinity of the nitrogen atom to the vicinity of the oxygen atom.

The detailed conditions for motion simulation are shown below.

(Common Conditions)

Materials studio 2019 was used for simulation. COMPASSII was used for the force field. The values assigned in the force field parameters of COMPASSII were used for atomic charges. The Ewald method was used to calculate the electrostatic interaction. The cutoff radius $r_c$ of the Van der Waals interaction was set at $r_c$=9.5 angstrom. Nose-Hoover Langevin dynamics were used for temperature control, and Berendsen's method was used for pressure control.

(i. Creation of Solution Model)

The solution model was created using Amorphous Cell module of Materials Studio 2019. Three-dimensional periodic boundary conditions were imposed on the solution model, and the unit cell was set to contain 570 acetonitrile molecules and 30 LiX molecules (X=CTFSI, TFSI, FSI). The initial structure was made with a density of 0.5 $g/cm^3$.

(ii. Structural Relaxation of Solution Model)

For the simulation of the solution model, Forcite module of Materials Studio 2019 was used. After structural optimization of the initial structure, structural relaxation was carried out by annealing calculation followed by MD simulation in the NPT ensemble (constant number of particles, pressure and temperature). Annealing was carried out by repeating five cycles of heating and cooling within a temperature range of 300 K to 500 K, with a total simulation time of 500 ps and a time step width of 1 fs. NPT simulation was carried out at a temperature of 298 K, a pressure of 1,013 hPa, total simulation time of 500 ps, and time step width of 1.0 fs.

(iii. Simulation for Data Acquisition)

Under the same conditions as above, NPT simulation for data acquisition was carried out at 500 ps. The radial distribution function between nitrogen atoms of Li ions and imide anions was obtained for the obtained structural trajectories.

As for $R^f$ in the formula (1), the perfluoro group having 4 or less carbon atoms may be, for example, a perfluoroalkyl group having 1 to 4 carbon atoms. Specific examples of the compound (1) include compounds represented by the following formulas (1-1) to (1-5) (hereinafter also referred to as compounds (1-1) to (1-5), respectively). In the formula (1), one or more fluorine atoms may be substituted with a perfluoroalkyl group having 4 or less carbon atoms. When the fluorine atom is substituted with a perfluoroalkyl group, the number of fluorine atoms substituted with a perfluoroalkyl group is preferably 2 or less, and more preferably 1. The number of carbon atoms of the perfluoroalkyl group is preferably 2 or less, and the perfluoroalkyl group is preferably a trifluoromethyl group. The cyclic anion-containing lithium salt represented by the formula (1) is preferably compounds represented by compounds (1-1) to (1-5), more preferably compounds represented by compounds (1-1) to (1-3), and still more preferably a compound represented by compound (1-2).

[Chemical Formula 14]

(1-1)

(1-2)

(1-3)

(1-4)

(1-5)

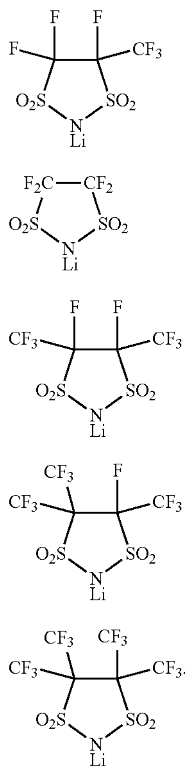

As a result of repeated studies, it became apparent that, in the electrolyte solution containing acetonitrile, the high-temperature durability of the cyclic anion-containing lithium salt represented by the formula (1) greatly improved compared to the case of using the cyclic anion-containing lithium salt represented by the following formula (9). From the results of various verification experiments, the reason is considered as follows:

[Chemical Formula 15]

(9)

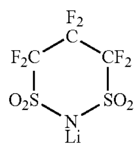

In the 6-membered ring cyclic anion-containing lithium salt represented by the formula (9), because of a weak bond between the fluorine atom and the carbon atom in the difluoromethylene group which is not adjacent to the sulfonyl group, the fluorine anion is eliminated by reduction on the negative electrode during charging. Since the eliminated fluorine anion is easily stabilized in a non-aqueous electrolyte solution containing acetonitrile having high polarity, the elimination reaction proceeds continuously, leading to deterioration of the high-temperature durability. Meanwhile, in the compound (1), the fluorine anion is not eliminated during charging compared to the compound (9), and thus the high-temperature durability does not deteriorate. In particular, in the 5-membered ring cyclic anion-containing lithium salt represented by the formula (1-2), because of strong bond between the fluorine atom and the carbon atom in two difluoromethylene groups, the fluorine anion is not eliminated during charging, and thus the high-temperature durability does not deteriorate.

As the molecular weight of the lithium salt increases, the weight of the lithium salt required to prepare a non-aqueous electrolyte containing lithium ions at a certain molar concentration increases, and the viscosity of the non-aqueous electrolyte solution tends to increase, leading to deterioration of the output characteristics. Therefore, by using the compound (1), especially the cyclic anion-containing lithium salt represented by the formula (1-2), which has a smaller number of atoms constituting the ring than the formula (9), excellent output characteristics can be exhibited.

The content of the cyclic anion-containing lithium salt represented by the formula (1) is preferably 0.1 mol or more, more preferably 0.5 mol or more, and still more preferably 0.8 mol or more, as the amount per 1 L of the non-aqueous solvent. When the content is within the above range, the ionic conductivity tends to increase to exhibit high output characteristics. The content of the cyclic anion-containing lithium salt represented by the formula (1) is preferably less than 3 mol, more preferably 2.5 mol or less, and still more preferably 1.5 mol or less, as the amount per 1 L of the non-aqueous solvent. When the content of the cyclic anion-containing lithium salt represented by the formula (1) is within the above range, the ionic conductivity of the non-aqueous electrolyte solution increases, thus making it possible to exhibit high output characteristics of the battery and suppressing a decrease in ionic conductivity that accompanies an increase in viscosity of the non-electrolyte solution at low temperature. There is also a tendency that high-temperature cycle characteristics and other battery characteristics can be further improved while maintaining excellent performance of the non-aqueous electrolyte solution.

To improve the volumetric energy density of the non-aqueous secondary battery, when the basis weight of a positive electrode active material layer contained in the positive electrode is adjusted within a range of 24 to 200 $mg/cm^2$, the content of the cyclic anion-containing lithium salt represented by the formula (1) is preferably 1 mol or more, more preferably 1.2 mols or more, still more preferably 1.5 mols or more, and particularly preferably 2 mol or more. When the content of the cyclic anion-containing lithium salt represented by the formula (1) is within the above range, rapid ion conduction is possible even in the deep part of the positive electrode away from the positive electrode-electrolyte solution interface, and thus there is a tendency that the volumetric energy density can be improved while maintaining a balance with the output performance of the battery.

In the non-aqueous electrolyte solution, the molar ratio of the content of the cyclic anion-containing lithium salt represented by the formula (1) to the content of acetonitrile is 0.001 or more and 5 or less. From the viewpoint of suppressing the elution of the positive electrode metal due to acetonitrile at high temperature and suppressing solvent decomposition on the negative electrode, the molar ratio of the content of the cyclic anion-containing lithium salt to the content of acetonitrile is preferably 0.001 or more, more preferably 0.01 or more, still more preferably 0.08 or more, and yet more preferably 0.1 or more. When the molar ratio of the content of the cyclic anion-containing lithium salt to the content of acetonitrile is within the above range, it is possible to effectively suppress the elution of the positive electrode metal due to acetonitrile at high temperature and physical peeling between the positive electrode Al current collector and the positive electrode active material, and suppressing solvent decomposition on the negative electrode, thus obtaining excellent high-temperature durability.

Examples of the method for measuring the content of the cyclic anion-containing lithium salt from the electrolyte solution include a method of combining the measurement of the content of the cyclic anion by $^{19}$F-NMR using perfluorobenzene or the like as an internal standard with the measurement of the content of lithium ions by ion chromatography and the like.

From the viewpoint of suppressing a decrease in ionic conductivity due to an increase in viscosity of the non-aqueous electrolyte solution, the molar ratio of the content of the cyclic anion-containing lithium salt to the content of acetonitrile is preferably 5 or less, more preferably 1 or less, more preferably 0.79 or less, still more preferably 0.5 or less, and yet more preferably 0.27 or less. When the molar ratio of the content of the cyclic anion-containing lithium salt to the content of acetonitrile is within the above range, it is possible to effectively suppress a decrease in the ionic conductivity at normal temperature and low temperature such as −10° C. or −40° C., thus making it possible to obtain excellent output characteristics and low-temperature characteristics.

The preferred range of the content of the cyclic anion-containing lithium salt represented by the formula (1) to the content of acetonitrile varies depending on the type of the positive electrode active material used in combination.

Since the saturation concentration of the lithium salt containing the cyclic anion represented by the formula (1) relative to acetonitrile is higher than the saturation concentration of $LiPF_6$, the molar concentration of the lithium salt satisfying $LiPF_6 \leq$ cyclic anion-containing lithium salt is preferable. From the viewpoint of suppressing the association and deposition of the lithium salt and acetonitrile at low temperature, the molar ratio of the content of the cyclic anion-containing lithium salt to the content of $LiPF_6$ in the non-aqueous electrolyte solution is preferably 3 or more, more preferably more than 10, still more preferably 15 or more, yet more preferably 20 or more, and particularly preferably 25 or more. When the molar ratio of the content of the cyclic anion-containing lithium salt to the content of $LiPF_6$ is within the above range, it is possible to effectively suppress a decrease in ionic conductivity at low temperature such as −10° C. or −40° C., thus making it possible to obtain excellent low-temperature characteristics.

In the acetonitrile-containing electrolyte solution, since excessive $LiPF_6$ causes deterioration of the battery performance at high temperature, while the cyclic anion-containing lithium salt suppresses deterioration of the battery performance at high temperature by a mechanism presumed to contribute to the above-described positive electrode metal elution suppressing effect or negative electrode SEI, it is possible to effectively improve the long-term high-temperature durability by controlling the molar ratio of the content of the cyclic anion-containing lithium salt to the content of $LiPF_6$ within the above range.

In the non-aqueous electrolyte solution, the molar ratio of the content of the cyclic anion-containing lithium salt to the content of $LiPF_6$ is preferably 150 or less. When the molar ratio of the content of the cyclic anion-containing lithium salt to the content of $LiPF_6$ is within the above range, the formation of a negative electrode SEI excellent in a balance between the organic component derived from the cyclic anion-containing lithium salt and the inorganic component derived from $LiPF_6$ facilitates intercalation and deintercalation of lithium ions at normal temperature and low temperature, and enables suppression of capacity deterioration and resistance increase due to shrinkage of the negative electrode SEI at low temperature, leading to an improvement in output performance and low-temperature performance.

The preferable range of the molar ratio of the content of cyclic anion-containing lithium salt to the content of $LiPF_6$ varies depending on the type of the positive electrode active material used in combination.

The lithium salt in the present embodiment may further include, in addition to the cyclic anion-containing lithium salt, one or more selected from a lithium-containing imide salt, a fluorine-containing inorganic lithium salt, an organolithium salt and other lithium salts.

The method for measuring the content of the lithium salt in the present embodiment is the same method as the above-described method for measuring a cyclic anion-containing lithium salt.

($LiPF_6$)

The non-aqueous electrolyte solution of the present embodiment may further include a $LiPF_6$ as the lithium salt. The content of $LiPF_6$ in the non-aqueous electrolyte solution of the present embodiment is preferably less than 0.5 mol, more preferably less than 0.1 mol, and still more preferably less than 0.01 mol, as the amount per 1 L of the non-aqueous solvent.

The content of $LiPF_6$ in the non-aqueous electrolyte solution of the present embodiment is preferably 0.01 millimoles or more as the amount per 1 L of the non-aqueous solvent.

It is known that $LiPF_6$ is thermally decomposed at high temperature to produce an acid component. In particular, such a tendency is remarkable in a high temperature environment exceeding 60° C., and more remarkable in a high temperature environment exceeding 80° C. In addition, such a tendency is remarkable when the time of exposure to high temperature is 4 hours or more, more remarkable when the exposure time is 100 hours or more, still more remarkable when the exposure time is 200 hours or more, yet more remarkable when the exposure time is 300 hours or more, and further remarkable when the exposure time is 400 hours or more. When the content of $LiPF_6$ is within the above range, it is possible to suppress the generation of the acid component due to the thermal decomposition reaction of $LiPF_6$ when exposed to high temperature exceeding 60° C. for 4 hours or more. Furthermore, it is also possible to reduce the amount of hydrogen fluoride (HF) generated from the $PF_6$ anion by abstracting hydrogen from the α-position of acetonitrile. When a large amount of HF is generated in the electrolyte solution, not only a metal component is eluted from a battery members to cause corrosion of the members, but also complex cations formed from the eluted metal ions and acetonitrile are produced, leading to acceleration of deterioration of the battery. In particular, such a tendency is remarkable in a high temperature environment exceeding 45° C., more remarkable in a high temperature environment exceeding 60° C., and still more remarkable in a high temperature environment exceeding 80° C. Such a tendency is remarkable when the time of exposure to high temperature is 4 hours or more, more remarkable when the exposure time is 100 hours or more, still more remarkable when the exposure time is 200 hours or more, yet more remarkable when the exposure time is 300 hours or more, and further remarkable when the exposure time is 400 hours or more. However, when the content of $LiPF_6$ is within the above range, the amount of HF generated from the $PF_6$ anion due to the abstraction of hydrogen from the α-position of acetonitrile even when exposed to a high temperature exceeding 45° C. for 4 hours or more, thus making it possible to suppress the progress of such deterioration. As a result, it is possible to minimize the deterioration of the battery performance caused by corrosion of the positive electrode active material layer, the positive electrode current collector, or deterioration reaction of the electrolyte solution.

The following fact has been clarified by the study of the present inventors: for example, for a non-aqueous electrolyte solution containing acetonitrile, a lithium-containing imide salt and $LiPF_6$ disclosed in PTL 5, in contrast to controlling the content of $LiPF_6$ to 0.01 mol/L or more, regarding the non-aqueous electrolyte containing acetonitrile, a cyclic anion-containing lithium salt represented by the formula (1) and $LiPF_6$, it is possible to avoid the corrosion of the aluminum (Al) current collector even when the content of $LiPF_6$ is controlled to less than 0.01 mol/L. The mechanism is presumed as follows.

The cyclic anion-containing lithium salt represented by the formula (1) dissociates into lithium ions and cyclic anions in the acetonitrile-containing electrolyte solution. The cyclic anion electrically interacts with acetonitrile and weakens the metal coordination ability of the nitrile group of acetonitrile. As a result, acetonitrile can suppress the metal elution caused by forming a complex with Al ions of the positive electrode active material at high temperature.

When the content of $LiPF_6$ is less than 0.01 mol/L, it is possible to suppress the generation of an acid component due to the thermal decomposition reaction of $LiPF_6$ when exposed to high temperature exceeding 45° C. for 4 hours or more. Furthermore, it is also possible to reduce the amount of hydrogen fluoride (HF) generated from the $PF_6$ anion by abstracting hydrogen from the α-position of acetonitrile. As a result, it is possible to minimize the deterioration of the battery performance caused by corrosion of the positive electrode active material layer, the positive electrode current collector, or deterioration reaction of the electrolyte solution.

As another aspect, the non-aqueous electrolyte solution of the present embodiment preferably does not contain $LiPF_6$ as a lithium salt. Here, "not containing $LiPF_6$ as a lithium salt" refers to the case where the amount of the lithium salt is less than 0.01 millimoles as the amount per 1 L of the non-aqueous solvent, or the lithium salt is not detected by the above measurement method.

If the non-aqueous electrolyte solution does not contain $LiPF_6$ as the lithium salt, it is possible to have long-term high-temperature durability even when exposed to high temperature exceeding 45° C. for 4 hours or more. This is considered because deterioration of the battery performance due to the corrosion of the positive electrode active material layer derived from the lithium salt, corrosion of the positive electrode current collector, or deterioration reaction of the electrolyte solution was minimized.

(Lithium-Containing Imide Salt)

Specifically, the lithium-containing imide salt preferably contains at least one of $LiN(SO_2F)_2$ and $LiN(SO_2CF_3)_2$.

When the non-aqueous solvent contains acetonitrile, the saturation concentration of the lithium-containing imide salt relative to acetonitrile is higher than that of $LiPF_6$, so that the lithium salt preferably contains the lithium-containing imide salt at a molar concentration satisfying: $LiPF_6$ lithium-containing imide salt because the association and precipitation of the lithium salt and the acetonitrile can be suppressed at low temperature. From the viewpoint of securing the amount of ions supplied to the non-aqueous electrolyte solution according to the present embodiment, the content of the lithium-containing imide salt is preferably 0.5 mol or more and 3.0 mol or less as the amount per 1 L of the non-aqueous solvent.

According to the acetonitrile-containing non-aqueous electrolyte solution containing at least one of $LiN(SO_2F)_2$ and $LiN(SO_2CF_3)_2$, a reduction in ionic conductivity in a low temperature range such as −10° C. or −30° C. can be effectively suppressed, and excellent low-temperature characteristics can be obtained. In the present embodiment, by adjusting the content of the lithium-containing imide salt, it is possible to more effectively suppress an increase in resistance during high-temperature heating.

(Fluorine-Containing Inorganic Lithium Salt)

The lithium salt used in the non-aqueous electrolyte solution of the present embodiment may contain a fluorine-containing inorganic lithium salt other than $LiPF_6$, and may contain, for example, fluorine-containing inorganic lithium salts such as $LiBF_4$, $LiAsF_6$, $Li_2SiF_6$, $LiSbF_6$ and $Li_2B_{12}F_bH_{12-b}$, wherein b is an integer of 0 to 3. Here, "inorganic lithium salt" refers to a lithium salt which does not contain a carbon atom in anions, but contains a fluorine atom in anions and is soluble in acetonitrile. "Fluorine-containing inorganic lithium salt" refers to a lithium salt which does not contain a carbon atom in anions, but contains a fluorine atom in anions and is soluble in acetonitrile. The fluorine-containing inorganic lithium salt is excellent in that it forms a passive film on a surface of an aluminum foil, which is a positive electrode current collector, and suppresses corrosion of the positive electrode current collector. These fluorine-containing inorganic lithium salts are used alone or in combination of two or more thereof. The fluorine-containing inorganic lithium salt is preferably a compound which is a double salt of LiF and Lewis acid is preferable, and of these, a fluorine-containing inorganic lithium salt containing a phosphorus atom is more preferable because it facilitates the release of free fluorine atoms. When a fluorine-containing inorganic lithium salt containing a boron atom is used as the fluorine-containing inorganic lithium salt, it is preferable because it is easy to capture an excess free acid component which may cause deterioration of the battery, and from such a point of view, $LiBF_4$ is preferable.

The content of the fluorine-containing inorganic lithium salt in the lithium salt used in the non-aqueous electrolyte solution according to the present embodiment is preferably 0.01 mol or more, more preferably 0.1 mol or more, and still more preferably 0.25 mol or more, relative to 1 L of the non-aqueous solvent. When the content of the fluorine-containing inorganic lithium salt is within the above range, the ionic conductivity tends to increase and high output characteristics tend to be exhibited. The content is preferably less than 2.8 mol, more preferably less than 1.5 mol, and still more preferably less than 1 mol, relative to 1 L of the non-aqueous solvent. When the content of the fluorine-containing inorganic lithium salt is within the above range, the ionic conductivity tends to increase and high output characteristics can be exhibited, and deterioration of the ionic conductivity due to an increase in viscosity at low temperature tends to be suppressed. Moreover, the high-temperature cycle characteristics and other battery characteristics tend to be further improved while maintaining excellent performance of the non-aqueous electrolyte solution.

(Organolithium Salt)

The lithium salt in the present embodiment may contain an organolithium salt. The "organolithium salt" refers to a lithium salt other than a lithium-containing imide salt, which contains a carbon atom as anions and is soluble in acetonitrile.

Examples of the organolithium salt include an organolithium salt having an oxalic acid group. Specific examples of the organolithium salt having an oxalate group include organolithium salts represented by $LiB(C_2O_4)_2$, $LiBF_2(C_2O_4)$, $LiPF_4(C_2O_4)$ and $LiPF_2(C_2O_4)_2$, respectively. Of these, at least one lithium salt selected from the lithium salts represented by $LiB(C_2O_4)_2$ and $LiBF_2(C_2O_4)$ is preferable. It is more preferable to use one or more of these salts together with a fluorine-containing inorganic lithium salt. The organolithium salt having an oxalic acid group may be added to the non-aqueous electrolyte solution or contained in a negative electrode (negative electrode active material layer).

The amount of the organolithium salt added to the non-aqueous electrolyte solution in the present embodiment is preferably 0.005 mol or more, more preferably 0.01 mol or more, still more preferably 0.02 mol or more, and particularly preferably 0.05 mol or more, as the amount per 1 L of the non-aqueous solvent, from the viewpoint of ensuring better effects due to its use. However, if the amount of the organolithium salt having an oxalic acid group in the non-aqueous electrolyte solution is too large, it may precipitate. Therefore, the amount of the organolithium salt having an oxalic acid group added to the non-aqueous electrolyte solution is preferably less than 1.0 mol, more preferably less than 0.5 mol, and still more preferably less than 0.2 mol, as the amount per 1 L of the non-aqueous solvent.

The organolithium salt having an oxalic acid group is known to be hardly insoluble in organic solvents having low polarity, especially chain carbonates. The content of the organolithium salt in the non-aqueous electrolyte solution according to the present embodiment may be, for example, 0.01 mol or more and 0.5 mol or less as the amount per 1 L of the non-aqueous solvent.

The organolithium salt having an oxalic acid group sometimes contain a trace amount of lithium oxalate, and sometimes reacts with a trace amount of moisture contained in other starting materials when mixed as a non-aqueous electrolyte solution, thus generating a new white precipitate of lithium oxalate. Therefore, the content of lithium oxalate in the non-aqueous electrolyte solution according to the present embodiment is preferably suppressed within a range of 500 ppm or less.

(Other Lithium Salts)

The lithium salt in the present embodiment may contain other lithium salts, in addition to the above lithium salts.

Specific examples of other lithium salts include:

- inorganic lithium salts containing no fluorine atom in anions, such as $LiClO_4$, $LiAlO_4$, $LiAlCl_4$, $LiB_{10}Cl_{10}$ and chloroborane Li;
- organolithium salts such as $LiCF_3SO_3$, $LiCF_3CO_2$, $Li_2C_2F_4(SO_3)_2$, $LiC(CF_3SO_2)_3$, $LiC_nF_{(2n+1)}SO_3$, wherein n≥2, lower aliphatic carboxylic acid Li, tetraphenylboric acid Li and $LiB(C_3O_4H_2)_2$;
- organolithium salts represented by $LiPF_n(C_pF_{2p+1})_{6-n}$, wherein n is an integer of 1 to 5, and p is an integer of 1 to 8, such as $LiPF_5(CF_3)$;
- organolithium salts represented by $LiBF_q(C_sF_{2s+1})_{4-q}$, wherein q is an integer of 1 to 3, and s is an integer of 1 to 8, such as $LiBF_3(CF_3)$;
- lithium salts bonded to polyvalent anions;
- organolithium salts represented by:

the following formula (XXa):

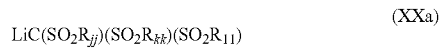

(XXa)

wherein $R_{jj}$, $R_{kk}$, and $R_{ll}$ may be the same or different and represent a perfluoroalkyl group having 1 to 8 carbon atoms, the following formula (XXb):

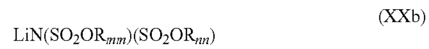

(XXb)

wherein $R_{mm}$ and $R_{nn}$ may be the same or different and represent a perfluoroalkyl group having 1 to 8 carbon atoms, and the following formula (XXc):

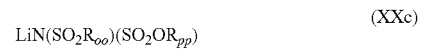

(XXc)

wherein $R_{oo}$ and $R_{pp}$ may be the same or different and represent a perfluoroalkyl group having 1 to 8 carbon atoms, etc., and one or more of these salts can be used together with the fluorine-containing inorganic lithium salt.

The amount of the other lithium salt added to the non-aqueous electrolyte solution may be appropriately set within a range of 0.01 mol or more and 0.5 mol or less as the amount per 1 L of the non-aqueous solvent.

<2-3. Electrode Protection Additives>

The non-aqueous electrolyte solution according to the present embodiment may contain an additive for protecting the electrode (electrode protection additive). The electrode protection additive may substantially overlap with a substance (i.e., the non-aqueous solvent described above) which serves as a solvent for dissolving the lithium salt. The electrode protection additive is preferably a substance which contributes to an improvement in performance of the non-aqueous electrolyte solution and the non-aqueous secondary battery, but also contains a substance which is not directly involved in the electrochemical reaction.

Specific examples of the electrode protection additive include:

- fluoroethylene carbonates typified by 4-fluoro-1,3-dioxolan-2-one, 4,4-difluoro-1,3-dioxolan-2-one, cis-4,5-difluoro-1,3-dioxolan-2-one, trans-4,5-difluoro-1,3-dioxolan-2-one, 4,4,5-trifluoro-1,3-dioxolan-2-one, 4,4,5,5-tetrafluoro-1,3-dioxolan-2-one and 4,4,5-trifluoro-5-methyl-1,3-dioxolan-2-one;
- unsaturated bond-containing cyclic carbonates typified by vinylene carbonate, 4,5-dimethylvinylene carbonate and vinylethylene carbonate;
- lactones typified by γ-butyrolactone, γ-valerolactone, γ-caprolactone, δ-valerolactone, δ-caprolactone and ε-caprolactone;
- cyclic ethers typified by 1,4-dioxane; and
- cyclic sulfur compounds typified by ethylene sulfite, propylene sulfite, butylene sulfite, pentene sulfite, sulfolane, 3-sulfolene, 3-methyl sulfolane, 1,3-propane sultone, 1,4-butane sultone, 1-propene 1,3-sultone and tetramethylene sulfoxide. These electrode protection additives are used alone, or in combination of two or more thereof.

The content of the electrode protection additive in the non-aqueous electrolyte solution is preferably 0.1 to 30% by volume, more preferably 0.3 to 15% by volume, still more preferably 0.4 to 8% by volume, and particularly preferably 0.5 to 4% by volume, as the amount per total amount of the non-aqueous solvent.

In the present embodiment, the larger the content of the electrode protection additive, the more deterioration of the non-aqueous electrolyte solution can be suppressed. However, the smaller the content of the electrode protection additive, the higher output characteristics of the non-aqueous secondary battery in a low temperature environment is improved. Therefore, by adjusting the content of the electrode protection additive within the above range, it tends to be possible to exhibit excellent performance based on high ionic conductivity of the electrolyte solution without impairing the basic function as a non-aqueous secondary battery. It tends to be able to be demonstrated. By preparing a non-aqueous electrolyte solution with such a composition, it tends to be possible to further improve the cycle performance of the non-aqueous secondary battery, high output performance in a low temperature environment, and other battery characteristics.

Acetonitrile easily undergoes electrochemical reductive decomposition. Therefore, the non-aqueous solvent containing acetonitrile preferably contains, as the electrode protection additive for forming a protective film on the negative electrode, one or more cyclic aprotic polar solvents, and more preferably one or more unsaturated bond-containing cyclic carbonates.

The unsaturated bond-containing cyclic carbonate is preferably vinylene carbonate, and the content of vinylene carbonate in the non-aqueous electrolyte solution is preferably 0.1% by volume or more and 4% by volume or less, more preferably 0.2% by volume or more and less than 3% by volume, and still more preferably 0.5% by volume or more and less than 2.5% by volume. As a result, the low-temperature durability can be more effectively improved, thus making it possible to provide a secondary battery having excellent low-temperature performance.

The vinylene carbonate as the electrode protection additive suppresses the reductive decomposition reaction of acetonitrile on a surface of the negative electrode, and meanwhile, excessive film formation causes deterioration of low-temperature performance. Therefore, by adjusting the amount of vinylene carbonate added within the above range, the interface (film) resistance can be suppressed to a low level, thus making it possible to suppress cycle deterioration at low temperature.

(Acid Anhydride)

The non-aqueous secondary battery according to the present embodiment is stabilized by partially decomposing the non-aqueous electrolyte solution at the time of initial charging to form an SEI on a surface of a negative electrode. To enhance this SEI more effectively, an acid anhydride can be added to the non-aqueous electrolyte solution, battery member or non-aqueous secondary battery. When acetonitrile is contained as a non-aqueous solvent, the strength of the SEI tends to decrease as the temperature rises, but the addition of the acid anhydride promotes the enhancement of the SEI. Therefore, use of the acid anhydride enables effective suppression of an increase in internal resistance over time due to thermal history.

Specific examples of the acid anhydride include chain acid anhydrides typified by acetic anhydride, propionic anhydride and benzoic anhydride; cyclic acid anhydrides typified by malonic anhydride, succinic anhydride, glutaric anhydride, maleic anhydride, phthalic anhydride, 1,2-cyclohexanedicarboxylic anhydride, 2,3-naphthalenedicarboxylic anhydride or naphthalene-1,4,5,8-tetracarboxylic dianhydride; and mixed acid anhydrides having a structure in which different types of acids, such as two different types of carboxylic acids, or carboxylic acid and sulfonic acid undergo dehydration condensation. These acid anhydrides are used alone, or in combination of two or more thereof.

Since it is preferable for the non-aqueous secondary battery according to the present embodiment to enhance an SEI before the reductive decomposition of the non-aqueous solvent, it is preferable to contain, as the acid anhydride, at least one cyclic acid anhydride which acts early at the time of initial charging. Only one type or plural types of these cyclic acid anhydrides may be contained. Alternatively, a cyclic acid anhydride other than these cyclic acid anhydrides may be contained. The cyclic acid anhydride preferably contains at least one of succinic anhydride, maleic anhydride and phthalic anhydride.

According to a non-aqueous electrolyte solution containing at least one of succinic anhydride, maleic anhydride and phthalic anhydride, it is possible to form a strong SEI on a negative electrode, thus suppressing more effectively an increase in resistance during high-temperature heating. In particular, it is preferable to contain succinic anhydride. Thus, it is possible to form a strong SEI on the negative electrode more effectively while suppressing the side reaction.

When the non-aqueous electrolyte solution according to the present embodiment contains an acid anhydride, the content thereof may be preferably within a range of 0.01 part by weight or more and 10 parts by weight or less, more preferably 0.05 part by weight or more and 1 part by weight or less, and still more preferably 0.1 part by weight or more and 0.5 part by weight or less, as the amount per 100 parts by weight of the non-aqueous electrolyte solution.

The acid anhydride is preferably contained in the non-aqueous electrolyte solution. Meanwhile, as long as the acid anhydride can act in a non-aqueous secondary battery, at least one battery member selected from the group consisting of a positive electrode, a negative electrode and a separator may contain the acid anhydride. As a method of containing the acid anhydride in the battery member, for example, the acid anhydride may be contained in the battery member at the time of fabricating the battery member, or the battery member may be impregnated with the acid anhydride by a post-treatment typified by coating, dipping or spray drying on the battery member.

(Nitrogen-Containing Cyclic Compound)

The electrolyte solution according to the present embodiment may further include, as additives, in addition to the non-aqueous solvent and the lithium salt, a compound (nitrogen-containing cyclic compound) represented by the following formula (2):

[Chemical Formula 16]

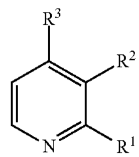

(2)

wherein substituents represented by $R^1$, $R^2$ and $R^3$ each independently represent a hydrogen atom, an alkyl group having 1 to 4 carbon atoms, a fluorine-substituted alkyl group having 1 to 4 carbon atoms, an alkoxy group having 1 to 4 carbon atoms, a fluorine-substituted alkoxy group having 1 to 4 carbon atoms, a phenyl group, a cyclohexyl group, a nitrile group, a nitro group, an amino group, a N,N'-dimethylamino group, or a N,N'-diethylamino group, and two or more of these substituents are hydrogen atoms.

In the present embodiment, it has been found that the use of acetonitrile as a non-aqueous solvent, a cyclic anion-containing lithium salt represented by the above formula (1) as a lithium salt, and a nitrogen-containing cyclic compound represented by the above formula (2) in combination enables an improvement in durability of the non-aqueous electrolyte solution or the non-aqueous secondary battery in a high temperature environment such as 85° C., 90° C., or higher than 90° C.

Specific examples of the nitrogen-containing cyclic compound include pyridine, 2-methylpyridine, 3-methylpyridine, 4-methylpyridine, 2-ethylpyridine, 3-ethylpyridine, 4-ethylpyridine, 2-(n-propyl)pyridine, 3-(n-propyl)pyridine, 4-(n-propyl)pyridine, 2-isopropylpyridine, 3-isopropylpyridine, 4-isopropylpyridine, 2-(n-butyl)pyridine, 3-(n-butyl) pyridine, 4-(n-butyl)pyridine, 2-(1-methylpropyl)pyridine, 3-(1-methylpropyl)pyridine, 4-(1-methylpropyl)pyridine, 2-(2-methylpropyl)pyridine, 3-(2-methylpropyl)pyridine, 4-(2-methylpropyl)pyridine, 2-(tert-butyl)pyridine, 3-(tert-butyl)pyridine, 4-(tert-butyl)pyridine, 2-trifluoromethylpyridine, 3-trifluoromethylpyridine, 4-trifluoromethylpyridine, 2-(2,2,2-trifluoroethyl)pyridine, 3-(2,2,2-trifluoroethyl)pyridine, 4-(2,2,2-trifluoroethyl)pyridine, 2-(pentafluoroethyl)pyridine, 3-(pentafluoroethyl)pyridine, 4-(pentafluoroethyl)pyridine, 2-methoxypyridine, 3-methoxypyridine, 4-methoxypyridine, 2-ethoxypyridine, 3-ethoxypyridine, 4-ethoxypyridine, 2-(n-propoxy)pyridine, 3-(n-propoxy)pyridine, 4-(n-propoxy)pyridine, 2-isopropoxypyridine, 3-isopropoxypyridine, 4-isopropoxypyridine, 2-(n-butoxy)pyridine, 3-(n-butoxy)pyridine, 4-(n-butoxy)pyridine, 2-(1-methylpropoxy)pyridine, 3-(1-methylpropoxy)pyridine, 4-(1-methylpropoxy)pyridine, 2-(2-methylpropoxy)pyridine, 3-(2-methylpropoxy)pyridine, 4-(2-methylpropoxy)pyridine, 2-trifluoromethoxypyridine, 3-trifluoromethoxypyridine, 4-trifluoromethoxypyridine, 2-(2,2,2-trifluoroethoxy)pyridine, 3-(2,2,2-trifluoroethoxy)pyridine, 4-(2,2,2-trifluoroethoxy)pyridine, 2-phenylpyridine, 3-phenylpyridine, 4-phenylpyridine, 2-cyclohexylpyridine, 3-cyclohexylpyridine, 4-cyclohexylpyridine, 2-cyanopyridine, 3-cyanopyridine, 4-cyanopyridine, 2-aminopyridine, 3-aminopyridine, 4-aminopyridine, 2-(N,N'-dimethylamino)pyridine, 3-(N,N'-dimethylamino) pyridine, 4-(N,N'-dimethylamino)pyridine, 2-(N,N'-diethylamino)pyridine, 3-(N,N'-diethylamino)pyridine and 4-(N,N'-diethylamino)pyridine. These compounds are used alone or in combination of two or more thereof. Of these, from the viewpoint of further improving the high-temperature durability of the non-aqueous electrolyte solution or the non-aqueous secondary battery, one or more compounds selected from the group consisting of pyridine and 4-(tert-butyl) pyridine are preferable as the nitrogen-containing cyclic compound.

When using a compound which is a double salt of LiF and Lewis acid as the fluorine-containing inorganic lithium salt, it is preferable that there is no steric hindrance around the nitrogen atom in the nitrogen-containing cyclic compound. Therefore, $R^1$ in the above formula (2) is preferably a hydrogen atom, and more preferably both R and $R^2$ are hydrogen atoms. When both $R^1$ and $R^2$ in the above formula (2) are hydrogen atoms, from the viewpoint of the electronic effect on the lone pair of electrons present on the nitrogen atom, $R^3$ in the above formula (2) is particularly preferably a hydrogen atom or a tert-butyl group. By containing the nitrogen-containing cyclic compound represented by the above formula (2) as an additive in the electrolyte solution of the present embodiment, it is possible to suppress the formation of a complex cation composed of transition metal and acetonitrile, exhibit excellent load characteristics, and to suppress self-discharge during high-temperature storage in the non-aqueous electrolyte solution containing acetonitrile having an excellent balance between the viscosity and the dielectric constant, and a fluorine-containing inorganic lithium salt. The content of the nitrogen-containing cyclic compound in the electrolyte solution in the present embodiment is not particularly limited, but is preferably 0.01 to 10% by weight, more preferably 0.02 to 5% by weight, and still more preferably 0.05 to 3% by weight, based on the total amount of the electrolyte solution.

In the non-aqueous electrolyte solution, the content of the nitrogen-containing cyclic compound represented by the above formula (2) to the content of the cyclic anion-containing lithium salt represented by the above formula (1) is 0.0001 or more and 3 or less, in terms of molar ratio. From the viewpoint of maximizing the effect of both compounds of suppressing the formation of complex cations composed of transition metal and acetonitrile by the effect of the nitrogen-containing cyclic compound represented by the above formula (2), such as a pyridine-based compound while weakening the coordinating ability of the nitrile group of acetonitrile by the effect of the cyclic anion-containing lithium salt, in the non-aqueous electrolyte solution, the content of the nitrogen-containing cyclic compound represented by the above formula (2) to the content of the cyclic anion-containing lithium salt represented by the formula (1) is preferably 0.0001 or more, more preferably 0.001 or more, and still more preferably 0.01 or more, in terms of molar ratio. The ratio is preferably 3 or less, more preferably 1 or less, and still more preferably 0.1 or less. When this molar ratio is within the above range, deterioration of the negative electrode SEI due to reductive deposition of the metal complex on the negative electrode is suppressed, leading to an improvement in long-term high-temperature durability.

The content of the nitrogen-containing cyclic compound represented by the formula (2) is preferably 0.01% by weight or more and 10% by weight or less, more preferably 0.02% by weight or more and 5% by weight or less, and still more preferably 0.05% by weight or more and T % by weight or less, relative to the total amount of the non-aqueous electrolyte solution. The nitrogen-containing cyclic compound represented by the formula (2) is preferably contained in the amount of 0.010% by weight or more, relative to the total amount of the non-aqueous electrolyte, from the viewpoint of the long-term high-temperature durability of the non-aqueous electrolyte solution or the non-aqueous secondary battery. The nitrogen-containing cyclic compound represented by the formula (2) is preferably contained in the amount of 10% by weight or less, relative to the total amount of the non-aqueous electrolyte solution, from the viewpoint of the output performance of the non-aqueous secondary battery in a low-temperature environment.

In the present embodiment, by adjusting the content of the nitrogen-containing cyclic compound within the above range, it is possible to suppress the reaction on the electrode surface without impairing the basic function of the non-aqueous secondary battery, thus reducing an increase in internal resistance accompanied by charging/discharging.

By preparing the electrolyte solution with the above composition, there is a tendency that all the cycle performance of the non-aqueous secondary battery, high output performance in a low temperature environment, and other battery characteristics can all be further improved.

(Silane-Based Compound)

The electrolyte solution according to the present embodiment may further include as the additive, in addition to a non-aqueous solvent and a lithium salt, at least one silane-based compound selected from the group consisting of compounds represented by the following general formula (3):

$$X—Si(OR^3)_{(3-m)}R^4{}_m \quad (3)$$

wherein $R^3$ and $R^4$ represent an alkyl group which may be substituted with an aryl group or an alkoxysilyl group or a halogen atom, or an aryl group which may be substituted with an alkyl group or an alkoxysilyl group or a halogen atom, and X represents at least one selected from the group consisting of groups represented by the following formula (L1):

[Chemical Formula 17]

(L1)

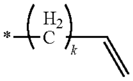

wherein k is an integer of 0 to 8, and * represents a bonding site to Si, the following formula (L2):

[Chemical Formula 18]

(L2)

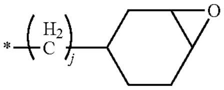

wherein j is an integer of 0 to 8, and * represents a bonding site to Si, the following formula (L3):

[Chemical Formula 19]

(L3)

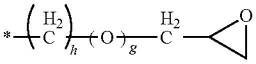

wherein h is an integer of 0 to 8, g is an integer of 0 or 1, and * represents a bonding site to Si and the following formula (L4):

[Chemical Formula 20]

(L4)

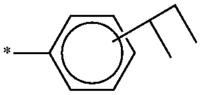

wherein * represents a bonding site to Si, and m is an integer of 0 to 2, the following general formula (4):

[Chemical Formula 21]

(4)

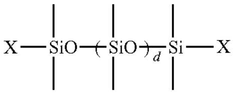

wherein X each independently represent at least one selected from the group consisting of groups represented by the formulas (L1) to (L4), and d is an integer of 0 to 10,000, the following general formula (5):

[Chemical Formula 22]

(5)

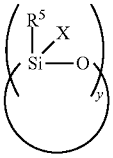

wherein $R^5$ each independently represent an alkyl group which may be substituted with an aryl group or a halogen atom, or an aryl group which may be substituted with an alkyl group or a halogen atom, y is an integer of 2 to 8, and X represents at least one selected from the group consisting of groups represented by the formulas (L1) to (L4), the following general formula (6):

$$X—Si(OR^3, OR^3)_{(3-m)}R^4{}_m \quad (6)$$

wherein $R^3$, $R^4$, X and m are as defined in the general formula (3), and $R^{3\prime}$ is an aryl group, an alkoxysilyl group, or an alkylene group which may be substituted with a halogen atom, the following general formula (7):

[Chemical Formula 23]

(7)

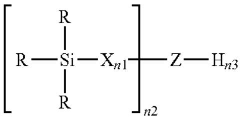

wherein, in the formula (7), R each independently represent a substituted or unsubstituted alkyl group having 1 to 20 carbon atoms, a substituted or unsubstituted alkenyl group having 2 to 20 carbon atoms, a substituted or unsubstituted alkynyl group having 2 to 20 carbon atoms, or a substituted or unsubstituted aryl group having 5 to 20 carbon atoms; X is O, S or NH; Z is P, P═O, B or Si; when Z is P or P═O, n1 is 1, n2 is an integer of 1 to 3, and n2+n3=3; when Z is B, n1 is 1, n2 is an integer of 1 to 3, and n2+n3=3; and when Z is Si, n1 is 0, n2 is an integer of 1 to 4, and n2+n3=4, and a polymer compound including a repeating unit represented by the following general formula (8):

[Chemical Formula 24]

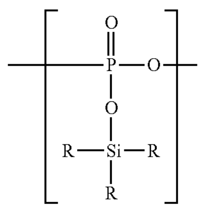

(8)

wherein R in the formula (8) has the same meaning as that of R in the formula (7), and diphenyldialkoxysilane.

In the present embodiment, it has been found that, by using acetonitrile as a non-aqueous solvent, the cyclic anion-containing lithium salt represented by the above formula (1) as a lithium salt, and the silane compound in combination, it is possible to improve the durability of the non-aqueous electrolyte solution or the non-aqueous secondary battery in a high temperature environment, for example, 85° C., 90° C., or higher than 90° C.

The compounds represented by the general formulas (3) to (8) and diphenyldialkoxysilane have the effect of suppressing the active points (active points of the positive electrode active material) which causes oxidative deterioration of the non-aqueous electrolyte solution. Therefore, by using such a compound, it is possible to provide a non-aqueous electrolyte solution capable of exhibiting excellent load characteristics and suppressing various deterioration phenomena when high-temperature storage or charging/discharging cycle is repeated, and a non-aqueous secondary battery. Due to the hydrogen fluoride (HF) trapping effect of diphenyldialkoxysilane, it is also possible to suppress deterioration of the positive electrode active material with a high nickel (Ni) ratio and reduce the Lewis acid catalytic activity of $PF_5$ contained in $LiPF_6$, and to suppress the decomposition of the acetonitrile solvent which contributes to high ionic conductivity.

Specific examples of the compounds represented by the general formulas (3) to (6) include triethoxyvinylsilane, allyltriethoxysilane, triethoxy(3-glycidyloxypropyl)silane, 2,4,6,8-tetramethyl-2,4,6,8-tetravinylcyclotetrasiloxane, allyltris(trimethylsilyloxy)silane, 1,3-divinyltetramethyldisiloxane, 1,1,1,3,5,5,5-heptamethyl-3-(3-glycidyloxypropyl)trisiloxane, 2,4,6-trimethyl-2,4,6-trivinylcyclotrisiloxane, allyltrimethoxysilane, 2-(3,4-epoxycyclohexyl)ethyltrimethoxysilane, 3-glycidyloxypropyltrimethoxysilane, [8-(glycidyloxy)-n-octyl]trimethoxysilane, trimethoxy(4-vinylphenyl)silane, trimethoxy(7-octen-1-yl)silane, vinyltrimethoxysilane, vinyltris(2-methoxyethoxy)silane, diethoxymethylvinylsilane, diethoxy(3-glycidyloxypropyl)methylsilane, dimethoxymethylvinylsilane, 3-glycidyloxypropyl(dimethoxy)methylsilane, vinyl group-terminated dimethylpolysiloxane, allyl group-terminated dimethylpolysiloxane, epoxy group-terminated dimethylpolysiloxane, glycidyl group-terminated dimethylpolysiloxane, cycloepoxy group-terminated dimethylpolysiloxane, alkylcycloepoxy group-terminated dimethylpolysiloxane and the like.

R in the above formula (7) is preferably a substituted or unsubstituted alkyl group having 1 to 20 carbon atoms, an unsubstituted alkyl group having 1 to 20 carbon atoms, or an alkyl group having 1 to 20 carbon atoms which is substituted with a halogen atom, more preferably an alkyl group having 1 to 6 or 1 to 4 carbon atoms, or a fluoroalkyl group having 1 to 6 or 1 to 4 carbon atoms, and particularly preferably a methyl group or a 2,2,2-trifluoroethyl group.

X is preferably an oxygen atom.

Specific examples of the compound in which Z in the above formula (7) is P include mono(trimethylsilyl)phosphite, tris(trimethylsilyl)phosphite, tris(2,2,2-trifluoroethyl) phosphite and the like.

Specific examples of the compound in which Z is P═O include tris(trimethylsilyl)phosphate and the like.

Specific examples of the compound in which Z is B include tris(trimethylsilyl)borate, tris(2,2,2-trifluoroethylsilyl)borate and the like.

Specific examples of the compound in which Z is Si include tris(trimethylsilyl)silane and the like.

Specific examples of the polymer compound including a repeating unit represented by the above formula (8) include trimethylsilyl polyphosphate and the like.

Diphenyldialkoxysilane can act as an electrode protection additive when a non-aqueous electrolyte solution is used for a non-aqueous secondary battery. Specific examples of the diphenyldialkoxysilane include diphenyldimethoxysilane, diphenyldiethoxysilane, diphenyldipropoxysilane and diphenyldibutoxysilane. These are used alone or in combination of two or more thereof. Of these, diphenyldimethoxysilane having the smallest molecular weight is more preferable because the number of mols per unit weight increases.

These are used alone or in combination of two or more thereof. Of these silane compounds listed above, from the viewpoint of further improving the high-temperature durability of the non-aqueous electrolyte solution or non-aqueous secondary battery, the compound represented by the above formula (3), tris(trimethylsilyl)phosphate, tris(trimethylsilyl)phosphite, tris(2,2,2-trifluoroethyl)phosphite and diphenyldialkoxysilane are preferable, and triethoxyvinylsilane and diphenyldimethoxysilane are more preferable.

In the non-aqueous electrolyte solution, the content of the silane-based compound to the content of the cyclic anion-containing lithium salt represented by the formula (1) is preferably 0.0001 or more and 1.5 or less, in terms of a molar ratio. From the viewpoint of maximizing the effect of both compounds of suppressing the active points (active points of the positive electrode active material) which cause oxidative deterioration of the non-aqueous electrolyte solution by the effect of the cyclic anion-containing lithium salt while weakening the coordinating ability of the nitrile group of acetonitrile by the effect of the cyclic anion-containing lithium salt, in the non-aqueous electrolyte solution, the content of the silane-based compound relative to the content of the cyclic anion-containing lithium salt represented by the formula (1) is preferably 0.0001 or more, more preferably 0.001 or more, and still more preferably 0.01 or more, in terms of a molar ratio, and this molar ratio is preferably 1.5 or less, more preferably 0.5 or less, and still more preferably 0.1 or less. When the molar ratio of the content of the silane-based compound to the content of the cyclic anion-containing lithium salt represented by the formula (1) is within the above range, deterioration of the negative electrode SEI due to reductive deposition of the metal complex on the negative electrode is suppressed, leading to an improvement in long-term high-temperature durability.

The content of the silane-based compound selected from the group consisting of the compounds represented by the general formulas (3) to (8) and diphenyldialkoxysilane is preferably 0.01% by weight or more and 10% by weight or less, more preferably 0.05% by weight or more and 5% by weight or less, and still more preferably 0.075% by weight or more and 3% by weight or less, relative to the total amount of the non-aqueous electrolyte solution (i.e., 100% by weight of the non-aqueous electrolyte solution). When the content is within this range, it is possible to effectively suppress the active points of the positive electrode active material which cause oxidative deterioration of the non-aqueous electrolyte solution while keeping the internal resistance of the non-aqueous secondary battery low.

<2-4. Other Optional Additives>

In the present embodiment, for the purpose of improving charging/discharging cycle properties, high-temperature storage and safety (for example, prevention of overcharging, etc.) of the non-aqueous secondary battery, it is also possible for the non-aqueous electrolyte solution to appropriately contain optional additives (additives other than acid anhydrides and electrode protection additives).

Examples of the optional additive include a sulfonic acid ester, diphenyl disulfide, cyclohexylbenzene, biphenyl, fluorobenzene, tert-butylbenzene, a phosphoric acid ester [ethyldiethylphosphonoacetate (EDPA); $(C_2H_5O)_2$ (P═O)—$CH_2$ (C═O)$OC_2H_5$, tris(trifluoroethyl) phosphate (TFEP); $(CF_3CH_2O)_3P{=}O$, triphenyl phosphate (TPP); $(C_6H_5O)_3P{=}O$, triallyl phosphate; $(CH_2{=}CHCH_2O)_3P{=}O$, etc.] and the like. In particular, the phosphoric acid ester has the effect of suppressing side reactions during storage and is effective as the optional additive.

When the non-aqueous electrolyte solution according to the present embodiment contains other optional additives, the content thereof is preferably within a range of 0.01% by weight or more and 10% by weight or less, more preferably 0.02% by weight or more and 5% by weight or less, and still more preferably 0.05 to 3% by weight, as per the total amount of the non-aqueous electrolyte solution. By adjusting the content of other optional additives within the above range, it tends to be possible to add more satisfactory battery characteristics without impairing the basic function of the non-aqueous secondary battery.

<3. Non-Aqueous Secondary Battery>

The non-aqueous electrolyte solution of the present embodiment can be used in a non-aqueous secondary battery.

The non-aqueous secondary battery according to the present embodiment is not particularly limited, but is configured with a positive electrode, a negative electrode, a separator and a non-aqueous electrolyte solution housed in a suitable battery exterior.

Figure 2:
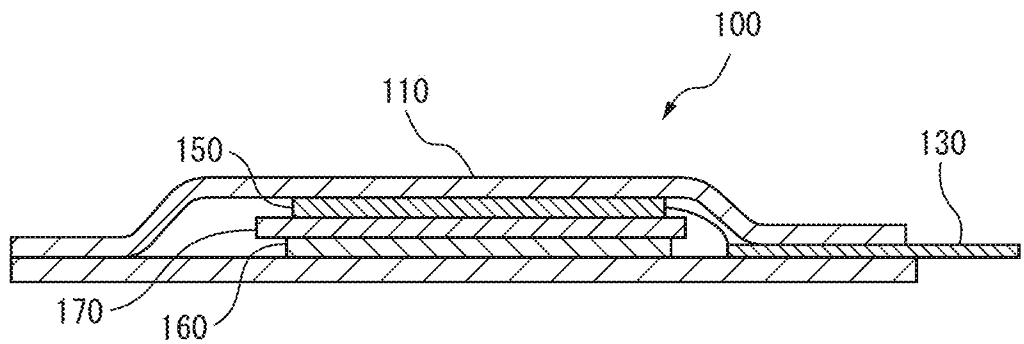
FIG. 2 is a cross-sectional view taken along lines A-A of the non-aqueous secondary battery of FIG. 1.

Specifically, the non-aqueous secondary battery according to the present embodiment may be a non-aqueous secondary battery 100 shown in FIG. 1 and FIG. 2. Here, FIG. 1 is a plan view schematically illustrating a non-aqueous secondary battery, and FIG. 2 is a cross-sectional view taken along lines A-A of FIG. 1.

The non-aqueous secondary battery 100 shown in FIG. 1 and FIG. 2 is composed of a pouch-type cell. The non-aqueous secondary battery 100 houses a laminated electrode body formed by stacking a positive electrode 150 and a negative electrode 160 via a separator 170 in a space 120 of a battery exterior 110, and a non-aqueous electrolyte solution (not shown). The battery exterior 110 is made of, for example, an aluminum laminated film, and is sealed by heat-sealing upper and lower films at the outer periphery of the space formed by the two aluminum laminated films. The laminated body in which the positive electrode 150, the separator 170 and the negative electrode 160 are stacked in this order is impregnated with the non-aqueous electrolyte solution. However, in FIG. 2, in order to avoid complicating the drawing, the respective layers constituting the battery exterior 110 and the respective layers of the positive electrode 150 and the negative electrode 160 are not shown separately.

The aluminum laminate film constituting the battery exterior 110 is preferably an aluminum laminate film in which both sides of the aluminum foil are coated with a polyolefin-based resin.

The positive electrode 150 is connected to a positive electrode lead body 130 in the non-aqueous secondary battery 100. Although not shown, the negative electrode 160 is also connected to a negative electrode lead body 140 in the non-aqueous secondary battery 100. One end of each of the positive electrode lead body 130 and the negative electrode lead body 140 is pulled out to the outside of the battery exterior body 110 so that they can be connected to an external device or the like, and their ionomer portions are heat-sealed together with one side of the battery exterior body 110.

In the non-aqueous secondary battery 100 shown in FIG. 1 and FIG. 2, the positive electrode 150 and the negative electrode 160 each have one laminated electrode body, but the number of laminated positive electrodes 150 and negative electrodes 160 can be appropriately increased by the capacity design. In the case of a laminated electrode body having a plurality of positive electrodes 150 and negative electrodes 160, tabs of the same electrode may be joined by welding or the like, and then joined to one lead body by welding or the like and taken out of the battery. As the tab of the same pole, a mode composed of the exposed portion of a current collector, a mode configured by welding a metal piece to the exposed portion of a current collector, and the like are possible.

The positive electrode 150 is composed of a positive electrode current collector and a positive electrode active material layer. The negative electrode 160 is composed of a negative electrode current collector and a negative electrode active material layer.

The positive electrode active material layer contains a positive electrode active material, and the negative electrode active material layer contains a negative electrode active material.

The positive electrode 150 and the negative electrode 160 are disposed so that the positive electrode active material layer and the negative electrode active material layer face each other via the separator 170.

Hereinafter, each element constituting the non-aqueous secondary battery according to the present embodiment will be described in order.

<4. Positive Electrode>

The positive electrode 150 is composed of a positive electrode active material layer made from a positive electrode mixture and a positive electrode current collector. The positive electrode mixture contains a positive electrode active material, and further contain a conductive aid and/or a binder as necessary.

The positive electrode active material layer contains a material capable of occluding and releasing lithium ions as the positive electrode active material. Such material is capable of obtaining high voltage and high energy density.

The positive electrode active material includes, for example, a positive electrode active material containing at least one transition metal element selected from the group consisting of Ni, Mn and Co, and is suitably at least one Li-containing metal oxide selected from lithium (Li)- containing metal oxides represented by the following general formula $(a^t)$

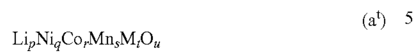

$$Li_pNi_qCo_rMn_sM_tO_u \quad (a^t)$$

wherein M is at least one metal selected from the group consisting of Al, Sn, In, Fe, V, Cu, Mg, Ti, Zn, Mo, Zr, Sr and Ba, p, q, r, s, t and u are within the following ranges: $0<p<1.3$, $0<q<1.2$, $0<r<1.2$, $0\leq s<0.5$, $0\leq t<0.3$, $0.7\leq q+r+s+t\leq 1.2$, and $1.8<u<2.2$, and p is the value determined by the charging/discharging state of the battery.

Specific examples of the positive electrode active material include lithium cobalt oxide typified by $LiCoO_2$; lithium manganese oxide typified by $LiMnO_2$, $LiMn_2O_4$ and $Li_2Mn_2O_4$; lithium nickel oxide typified by $LiNiO_2$; and lithium-containing composite metal oxide represented by Liz $MO_2$, typified by $LiNi_{1/3}Co_{1/3}Mn_{1/3}O_2$, $LiNi_{0.5}Co_{0.2}Mn_{0.3}O_2$ and $LiNi_{0.8}CO_{0.2}O_2$ (wherein M represents two or more metal elements selected from the group consisting of Ni, Mn, Al and Mg, and z represents a number of more than 0.9 and less than 1.2).

In particular, when a Ni content ratio q of the Li-containing metal oxide represented by the general formula $(a^t)$ satisfies: $0.5<q<1.2$, it is preferable because both a reduction in usage of Co, which is rare metal, and higher energy density is achieved. Examples of the positive electrode active material include lithium-containing composite metal oxide typified by $LiNi_{0.6}Co_{0.2}Mn_{0.2}O_2$, $LiNi_{0.75}Co_{0.15}Mn_{0.15}O_2$, $LiNi_{0.8}Co_{0.1}Mn_{0.1}O_2$, $LiNi_{0.85}Co_{0.075}Mn_{0.075}O_2$, $LiNi_{0.8}CO_{0.15}Al_{0.05}O_2$, $LiNi_{0.81}Co_{0.1}Al_{0.09}O_2$, $LiNi_{0.85}C_{0.1}Al_{0.05}O_2$ and the like.

As the Ni content ratio of the Li-containing metal oxide increases, deterioration tends to progress at a low voltage. The layered rock salt type positive electrode active material represented by the general formula $(a^t)$ essentially has the active point which causes oxidative deterioration of the electrolyte solution. This active point sometimes unintentionally consumes the electrode protection additive.

These additive decomposition products taken in and deposited on the positive electrode side not only increase the internal resistance of the non-aqueous secondary battery, but also accelerate deterioration of the lithium salt. In particular, when $LiPF_6$ is contained as a lithium salt, it is considered that HF is generated by deterioration, leading to acceleration of the elution of the transition metal. In a non-aqueous electrolyte solution containing acetonitrile as a non-aqueous solvent, a complex of the metal cation and acetonitrile is formed, thus accelerating deterioration of the battery.

Furthermore, deterioration of the electrode protection additive or deterioration of the lithium salt makes the original purpose of protecting the surface of the negative electrode insufficient. In particular, in a non-aqueous electrolyte solution containing acetonitrile as a non-aqueous solvent, if the negative electrode surface is not sufficiently protected, the reductive decomposition of acetonitrile proceeds and the battery performance rapidly deteriorates, causing a fatal problem.

In order to deactivate the active point which essentially causes oxidative deterioration of the non-aqueous electrolyte solution, it is important to control the Jahn-Teller strain or to coexist with a component which acts as a neutralizer. Therefore, the positive electrode active material preferably contains at least one metal selected from the group consisting of Al, Sn, In, Fe, V, Cu, Mg, Ti, Zn, Mo, Zr, Sr and Ba.

For the same reason, it is preferable that the surface of the positive electrode active material is coated with a compound containing at least one metal element selected from the group consisting of Zr, Ti, Al and Nb. It is more preferable that the surface of the positive electrode active material is coated with an oxide containing at least one metal element selected from the group consisting of Zr, Ti, Al and Nb. It is particularly preferable that the surface of the positive electrode active material is coated with at least one oxide selected from the group consisting of $ZrO_2$, $TiO_2$, $Al_2O_3$, $NbO_3$ and $LiNbO_2$ because it does not inhibit the permeation of lithium ions.

When using at least one Li-containing metal oxide selected from lithium (Li)-containing metal oxides represented by the general formula $(a^t)$, the molar ratio of the content of the cyclic anion-containing lithium salt relative to the content of $LiPF_6$ is preferably 3 or more, and preferably 150 or less. When the molar ratio of the content of the cyclic anion-containing lithium salt to the content of $LiPF_6$ is within the above range, in case the Li-containing metal oxide containing Ni is used for the positive electrode, it is possible to obtain excellent high-temperature durability as well as excellent output characteristics and low-temperature characteristics by forming a negative electrode SEI having an excellent balance between the organic component derived from the cyclic anion-containing lithium salt and the inorganic component derived from $LiPF_6$ while suppressing the elution of the positive electrode metal.

When using at least one Li-containing metal oxide selected from the lithium (Li)-containing metal oxides represented by the general formula $(a^t)$, and the Ni content ratio q of the Li-containing metal oxide represented by the general formula $(a^t)$ satisfies $q\leq 0.5$, the content of acetonitrile is preferably 10% by volume or more, and preferably 49% by volume or less, relative to the total amount of the non-aqueous solvent. When the Ni content ratio q of the Li-containing metal oxide represented by the general formula $(a^t)$ satisfies $0.5<q<1.2$, the content of acetonitrile is preferably 10% by volume or more, and preferably 35% by volume or less, relative to the total amount of the non-aqueous solvent. When the content of acetonitrile is within the above range, in case the Li-containing metal oxide containing Ni is used for the positive electrode, acetonitrile suppresses the elution of the transition metal caused by coordination with transition metal in the positive electrode active material, and also suppress physical peeling between the positive electrode Al current collector and the positive electrode active material, thus making it possible to obtain excellent output characteristics and low-temperature characteristics as well as excellent high-temperature durability.

When using at least one Li-containing metal oxide selected from the lithium (Li)-containing metal oxides represented by the general formula $(a^t)$, and the Ni content ratio q of the Li-containing metal oxide represented by the general formula $(a^t)$ satisfies $q\leq 0.5$, the content of the cyclic anion-containing lithium salt represented by the formula (1) relative to the content of acetonitrile is preferably 0.06 or more, more preferably 0.075 or more, still more preferably 0.1 or more, and yet more preferably 0.15 or more, and is preferably 0.79 or less, more preferably 0.75 or less, still more preferably 0.5 or less, and yet more preferably 0.25 or less, in molar ratio. When the content is within the above range, in case a Li-containing metal oxide containing Ni is used for the positive electrode, by effectively suppressing the elution of the positive electrode metal at high temperature due to acetonitrile and physical peeling between the positive electrode Al current collector and the positive electrode active material, it possible to obtain excellent high-temperature durability as well as excellent output characteristics and low-temperature characteristics. When the Ni content ratio q of the Li-containing metal oxide represented by the general formula ($a^t$) satisfies $0.5<q<1.2$, the content of cyclic anion-containing lithium salt represented by the formula (1) salt to the content of acetonitrile is preferably 0.1 or more, more preferably 0.15 or more, and still more preferably 0.17 or more, and is preferably 1.5 or less, more preferably 0.5 or less, and still more preferably 0.4 or less, in terms of a molar ratio. When the content is within the above range, even when using a Li-containing metal oxide, which has a high Ni content ratio and is likely to cause the elution of the positive electrode metal at high temperature, for the positive electrode, by effectively suppressing the elution of the positive electrode metal at high temperature due to acetonitrile and physical peeling between the positive electrode Al current collector and the positive electrode active material, it possible to obtain excellent high-temperature durability as well as excellent output characteristics and low-temperature characteristics.

In the non-aqueous secondary battery according to the present embodiment, it is preferable to use a lithium phosphorus metal oxide having an olivine crystal structure containing iron (Fe) atoms, and it is more preferable to a lithium phosphorus metal oxide having an olivine structure represented by the following formula (Xba):

(Xba)

wherein $M^{II}$ represents one or more transition metal elements containing at least one transition metal element including Fe, and w is the value determined by the charging/discharging state of the battery and represents the number of 0.05 to 1.10. For the purpose of stabilizing the structure, these lithium-containing compounds may be those in which transition metal elements are partially substituted with Al, Mg or other transition metal elements, those in which these metal elements are included in grain boundaries, those in which oxygen atoms are partially substituted with a fluorine atom or the like, those in which a surface of the positive electrode active material is partially coated with other positive electrode active materials, and the like.

Examples of the positive electrode active material include phosphate metal oxides containing lithium and a transition metal element, and silicate metal oxides containing lithium and a transition metal element. From the viewpoint of obtaining a higher voltage, the lithium-containing metal oxide is particularly preferably phosphate metal oxide containing lithium and at least one transition metal element selected from the group consisting of Co, Ni, Mn, Fe, Cu, Zn, Cr, V and Ti, and is more preferably phosphate metal oxide containing Li and Fe from the viewpoint of the lithium phosphorus metal oxide represented by the above formula (Xba).

It is possible to use, as the lithium phosphorus metal oxide different from the lithium phosphorus metal oxide represented by the above formula (Xba), a compound represented by the following formula (Xa):

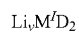

(Xa)

wherein D represents a chalcogen element and $M^I$ represents one or more transition metal elements containing at least one transition metal element, and the value of v is the value determined by the charging/discharging state of the battery, and represents the number of 0.05 to 1.10.

When using a lithium phosphorus metal oxide having an olivine structure represented by the above formula (Xba), the content of acetonitrile is preferably 30% by volume or more, and preferably 66% by volume or less, relative to the total amount of the non-aqueous solvent. When the content of acetonitrile is within the above range, even when using a lithium phosphorus metal oxide, which is excellent in stability of the positive electrode crystal structure and is relatively less likely to cause the elution of the positive electrode metal at high temperature, for the positive electrode, it is possible to suppress the elution of the transition metal caused by coordination of acetonitrile with the transition metal in the positive electrode active material while increasing the ionic conductivity, and to suppress physical peeling between the positive electrode Al current collector and the positive electrode active material, thus making it possible to obtain excellent output characteristics and low-temperature characteristics as well as excellent high-temperature durability.

When using a lithium phosphorus metal oxide having an olivine structure represented by the above formula (Xba), the content of the cyclic anion-containing lithium salt represented by the formula (1) relative to the content of acetonitrile is preferably 0.05 or more, more preferably 0.075 or more, still more preferably 0.08 or more, and yet more preferably 0.1 or more, and is preferably 0.4 or less, more preferably 0.3 or less, still more preferably 0.27 or less, and yet more preferably 0.2 or less, in terms of a molar ratio. When the molar ratio of the content of the cyclic anion-containing lithium salt to the content of acetonitrile is within the above range, even when using a lithium phosphorus metal oxide, which is excellent in stability of the positive electrode crystal structure and is relatively less likely to cause the elution of the positive electrode metal at high temperature, for the positive electrode, it is possible to obtain excellent high-temperature durability as well as excellent output characteristics and low-temperature characteristics by effectively suppressing the elution of the positive electrode metal due to acetonitrile at high temperature, and physical peeling between the positive electrode Al current collector and the positive electrode active material.

When using a lithium phosphorus metal oxide having an olivine structure represented by the above formula (Xba), the molar ratio of the content of the cyclic anion-containing lithium salt to the content of $LiPF_6$ is preferably 3 or more, and preferably 150 or less. When the molar ratio of the content of the cyclic anion-containing lithium salt to the content of $LiPF_6$ is within the above range, even when using a lithium phosphorus metal oxide, which is excellent in stability of the positive electrode crystal structure and is relatively less likely to cause the elution of the positive electrode metal at high temperature, for the positive electrode, it is possible to obtain excellent high-temperature durability as well as excellent output characteristics and low-temperature characteristics by forming a negative electrode SEI having an excellent balance between the organic component derived from the cyclic anion-containing lithium salt and the inorganic component derived from $LiPF_6$ while suppressing the elution of the positive electrode metal.

As the positive electrode active material in the present embodiment, only the lithium-containing metal oxide as described above may be used, or other positive electrode active materials may be used together with the lithium-containing metal oxide. Examples of other positive electrode active materials include metal oxides or metal chalcogenides having a tunnel structure and a layered structure; sulfur; conductive polymers, and the like. Examples of the metal oxides or metal chalcogenide having a tunnel structure and a layered structure include oxides of metals other than lithium, typified by $MnO_2$, $FeO_2$, $FeS_2$, $V_2O_5$, $V_6O_{13}$, $TiO_2$, $TiS_2$, $MoS_2$ and $NbSe_2$; sulfides; selenides, and the like. Examples of the conductive polymer include conductive polymers typified by polyaniline, polythiophene, polyacetylene and polypyrrole.

The above-described other positive electrode active materials may be used alone, or in combination of two or more thereof. Since lithium ions can be occluded and released in a reversible and stable manner, and high energy density can be achieved, it is preferable that the positive electrode active material layer contains at least one transition metal element selected from Ni, Mn and Co.

When a lithium-containing metal oxide and other positive electrode active materials are used in combination as the positive electrode active material, a ratio of both used is preferably 80% by weight or more, and more preferably 85% by weight or more, as the ratio of the lithium-containing metal oxide used to the entire positive electrode active material used.

The positive electrode active material layer is formed by coating a positive electrode mixture-containing slurry, which is prepared by dispersing a positive electrode mixture obtained by mixing a positive electrode active material, and a conductive aid and a binder as necessary, in a solvent, onto a positive electrode current collector, followed by drying (removing the solvent) and pressing as necessary. It is possible to use, as such a solvent, a known solvent. Examples thereof include N-methyl-2-pyrrolidone, dimethylformamide, dimethylacetamide, water and the like.

Examples of the conductive aid include graphite; carbon black typified by acetylene black and Ketjen black; and carbon fibers. The content of the conductive aid is preferably set at 1 part by weight to 20 parts by weight, more preferably 2 parts by weight to 15 parts by weight, as the amount per 100 parts by weight of the positive electrode active material.

If the content of the conductive aid is too large, the volumetric energy density decreases, but if it is too small, electron conduction paths are insufficiently formed. In particular, since the positive electrode active material layer has lower electron conductivity compared to the negative electrode active material layer, if the amount of the conductive aid is insufficient, it becomes impossible to take out a predetermined battery capacity when the non-aqueous secondary battery is discharged or charged at a high current value. Therefore, in applications that require high output and/or rapid charging, it is preferable to increase the content of the conductive aid in the range where the reaction based on electron transfer is not controlled by the rate.

Examples of the binder include polyvinylidene fluoride (PVDF), polytetrafluoroethylene (PTFE), polyacrylic acid, carboxymethylcellulose, styrene-butadiene rubber and fluororubber. The content ratio of the binder is preferably set at 6 parts by weight or less, and more preferably 0.5 to 4 parts by weight, relative to 100 parts by weight of the positive electrode active material.

The positive electrode current collector is composed of, for example, a metal foil such as an aluminum foil, a nickel foil or a stainless steel foil. Further, the positive electrode current collector may be carbon-coated on a surface thereof or may be processed into a mesh shape. The thickness of the positive electrode current collector is preferably 5 to 40 μm, more preferably 7 to 35 μm, and still more preferably 9 to 30 μm.

The basis weight per one side of the positive electrode excluding the positive electrode current collector is preferably 15 $mg/cm^2$ or more, more preferably 17.5 $mg/cm^2$ or more, and still more preferably 24 $mg/cm^2$ or more, from the viewpoint of improving the volumetric energy density of the non-aqueous secondary battery. The basis weight per one side of the positive electrode excluding the positive electrode current collector is preferably 200 $mg/cm^2$ or less, more preferably 100 $mg/cm^2$ or less, and still more preferably 60 $mg/cm^2$ or less. By limiting the basis weight per one side of the positive electrode excluding the positive electrode current collector within the above range, a non-aqueous secondary battery capable of realizing high output performance can be provided even when an electrode active material layer with a high volumetric energy density is designed.

Here, when the electrode active material layer is formed on one side of the current collector, the basis weight indicates the weight of the electrode active material contained per 1 $cm^2$ of the electrode area, and when the electrode active material layer is formed on both sides of the current collector, the basis weight indicates the weight of the electrode active material contained per 1 $cm^2$ of electrode area on each side. When a large amount of the electrode active material is applied to the electrode current collector, the amount of electrode active material per unit volume of the battery becomes relatively larger than that of other battery materials that are not related to battery capacity, such as current collector foils and separators, so that the battery has a higher capacity.

The basis weight when the electrode active material layer is formed on one side of the current collector can be calculated by the following formula (12).

$$\text{Basis weight}\left[\text{mg}/\text{cm}^2\right] = (\text{electrode weight [mg]} - \text{electrode current collector weight [mg]}) / \text{electrode area}\left[\text{cm}^2\right] \quad (12)$$

<5. Negative Electrode>

The negative electrode 160 is composed of a negative electrode active material layer made from a negative electrode mixture, and a negative electrode current collector. The negative electrode 160 can act as a negative electrode of a non-aqueous secondary battery.

The negative electrode mixture contains a negative electrode active material, and may further contain a conductive aid and a binder as necessary.

It is possible to use, as the negative electrode active material, include amorphous carbon (hard carbon, soft carbon), graphite (artificial graphite, natural graphite), thermally decomposed carbon, coke, glassy carbon, calcined product of organic polymer compound, mesocarbon microbeads, carbon materials typified by carbon fiber, activated carbon, graphite, carbon colloid and carbon black, metallic lithium, metal oxides, metal nitrides, lithium alloys, tin alloys, silicon alloys, intermetallic compounds, organic compounds, inorganic compounds, metal complexes and organic polymer compounds. The negative electrode active materials may be used alone, or in combination of two or more thereof.

It is preferable to use, as the negative electrode active material of the present embodiment, a compound containing graphite or one or more elements selected from the group consisting of Ti, V, Sn, Cr, Mn, Fe, Co, Ni, Zn, Al, Si and B.

It is preferable that the negative electrode active material layer contains, as the negative electrode active material, a material capable of occluding lithium ions at a lower potential than 0.4V vs. $Li/Li^+$ from the viewpoint of increasing the battery voltage.

The negative electrode active material layer is formed by applying a negative electrode mixture-containing slurry, which is prepared by dispersing a negative electrode mixture of a negative electrode active material and, as necessary, a conductive aid and a binder in a solvent, to a negative electrode current collector and drying (removing a solvent), followed by pressing as necessary. Known solvents can be used as such solvents, and examples thereof include N-methyl-2-pyrrolidone, dimethylformamide, dimethylacetamide, water and the like.

Examples of the conductive aid include carbon black typified by acetylene black and Ketjen black, carbon fibers and graphite. The content ratio of the conductive aid is preferably set at 20 parts by weight or less, and more preferably 0.1 to 10 parts by weight, relative to 100 parts by weight of the negative electrode active material.

Examples of the binder include carboxymethyl cellulose, PVDF, PTFE, polyacrylic acid and fluororubber. A diene-based rubber such as a styrene-butadiene rubber can also be exemplified. The content ratio of the binder is preferably set at 10 parts by weight or less, and more preferably 0.5 to 6 parts by weight, relative to 100 parts by weight of the negative electrode active material.

The negative electrode current collector is made of, for example, a metal foil such as a copper foil, a nickel foil or a stainless steel foil. Further, the negative electrode current collector may be carbon-coated on a surface thereof or may be processed into a mesh shape. The thickness of the negative electrode current collector is preferably 5 to 40 μm, more preferably 6 to 35 μm, and still more preferably 7 to 30 μm.

<6. Separator>

The non-aqueous secondary battery 100 in the present embodiment preferably includes a separator 170 between a positive electrode 150 and a negative electrode 160 from the viewpoint of preventing short circuits between the positive electrode 150 and the negative electrode 160 and imparting the safety such as shutdown. As the separator 170, an insulating thin film having high ion permeability and excellent mechanical strength is preferable. Examples of the separator 170 include a woven fabric, a nonwoven fabric, a synthetic resin microporous membrane and the like, and of these, the synthetic resin microporous membrane is preferable.

It is possible to preferably use, as the synthetic resin microporous membrane, for example, a microporous membrane containing polyethylene or polypropylene as a main component, or a polyolefin-based microporous membrane such as a microporous membrane containing both of these polyolefins. Examples of the nonwoven fabric include porous membranes made of heat-resistant resins such as glass, ceramic, polyolefin, polyester, polyamide, liquid crystal polyester and aramid.

The separator 170 may have a configuration in which one type of a microporous membrane is laminated in a single layer or a plurality of layers, or a configuration in which two or more types of microporous membranes are laminated. The separator 170 may have a configuration in which a mixed resin material prepared by melt-kneading two or more types of resin materials is used to form a single layer or a plurality of layers.

For the purpose of imparting the functionality, inorganic particles may be present on the surface layer or inside the separator, and other organic layers may be further coated or laminated. Moreover, the separator may include a cross-linked structure. These techniques may be combined as necessary to enhance the safety performance of the non-aqueous secondary battery.

By using such a separator 170, it is possible to realize satisfactory input/output characteristics and low self-discharge characteristics, which are particularly required for lithium ion batteries for high power applications. The thickness of the separator is preferably 1 μm or more from the viewpoint of the separator strength, preferably 500 μm or less, more preferably 5 m or more and 30 μm or less, and still more preferably 10 μm or more and 25 μm or less, from the viewpoint of the permeability, The thickness of the separator is more preferably 15 μm or more and 20 μm or less when emphasis is placed on the short-circuit resistance, but when emphasis is placed on the high energy density, it is more preferably 10 μm or more and less than 15 μm. The porosity of the separator is preferably 30% or more and 90% or less, more preferably 35% or more and 80% or less, and still more preferably 40% or more and 70% or less, from the viewpoint of following the rapid movement of lithium ions at high output. When priority is given to improving the output performance while ensuring the safety, the porosity is particularly preferably 50% or more and 70% or less is, and when emphasizing both short-circuit resistance and output performance, the porosity is particularly preferably 40% or more and less than 50%. The air permeability of the separator is preferably 1 second/100 $cm^3$ or more and 400 seconds/100 $cm^3$ or less, more preferably 100 seconds/100 $cm^3$ or more and 350 seconds/100 $cm^3$ or less, from the viewpoint of a balance between the separator thickness and porosity. When emphasizing both short-circuit resistance and output performance, the air permeability is particularly preferably 150 seconds/100 $cm^3$ or more and 350 seconds/100 $cm^3$ or less, and when priority is given to improving the output performance while ensuring the safety, the air permeability is particularly preferably 100 seconds/100 $cm^3$ or more and less than 150 seconds/100 $cm^3$. Meanwhile, when a non-aqueous electrolyte solution with low ionic conductivity is combined with a separator within the above range, the migration rate of lithium ions is not controlled by the structure of the separator, but controlled by high ionic conductivity of the electrolyte solution, thus failing to obtain the respected input/output characteristics. Therefore, the ionic conductivity of the non-aqueous electrolyte solution at 25° C. is preferably 10 mS/cm or more, more preferably 15 mS/cm or more, and still more preferably 20 mS/cm or more. However, the thickness, air permeability and porosity of the separator, and the ionic conductivity of the non-aqueous electrolyte solution are not limited to the above examples.

<7. Battery Exterior>

It is possible to employ, as a configuration of a battery exterior 110 of the non-aqueous secondary battery 100 in the present embodiment, for example, a battery exterior of either a battery can (not shown) or a laminated film exterior. It is possible to use, as the battery can, for example, a rectangular, prismatic, cylindrical, elliptical, flat, coin-shaped or button-shaped metal can made of steel, stainless steel (SUS), aluminum or a clad material. It is possible to use, as the laminated film exterior, for example, a laminated film having a three-layer structure of hot-melt resin/metal film/resin.

The laminated film exterior can be used as an exterior in a state where two sheets are stacked with the hot melt resin side facing inward, or bent so that the heat-melting resin side faces inward, and then the end is sealed by heat sealing. When the laminated film exterior is used, a positive electrode lead body 130 (or a lead tab connected to a positive electrode terminal and a positive electrode terminal) may be connected to a positive electrode current collector, and a negative electrode lead body 140 (or a negative electrode terminal and a negative electrode terminal) may be connected to a negative electrode current collector. In this case, the laminated film outer body may be sealed in a state where the ends of the positive electrode lead body 130 and the negative electrode lead body 140 (or lead tabs connected to the positive electrode terminal and the negative electrode terminal respectively) are pulled out to the outside of the battery exterior.

The battery exterior of the non-aqueous secondary battery in the present embodiment preferably contains aluminum in at least a part of the liquid contact layer with the non-aqueous electrolyte solution on the positive electrode side. By using such a battery exterior, corrosion deterioration of the battery exterior can be suppressed to the maximum extent, thus enabling an improvement in high-temperature durability and cycle characteristics of the battery. The liquid contact layer may be the same material as that of a main body, i.e., a liquid contact layer of the main body, or may be a layer obtained by coating the main body with another material.

Aluminum contained in the liquid contact layer may be present in a part of the liquid contact layer with the non-aqueous electrolyte solution, or may be present in the entire liquid contact layer. It is more preferable that the liquid contact layer is entirely made of aluminum in order to minimize corrosion deterioration of the battery exterior and to maximize an improvement in the cycle characteristics of the battery.

Moreover, the battery exterior of the non-aqueous secondary battery in the present embodiment may be one in which the main body is made of metal other than aluminum, and at least a part of the liquid contact layer with the non-aqueous electrolyte solution contains aluminum. The liquid contact layer containing aluminum can be formed by plating, clad or the like. More preferably, it is composed of an aluminum clad. A clad is a material in which two or more types of different metals are laminated to each other, and it is commonly assumed that the interfaces of dissimilar metals are diffusion-bonded (has an alloy layer). The clad can be fabricated by pressing or explosive welding.

In the case of a coin-type non-aqueous secondary battery, the battery exterior preferably contains aluminum in at least a part of the liquid contact layer on the positive electrode side, and more preferably aluminum is cladded on at least a part of the liquid contact layer on the positive electrode side.

When the body metal layer of the battery exterior is made of metal other than aluminum, the body metal is not particularly limited, but is preferably austenitic stainless steels such as SUS304, SUS316 and SUS316L; austenitic-ferritic stainless steels such as SUS329J1 and SUS329J3L; ferritic stainless steels such as SUS405 and SUS430; and martensitic stainless steels such as SUS403 and SUS410, from the viewpoint of preventing corrosion on the outside of a container.

Regarding the battery exterior body in the present embodiment, at least a part of the contact portion with the non-aqueous electrolyte solution on the positive electrode side may be made of iron or an iron alloy. By using iron or an iron alloy for the battery exterior body, it is possible to provide a battery having excellent impact resistance and safety. The battery exterior body and the positive electrode current collector may be separate or integrated. As for the configuration of a battery exterior 110 of a non-aqueous secondary battery 100 in the present embodiment, for example, either a battery can (not shown) or a laminated film exterior can be used. It is possible to use, as the battery can, for example, a metal can made of steel, stainless steel (SUS), a clad material or the like, such as a rectangular, prismatic, cylindrical, elliptical, flat, coin-shaped or button-shaped can. It is possible to use, as the laminate film exterior body, for example, a laminated film having a three-layer structure of hot-melt resin/metal film/resin.

In the present embodiment, the surface of the battery exterior body made of iron or an iron alloy may not be coated. Increasing the energy density of the non-aqueous secondary battery increases the risk of battery ignition, thus requiring further safety measures. Therefore, from the viewpoint of the impact resistance, it is a useful technique to use a high-strength iron or iron alloy battery casing instead of a lightweight aluminum battery exterior.

Since iron or iron alloy has a lower cost than aluminum, when a large number of batteries such as electric vehicles are mounted, the use of an iron or iron alloy battery exterior can significantly reduce costs.

It has been clarified by the studies of the present inventors that a lithium-ion battery using an acetonitrile-containing electrolyte solution corrodes metal components of the battery exterior body during charging to cause overcharging in case the material of the battery exterior including at least a part of the contact portion with the non-aqueous electrolyte solution on the positive electrode side is iron or an iron alloy. This phenomenon is a problem newly found by the present inventors and is not described at all in PTLs 1 to 8.

By using the cyclic anion-containing lithium salt represented by the formula (1) in the acetonitrile-containing non-aqueous electrolyte solution, overcharging due to the corrosion of the iron or iron alloy battery exterior body can be suppressed. The mechanism is presumed as follows.

The cyclic anion-containing lithium salt represented by the formula (1) dissociates into lithium ions and cyclic anions in the non-aqueous electrolyte solution containing acetonitrile. The cyclic anion electrically interacts with acetonitrile and weakens the metal coordination ability of the nitrile group of acetonitrile. As a result, acetonitrile can suppress the metal elution caused by forming a complex with the transition metal in iron or an iron alloy, and migration of the metal complex to the negative electrode can be suppressed. Therefore, overcharge due to continuous reductive deposition of the metal complex at the negative electrode can be suppressed.

When the material of the battery exterior body is stainless steel (SUS), the stainless steel is preferably austenitic stainless steels such as SUS304, SUS316 and SUS316L; austenitic-ferritic stainless steels such as SUS329J1 and SUS329J3L; ferritic stainless steels such as SUS405 and SUS430; and martensitic stainless steels such as SUS403 and SUS410, from the viewpoint of preventing corrosion on the inside or outside of a container.

<8. Method for Fabricating Battery>

The non-aqueous secondary battery 100 in the present embodiment is fabricated by a known method using the non-aqueous electrolyte solution described above, a positive electrode 150 having a positive electrode active material layer on one or both sides of a current collector, a negative electrode 160 having a negative electrode active material layer on one or both sides of a current collector, and a battery exterior 110, and a separator 170 as necessary.

First, a laminated body composed of a positive electrode 150, a negative electrode 160 and a separator 170 as necessary is formed. For example, it is possible to employ: a mode in which a long positive electrode 150 and negative electrode 160 are wound in a laminated state where a long separator is interposed into the space between the positive electrode 150 and the negative electrode 160 to form a laminated body having a wound structure; a mode in which a positive electrode sheet and a negative electrode sheet obtained by cutting the positive electrode 150 and the negative electrode 160 into a plurality of sheets having the same area and shape are alternately stacked via a separator sheet to form a laminated body; and a mode in which a long separator is folded into a spiral, and a cathode sheet and an anode sheet are alternately inserted into the space between the spiral separators to form a laminated body having a laminated structure.

Next, the above-described laminated body is housed in the battery exterior 110 (battery case) and the electrolyte solution according to the present embodiment is injected into the battery case, and then the laminated body is immersed in the electrolyte solution, followed by sealing, thus enabling the fabrication of the non-aqueous secondary battery in the embodiment. Alternatively, a non-aqueous secondary battery 100 can also be fabricated by impregnating a substrate made of a polymer material with the electrolyte solution to fabricate an electrolyte membrane in a gel state in advance, forming a laminated body having a laminated structure using a sheet-shaped positive electrode 150 and negative electrode 160, an electrolyte film, and a separator 170 as necessary, and housing the laminated body in a battery exterior 110.

It should be noted that the arrangement of the electrodes is designed such that there is a portion where the outer peripheral edge of the negative electrode active material layer and the outer peripheral edge of the positive electrode active material layer overlap, or there is a portion having too small width in the non-opposing portion of the negative electrode active material layer, electrode misalignment occurs during battery assembling. As a result, charging/discharging cycle characteristics of the non-aqueous secondary battery may deteriorate. Therefore, it is preferable to fix the position of the electrode body used for the non-aqueous secondary battery in advance with tapes such as a polyimide tape, a polyphenylene sulfide tape, a polypropylene (PP) tape, an adhesive and the like.

In the present embodiment, due to its high ionic conductivity of acetonitrile, lithium ions released from the positive electrode during the initial charging of the non-aqueous secondary battery may diffuse to the entire negative electrode. In the non-aqueous secondary battery, the area of the negative electrode active material layer is commonly larger than that of the positive electrode active material layer. However, if lithium ions are diffused and stored to the portion of the negative electrode active material layer which does not face the positive electrode active material layer, lithium ions are not released during initial discharging and remain in the negative electrode. Therefore, the contribution of the unreleased lithium ions becomes an irreversible capacity. For this reason, the non-aqueous secondary battery using a non-aqueous electrolyte solution containing acetonitrile may exhibit low initial charging/discharging efficiency.

Meanwhile, when the area of the positive electrode active material layer is larger than that of the negative electrode active material layer, or both are the same, current is likely to be concentrated at the edge portion of the negative electrode active material layer during charging, thus making it easier to form lithium dendrite.

A ratio of the area of the entire negative electrode active material layer to the area of the portion where the positive electrode active material layer and the negative electrode active material layer face each other is not particularly limited, but is preferably more than 1.0 and less than 1.1, more preferably more than 1.002 and less than 1.09, still more preferably more than 1.005 and less than 1.08, and particularly preferably more than 1.01 and less than 1.08 for the above reasons. In the non-aqueous secondary battery using a non-aqueous electrolyte solution containing acetonitrile, it is possible to improve the initial charging/discharging efficiency by decreasing the ratio of the area of the entire negative electrode active material layer to the area of the portion where the positive electrode active material layer and the negative electrode active material layer face each other.

Decreasing the ratio of the area of the entire negative electrode active material layer to the area of the portion where the positive electrode active material layer and the negative electrode active material layer face each other means limiting the proportion of the area of the position of the negative electrode active material layer which does not face the positive electrode active material layer. Thus, it becomes possible to minimize the amount of lithium ions stored in the position of the negative electrode active material layer which does not face the positive electrode active material layer (i.e., the amount of lithium ions which are not released from the negative electrode during the initial discharge and become the irreversible capacity) of lithium ions released from the positive electrode during initial charging. Therefore, by designing the ratio of the area of the entire negative electrode active material layer to the area of the position where the positive electrode active material layer and the negative electrode active material layer face each other within the above range, it is possible to enhance initial charging/discharging efficiency of the battery and also to suppress the formation of lithium dendrite while intendedly improving load characteristics of the battery by using acetonitrile.

The non-aqueous secondary battery 100 in the present embodiment can function as a battery by initial charging, but is stabilized by partially decomposing the electrolyte solution at the time of initial charging. Although there is no particular limitation on the method of the initial charging, initial charging is preferably carried out at 0.001 to 0.3 C, more preferably 0.002 to 0.25 C, and still more preferably 0.003 to 0.2 C It is also possible to give preferable results by carrying out initial charging via constant voltage charging. By setting a long voltage range in which the lithium salt is involved in the electrochemical reaction, a stable and strong negative electrode SEI is formed on a surface of the electrode, which suppresses an increase in internal resistance, and exerts satisfactory effect on members other than the negative electrode 160, such as the positive electrode 150 and the separator 170 without causing firm fixation of the reaction product to only the negative electrode 160. Therefore, it is remarkably effective to carry out initial charging in consideration of the electrochemical reaction of the lithium salt dissolved in the non-aqueous electrolyte solution.

The non-aqueous secondary battery 100 in the present embodiment can also be used as a battery pack in which a plurality of non-aqueous secondary batteries 100 are connected in series or in parallel. From the viewpoint of controlling the charge/discharge state of the battery pack, when using the positive electrode active material represented by the above formula (Xba) used in the positive electrode, the working voltage range per one battery is preferably 1.5 to 4.0 V, and particularly preferably 2.0 to 3.8V.

When using the positive electrode active material represented by the general formula (a′), the working voltage range per one battery is preferably 2 to 5 V, more preferably 2.5 to 5 V, and particularly preferably 2.75 V to 5 V.

Examples

Hereinafter, the present invention will be described in more detail by way of Examples. However, the present invention is not limited to these Examples.

(1) Preparation of Non-Aqueous Electrolyte Solution

In an inert atmosphere, various non-aqueous solvents were mixed so as to have a predetermined concentration. Further, various lithium salts were added so as to have a predetermined concentration to prepare non-aqueous electrolyte solutions (S01) to (S13), (S20), (S22) to (S36) and (S40). Non-aqueous electrolyte solutions (S14) to (S19), (S21) and (S37) to (S39) were prepared by using these non-aqueous electrolyte solutions as mother electrolyte solutions and adding various additives in a predetermined parts by weight based on 100 parts by weight of each mother electrolyte solution. The compositions of these non-aqueous electrolyte solutions are shown in Table 1.

The abbreviations of non-aqueous solvents, lithium salts and various additives in Table 1 have the following meanings.

(Non-Aqueous Solvent)
- AN: Acetonitrile
- EMC: Ethyl methyl carbonate
- EC: Ethylene carbonate
- ES: Ethylene sulfite
- VC: Vinylene carbonate (Lithium Salt)
- (1-2): Compound represented by the above formula (1-2)
- (9): Compound represented by the above formula (9)
- LiFSI: Lithium bis(fluorosulfonyl)imide ($LiN(SO_2F)_2$)
- $LiPF_6$: Lithium hexafluorophosphate (Various Additives)
- Py: Pyridine
- TMSPi: Tris(trimethylsilyl)phosphite
- DPDMS: Diphenyldimethoxysilane
- TEVS: Triethoxyvinylsilane
- SN: Succinonitrile

TABLE 1

| Electrolyte solution | Lithium salt [mol/L] | | | | Composition of non-aqueous solvent [% by volume] | | | | |
|---|---|---|---|---|---|---|---|---|---|
| No. | (1-2) | (9) | LiFSI | LiPF6 | AN | EMC | EC | ES | VC |
| S01 | 1 | — | — | 0.3 | 35 | 39 | 20 | 4 | 2 |
| S02 | 1.25 | — | — | 0.05 | 35 | 39 | 20 | 4 | 2 |
| S03 | 1.3 | — | — | | 35 | 39 | 20 | 4 | 2 |
| S04 | — | — | —1 | 0.3 | 35 | 39 | 20 | 4 | 2 |
| S05 | 1.25 | — | — | 0.025 | 35 | 39 | 20 | 4 | 2 |
| S06 | 1.25 | — | — | 0.013 | 35 | 39 | 20 | 4 | 2 |
| S07 | 1.25 | — | — | 0.05 | 20 | 54 | 20 | 4 | 2 |
| S08 | 2 | — | — | 0.1 | 35 | 39 | 20 | 4 | 2 |
| S09 | 1 | — | — | 0.05 | 30 | 44 | 20 | 4 | 2 |
| S10 | 1.5 | — | — | 0.01 | 30 | 44 | 20 | 4 | 2 |
| S11 | 1 | — | — | 0.05 | 60 | 8 | 20 | 4 | 2 |
| S12 | 1.5 | — | — | 0.01 | 66 | 8 | 20 | 4 | 2 |
| S13 | 1.25 | — | — | 0.05 | 50 | 14 | 20 | 4 | 2 |
| S14 | 1.25 | — | — | 0.05 | 50 | 14 | 20 | 4 | 2 |
| S15 | 1.25 | — | — | 0.05 | 50 | 14 | 20 | 4 | 2 |
| S16 | 1.25 | — | — | 0.05 | 50 | 14 | 20 | 4 | 2 |
| S17 | 1.25 | — | — | 0.05 | 50 | 14 | 20 | 4 | 2 |
| S18 | 1.25 | — | — | 0.05 | 50 | 14 | 20 | 4 | 2 |
| S19 | 1.25 | — | — | 0.05 | 50 | 14 | 20 | 4 | 2 |
| S20 | — | — | — | 1 | — | 69 | 29 | — | 2 |
| S21 | 1 | — | — | | — | 69 | 29 | — | 2 |
| S22 | — | 1 | — | 0.3 | 35 | 39 | 20 | 4 | 2 |
| S23 | 1 | — | — | 0.3 | 10 | 73.5 | 10 | 4 | 2.5 |
| S24 | 1.25 | — | — | 0.05 | 10 | 73.5 | 10 | 4 | 2.5 |
| S25 | 1.3 | — | — | — | 10 | 73.5 | 10 | 4 | 2.5 |
| S26 | 1.25 | — | — | 0.025 | 10 | 73.5 | 10 | 4 | 2.5 |
| S27 | 1.25 | — | — | 0.013 | 10 | 73.5 | 10 | 4 | 2.5 |
| S28 | 2 | — | — | 0.1 | 10 | 64 | 20 | 4 | 2 |
| S29 | 1.5 | — | — | 0.01 | 10 | 64 | 20 | 4 | 2 |
| S30 | 1 | — | — | 0.3 | 25 | 49 | 20 | 4 | 2 |
| S31 | 1.5 | — | — | 0.01 | 25 | 19 | 20 | 4 | 2 |
| S32 | 1 | — | — | 0.3 | 35 | 39 | 20 | 4 | 2 |
| S33 | 1 | — | — | 0.05 | 49 | 24 | 21 | 4 | 2 |
| S34 | — | — | 1 | 0.05 | 49 | 24 | 21 | 4 | 2 |
| S35 | — | — | 1 | 0.3 | 10 | 73.5 | 10 | 4 | 2.5 |
| S36 | — | — | 1 | 0.3 | 20 | 54 | 20 | 4 | 2 |
| S37 | 1.3 | — | — | — | 20 | 54 | 20 | 4 | 2 |
| S38 | 1.3 | — | — | — | 20 | 54 | 20 | 4 | 2 |
| S39 | 1.3 | — | — | — | 20 | 54 | 20 | 4 | 2 |
| S40 | 1 | — | — | — | 49 | 24 | 21 | 4 | 2 |

TABLE 1-continued

| Electrolyte solution No. | Various additives (% by weight) Py | TMSPi | DPDMS | TEVS | SN | (1-2)/ LipF6 [Molar ratio] | (1-2)/ AN [Molar ratio] | Nitrogen-containing cyclic compound/ (1-2) [Molar ratio] | Silane-based compound/ (1-2) [Molar ratio] |
|---|---|---|---|---|---|---|---|---|---|
| S01 | — | — | — | — | — | 3.3 | 0.150 | — | — |
| S02 | — | — | — | — | — | 25.0 | 0.188 | — | — |
| S03 | — | — | — | — | — | — | 0.195 | — | — |
| S04 | — | — | — | — | — | — | — | — | — |
| S05 | — | — | — | — | — | 50.0 | 0.188 | — | — |
| S06 | — | — | — | — | — | 96.2 | 0.188 | — | — |
| S07 | — | — | — | — | — | 25.0 | 0.329 | — | — |
| S08 | — | — | — | — | — | 20.0 | 0.300 | — | — |
| S09 | — | — | — | — | — | 20.0 | 0.175 | — | — |
| S10 | — | — | — | — | — | 150.0 | 0.263 | — | — |
| S11 | — | — | — | — | — | 20.0 | 0.088 | — | — |
| S12 | — | — | — | — | — | 150.0 | 0.119 | — | — |
| S13 | — | — | — | — | — | 25.0 | 0.131 | — | — |
| S14 | 0.05 | — | — | — | — | 25.0 | 0.131 | 0.005 | — |
| S15 | 1 | — | — | — | — | 25.0 | 0.131 | 0.101 | — |
| S16 | — | 0.1 | — | — | — | 25.0 | 0.131 | — | 0.003 |
| S17 | — | 3 | — | — | — | 25.0 | 0.131 | — | 0.088 |
| S18 | — | — | 0.1 | — | — | 25.0 | 0.131 | — | 0.004 |
| S19 | — | — | — | 0.075 | — | 25.0 | 0.131 | — | 0.003 |
| S20 | — | — | — | — | — | — | — | — | — |
| S21 | — | — | — | — | 10 | — | — | — | — |
| S22 | — | — | — | — | — | — | — | — | — |
| S23 | — | — | — | — | — | 3.3 | 0.526 | — | — |
| S24 | — | — | — | — | — | 25.0 | 0.657 | — | — |
| S25 | — | — | — | — | — | — | 0.683 | — | — |
| S26 | — | — | — | — | — | 50.0 | 0.657 | — | — |
| S27 | — | — | — | — | — | 96.2 | 0.657 | — | — |
| S28 | — | — | — | — | — | 20.0 | 1.051 | — | — |
| S29 | — | — | — | — | — | 150.0 | 0.788 | — | — |
| S30 | — | — | — | — | — | 3.3 | 0.210 | — | — |
| S31 | — | — | — | — | — | 150.0 | 0.315 | — | — |
| S32 | — | — | — | — | — | 3.3 | 0.150 | — | — |
| S33 | — | — | — | — | — | 20.0 | 0.107 | — | — |
| S34 | — | — | — | — | — | — | — | — | — |
| S35 | — | — | — | — | — | — | — | — | — |
| S36 | — | — | — | — | — | — | — | — | — |
| S37 | 0.25 | — | — | — | — | — | 0.342 | 0.027 | — |
| S38 | — | — | — | 0.75 | — | — | 0.342 | — | 0.011 |
| S39 | — | — | 1 | — | — | — | 0.342 | — | 0.035 |
| S40 | — | — | — | — | — | — | — | — | — |

(2) Fabrication of Portable Non-Aqueous Secondary Battery Including Fe-Based Positive Electrode (2-1) Fabrication of Positive Electrode (PT)

Lithium iron phosphate ($LiFePO_4$) having an olivine-type structure as a positive electrode active material, carbon black powder as a conductive aid, and polyvinylidene fluoride (PVDF) as a binder were mixed at a weight ratio of 89:3:8 to obtain a positive electrode mixture.

N-methyl-2-pyrrolidone as the solvent was added to the obtained positive electrode mixture, followed by further mixing to prepare a positive electrode mixture-containing slurry. While adjusting the basis weight of the positive electrode mixture-containing slurry to 11.0 mg/$cm^2$, the positive electrode mixture-containing slurry was coated on one side of an aluminum foil having a thickness of 20 μm, which serves as a positive electrode current collector, and then the solvent was removed by drying. Then, rolling was carried out by a roll press so that the density of the positive electrode active material layer became 1.8 g/$cm^3$ to obtain a positive electrode (P1) composed of the positive electrode active material layer and the positive electrode current collector.

(2-2) Fabrication of Negative Electrode (N1)

A graphite powder as a negative electrode active material, a carbon black powder as a conductive aid, and polyvinylidene fluoride (PVDF) as a binder were mixed at a solid content weight ratio of 90:3:7 to obtain a negative electrode mixture.

Water as the solvent was added to the negative electrode mixture thus obtained so as to have a solid content of 45% by weight, followed by further mixing to prepare a negative electrode mixture-containing slurry. While adjusting the basis weight of the negative electrode mixture-containing slurry, the negative electrode mixture-containing slurry was coated on one side of a copper foil having a thickness of 8 μm and a width of 280 mm, which serves as a negative electrode current collector, using a 3-roll transfer coater so as to have a coating pattern having a width of 240 to 250 mm, a coating length of 125 mm and a non-coating length of 20 mm, and then the solvent was dried and removed in a hot air drying furnace. Both sides of the electrode roll thus obtained were subjected to trimming cut and dried under reduced pressure at 80° C. for 12 hours. Then, the electrode roll was rolled by a roll press so that the density of the negative electrode active material layer became 1.3 g/$cm^3$ to obtain a negative electrode (N1) composed of the negative electrode active material layer and the negative electrode current collector. The basis weight excluding the negative electrode current collector was 5.4 mg/cm$^2$.

(2-3) Assembling of Portable Non-Aqueous Secondary Battery Including Fe-Based Positive Electrode The positive electrode (P1) obtained as described above was punched in a disk shape having a diameter of 15.958 mm and the negative electrode (N1) obtained as described above was punched in a disk shape having a diameter of 16.156 mm were overlapped on both sides of a polyethylene microporous membrane separator (thickness of 21 μm, air permeability of 285 seconds/100 cm$^3$, porosity of 41%) to obtain a laminated body. The laminated body was inserted into a SUS disk-shaped battery casing. Then, each of 200 μL of non-aqueous electrolyte solutions (S01 to S22) was injected into the battery casing and the laminated body was immersed in the non-aqueous electrolyte solution, followed by sealing of the battery casing. After maintaining at a temperature of 25° C. for 12 hours to fully adapt the non-aqueous electrolyte solution to the laminated body to obtain a portable non-aqueous secondary battery.

(3) Evaluation of Portable Non-aqueous Secondary Battery Including Fe-Based Positive Electrode For the portable non-aqueous secondary batteries obtained as described above, first, an initial charging/discharging treatment and the initial charging/discharge capacity measurement were carried out according to the following procedure (3-1). Then, each portable non-aqueous secondary battery was evaluated according to the procedure (3-2). In another evaluation, after carrying out the following (3-1), an output test was carried out according to the following procedure (3-3) or (3-4). The charging/discharging was carried out using a charging/discharging apparatus ACD-M01A (trade name) manufactured by Aska Electronic Co., Ltd., and a program thermostatic bath IN804 (trade name) manufactured by Yamato Scientific Co., Ltd.

As used herein, "1 C" means the current value at which a fully charged battery is expected to be discharged in one hour with a constant current to terminate discharging.

Specifically, in the portable non-aqueous secondary battery, "1 C" means the current value at which a battery fully charged to 3.5 V is expected to be discharged to 2.0 V in one hour with a constant current to terminate discharging.

The portable non-aqueous secondary battery assembled according to the above procedure (2-3) is a 3 mAh class cell, and the battery voltage at which the battery is fully charged is defined as 3.5 V, and a current value corresponding to 1 C is set at 3.0 mA. Hereinafter, unless otherwise specified, the notation of current value and the voltage is omitted for convenience.

(3-1) Initial Charging/Discharging Treatment

After setting the ambient temperature of the portable non-aqueous secondary battery at 25° C. and charging with a constant current corresponding to 0.1 C to reach the fully charged state, that is, 3.5 V, the battery was charged with a constant voltage for 1.5 hours. Then, the battery was discharged to 2.0 V with a constant current corresponding to 0.1 C. The initial efficiency was calculated by dividing this initial discharging capacity by the initial charging capacity. The initial discharging capacity at this time was defined as the initial capacity. To stably form thy negative electrode SEI, the same charging and discharging as described above was carried out once.

The initial efficiency indicates the ratio of the initial discharge capacity to the initial charge capacity, and is commonly lower than the charge/discharge efficiency after the second time. This is because Li ions are used to form the negative electrode SEI during the initial charging, thus reducing Li ions which can be discharged. Here, there is no problem if the initial efficiency is 84% or more.

(3-2) Full-Charge Storage Test at 85° C. for 100 Hours and 200 Hours

For the portable non-aqueous secondary battery subjected to the initial charging/discharging treatment by the method described in section (3-1), the ambient temperature of the battery was set at 25° C., and after charging with a constant current corresponding to 1 C to reach the fully charged state, that is, 3.5 V, the battery was charged with a constant voltage for 1.5 hours. Then, this portable non-aqueous secondary battery was stored in a thermostatic bath at 85° C. for 100 hours. Thereafter, the ambient temperature was returned to 25° C., and the battery was discharged to 2.0 V with a current value corresponding to 0.1 C. The remaining discharging capacity at this time was defined as the remaining discharging capacity after 100 hours. As the measured value of the full-charge storage test at 85° C. for 100 hours, the remaining capacity retention rate was calculated based on the following formula. When a commercially available battery is measured, the initial charging/discharging treatment is carried out according to the procedure described in section (3-1) and, after measuring the initial capacity, the remaining discharging capacity is measured according to the procedure described in section (3-2) and the remaining capacity retention rate is calculated.

$$\text{Remaining capacity retention rate after 100 hours} = (\text{remaining discharging capacity after 100 hours/initial capacity}) \times 100\ [\%]$$

Thereafter, the portable non-aqueous secondary battery was charged with a constant current corresponding to 1 C to reach the fully charged state of 3.5 V, and then charged with a constant voltage for 1.5 hours. Then, this portable non-aqueous secondary battery was stored in a thermostatic bath at 85° C. for 100 hours. Then, the ambient temperature was returned to 25° C., and the battery was discharged to 2.0 V with a current value corresponding to 0.1 C. The remaining discharging capacity at this time was defined as the remaining discharging capacity after 200 hours. As the measured value of the full-charge storage test at 85° C. for 200 hours, the remaining capacity retention rate was calculated based on the following formula.

$$\text{Remaining capacity retention rate after 200 hours} = (\text{remaining discharging capacity after 200 hours/initial capacity}) \times 100\ [\%]$$

The remaining capacity retention rate is an index of the magnitude of self-discharge in a full-charge storage test at 85° C. The larger this value, the smaller the self-discharge at high temperature, and more current can be used. The remaining capacity retention rate after 100 hours is preferably 35% or more, more preferably 45% or more, still more preferably 55% or more, and particularly preferably 60% or more. The remaining capacity retention rate after 200 hours is preferably 12% or more, more preferably 20% or more, still more preferably 30% or more, yet more preferably 40% or more, and particularly preferably 50% or more.

The results of the full-charge storage test at 85° C. for 100 hours and 200 hours are shown in Table 2.

(3-3) Output Test at −40° C.

For the battery subjected to the initial charging/discharging treatment by the method described in section (3-1), the ambient temperature of the battery was set at 25° C., and after charging with a constant current of 3 mA corresponding to 1 C to reach 3.5 V, the battery was charged with a constant voltage of 3.5 V for 1.5 hours in total. Thereafter, the battery was discharged to 2.0 V with a current value of 0.3 mA corresponding to 0.1 C. Then, the ambient temperature of the battery was set at 25° C., and after charging with a constant current of 3 mA corresponding to 1 C to reach 3.5 V, the battery was charged with a constant voltage of 3.5 V for 1.5 hours in total. Then, the ambient temperature of the battery was set at −40° C., and the battery was discharged to 2.0 V with a current value of 3 mA corresponding to 1 C and the following capacity retention rate was calculated.

$$1\ C\ \text{capacity retention rate} = (\text{capacity during } 1\ C \text{ discharging at } -40°\ C/\text{capacity during } 0.1\ C \text{ discharging at } 25°\ C) \times 100\ [\%]$$

The 1 C capacity retention rate is an index of output performance at −40° C. The larger this value, the smaller the internal resistance of the non-aqueous secondary battery at low temperature, and more current can be used. In particular, Fe-based positive electrode-including non-aqueous secondary batteries are in increasing demand as auxiliary batteries for electric vehicles, and are required to have high low-temperature performance in order to operate stably even in cold regions. The 1 C capacity retention rate is preferably 10% or more, and more preferably 30% or more.

The results of the output test at −40° C. are shown in Table 2.

(3-4) Output Test at 25° C.

For the battery subjected to the initial charging/discharging treatment by the method described in section (3-1), the ambient temperature of the battery was set at 25° C., and after charging with a constant current of 3 mA corresponding to 1 C to reach 3.5 V, the battery was charged with a constant voltage of 3.5 V for 1.5 hours in total. Thereafter, the battery was discharged to 2.0 V with a current value of 0.3 mA corresponding to 0.1 C. In the same manner as above, except that the current value during constant current discharging was changed to 60 mA corresponding to 20 C, charging/discharging was carried out, and the following capacity retention rate was calculated.

$$20\ C\ \text{capacity retention rate} = (\text{capacity during } 20\ C \text{ discharging/capacity during } 0.1\ C \text{ discharging}) \times 100\ [\%]$$

Next, the interpretation of each test will be described.

The 20 C capacity retention rate is an index of output performance at 25° C. The larger this value, the smaller the internal resistance of the non-aqueous secondary battery, and more current can be used. In particular, Fe-based positive electrode-including non-aqueous secondary batteries are in increasing demand for high-output applications such as electric tools, and are required to have high output performance. The 20 C capacity retention rate is preferably 30% or more, and more preferably 60% or more.

The results of the output test at 25° C. are shown in Table 2.

TABLE 2

| | Positive electrode No. | Negative electrode No. | Electrolyte solution No. | Initial efficiency [%] | Remaining capacity retention rate [%] After 100 hours | After 200 hours | 1 C capacity retention rate (−40° C.) [%] | 2 C capacity retention rate (25° C.) [%] |
|---|---|---|---|---|---|---|---|---|
| Example 1 | P1 | N1 | S01 | 87.4 | 47 | 12 | 35 | 61 |
| Example 2 | P1 | N1 | S02 | 86.1 | 60 | 48 | 36 | 61 |
| Example 3 | P1 | N1 | S03 | 88.1 | 69 | 62 | 28 | 57 |
| Comparative Example 1 | P1 | N1 | S04 | 85.8 | 32 | 11 | 30 | 72 |
| Example 4 | P1 | N1 | S05 | 85.5 | 62 | 50 | 35 | 61 |
| Example 5 | P1 | N1 | S06 | 86.7 | 63 | 51 | 33 | 61 |
| Example 6 | P1 | N1 | S07 | 86.4 | 65 | 55 | 23 | 38 |
| Example 7 | P1 | N1 | S08 | 86.7 | 67 | 65 | 15 | 46 |
| Example 8 | P1 | N1 | S09 | 87.1 | 60 | 51 | 34 | 61 |
| Example 9 | P1 | N1 | S10 | 86.5 | 62 | 52 | 33 | 61 |
| Example 10 | P1 | N1 | S11 | 87.2 | 55 | 49 | 41 | 69 |
| Example 11 | P1 | N1 | S12 | 86.1 | 59 | 53 | 42 | 70 |
| Example 12 | P1 | N1 | S13 | 86.3 | 56 | 49 | 39 | 65 |
| Example 13 | P1 | N1 | S14 | 85.9 | 59 | 53 | 37 | 64 |
| Example 14 | P1 | N1 | S15 | 86.5 | 58 | 51 | 35 | 63 |
| Example 15 | P1 | N1 | S16 | 84.8 | 58 | 51 | 36 | 64 |
| Example 16 | P1 | N1 | S17 | 87.6 | 58 | 52 | 35 | 63 |
| Example 17 | P1 | N1 | S18 | 87.1 | 57 | 50 | 37 | 62 |
| Example 18 | P1 | N1 | S19 | 87.2 | 57 | 51 | 37 | 63 |
| Comparative Example 2 | P1 | N1 | S20 | 86.5 | 67 | 40 | 1 | 22 |
| Comparative Example 3 | P1 | N1 | S21 | 87.7 | 74 | 76 | 0 | 19 |

TABLE 2-continued

| | Positive electrode No. | Negative electrode No. | Electrolyte solution No. | Initial efficiency [%] | Remaining capacity retention rate [%] After 100 hours | After 200 hours | 1 C capacity retention rate (−40° C.) [%] | 2 C capacity retention rate (25° C.) [%] |
|---|---|---|---|---|---|---|---|---|
| Comparative Example 4 | P1 | N1 | S22 | 74.2 | 0 | 0 | 34 | 56 |

As shown in Table 2, in Examples 1 to 18, each initial efficiency was a preferable numerical value or more. Meanwhile, Comparative Example 4 showed a value at which the initial efficiency was less than 84%.

As shown in Table 2, in Examples 1 to 18, each remaining capacity retention rate after the full-charge storage test for 100 hours and the full-charge storage test for 200 hours was a preferable numerical value or more. Meanwhile, Comparative Examples 1 and 4 showed a value at which each remaining capacity retention rate after 100 hours was less than 35%, and each remaining capacity retention rate after 200 hours was less than 120%.

In Examples 1 to 18, each 1 C capacity retention rate in the output test at −40° C. was a preferable numerical value or more. Meanwhile, Comparative Examples 2 and 3 showed values at which the 1 C capacity retention rate was less than 10%.

In Examples 1 to 18, each 20 C capacity retention rate in the output test at 25° C. was a preferable numerical value or more. Meanwhile, Comparative Examples 2 and 3 showed values at which the 20 C capacity retention rate was less than 30%.

When comparing Example 1 with Comparative Example 1, the remaining capacity retention rate after 100 hours and 200 hours was improved by replacing the lithium salt from LiFSI to the compound represented by the above formula (1-2). It is considered that this is because the use of a cyclic anion-containing lithium salt suppresses the elution of the positive electrode metal and the physical peeling between the positive electrode Al current collector and the positive electrode active material, which are problems of the acetonitrile-containing electrolyte solution, and the decomposition product of the cyclic anion act as a negative electrode SEI component.

When comparing Examples 1 to 3, as the molar ratio of the cyclic anion-containing lithium salt/$LiPF_6$ was increased, the remaining capacity retention rate after 100 hours and 200 hours was improved. It is presumed that this is because deterioration of the battery performance at high temperature could be suppressed more effectively by suppressing the elution of the positive electrode metal and the physical peeling between the positive electrode Al current collector and the positive electrode active material in the acetonitrile-containing electrolyte solution while reducing the amount of $LiPF_6$, which causes deterioration of the battery performance at high temperature in the acetonitrile-containing electrolyte solution, and increasing the amount of the cyclic anion-containing lithium salt capable of suppressing deterioration of the battery performance at high temperature due to contribution to the negative electrode SEI.

When comparing Examples 1 to 3, as the amount of $LiPF_6$ is decreased, the remaining capacity retention rate after 100 hours and 200 hours is improved. It is presumed that this is because the production of an acid component due to thermal decomposition of $LiPF_6$ at high temperature is suppressed and the amount of HF generated from $PF_6$ anions is reduced by abstracting hydrogen from the α-position of acetonitrile, thus making it possible to minimize the deterioration of the battery performance caused by the corrosion of the positive electrode active material layer and the positive electrode current collector, or the deterioration reaction of the electrolyte solution.

When comparing Example 1 with Comparative Example 4, the remaining capacity retention rate after 100 hours and 200 hours is improved by replacing the lithium salt from the compound represented by the above formula (9) to the compound represented by the above formula (1-2), It is considered that this is because the decomposition of the cyclic anion was suppressed by using a 5-membered ring cyclic anion-containing lithium salt instead of a 6-membered ring.

When comparing Examples 2 and 3 with Example 1, the content of the cyclic anion-containing lithium salt falls within a range of 20 or more relative to the content of $LiPF_6$, so that the remaining capacity retention rate after 100 hours showed a value of 50% or more and the remaining capacity retention rate after 200 hours showed a value of 30% or more. It is presumed that this is because deterioration of the battery performance at high temperature could be suppressed more effectively by suppressing the elution of the positive electrode metal and the physical peeling between the positive electrode Al current collector and the positive electrode active material in the acetonitrile-containing electrolyte solution while reducing the amount of $LiPF_6$, which causes deterioration of the battery performance at high temperature in the acetonitrile-containing electrolyte solution, and increasing the amount of the cyclic anion-containing lithium salt capable of suppressing deterioration of the battery performance at high temperature due to contribution to the negative electrode SEI.

When comparing Example 2 with Example 3, the content of the cyclic anion-containing lithium salt falls within a range of 150 or less relative to the content of $LiPF_6$, so that the 1 C capacity retention rate in the output test −40° C. showed a value of 30% or more and the 20 C capacity retention rate in the output test at 25° C. showed a value of 60% or more. It is presumed that this is because the formation of a negative electrode SEI excellent in a balance between the organic component derived from the cyclic anion-containing lithium salt and the inorganic component derived from $LiPF_6$ facilitates intercalation and deintercalation of lithium ions at normal temperature and low temperature, and enables suppression of capacity deterioration due to shrinkage of the negative electrode SEI at low temperature.

When comparing Example 2 with Example 6, the acetonitrile content falls within a range of 30% or more, so that the 1 C capacity retention rate in the output test at −40° C. shows a value of 30% or more and the 20 C capacity retention rate in the output test at 25° C. showed a value of 60% or more. It is presumed that this is because the ionic conductivity of the non-aqueous electrolyte solution increased.

When comparing Examples 13 to 14 with Example 12, the remaining capacity retention rate after 100 hours and 200 hours is improved by containing the nitrogen-containing cyclic compound as an additive. It is considered that this is because the formation of complex cations composed of transition metal and acetonitrile was suppressed.

When comparing Examples 15 to 18 with Example 12, the remaining capacity retention rate after 100 hours and 200 hours is improved by containing the silane-based compound as an additive. It is considered that this is because the active points (active points of the positive electrode active material) which cause oxidative deterioration of the non-aqueous electrolyte solution are suppressed.

When comparing Example 2 with Examples 6 and 7, the content of the cyclic anion-containing lithium salt falls within a range of 0.27 or less, in terms of a molar ratio, relative to the content of acetonitrile, so that the 1 C capacity retention rate in the output test at −40° C. showed a value of 30% or more and a value of the 20 C capacity retention rate in the output test at 25° C. showed a value of 60% or more. It is presumed that this is because a decrease in ionic conductivity at normal temperature and low temperature was effectively suppressed.

(4) Fabrication of Portable Non-Aqueous Secondary Battery Including Ni-Based Positive Electrode (4-1) Fabrication of Ni-Based Positive Electrode (4-1-1) Fabrication of Ni-Based Positive Electrode (P2)

A composite oxide of lithium, nickel, manganese and cobalt ($LiNi_{0.8}Mn_{0.1}Co_{0.1}O_2$) as a positive electrode active material, a carbon black powder as a conductive aid, and polyvinylidene fluoride (PVDF) as a binder were mixed at a weight ratio of 94:3:3 to obtain a positive electrode mixture.

N-methyl-2-pyrrolidone as the solvent was added to the obtained positive electrode mixture, followed by further mixing to prepare a positive electrode mixture-containing slurry. While adjusting the basis weight of the positive electrode mixture-containing slurry to 8.4 mg/cm$^2$, the positive electrode mixture-containing slurry was coated on one side of an aluminum foil having a thickness of 20 μm, which serves as a positive electrode current collector, and then the solvent was removed by drying. Then, rolling was carried out by a roll press so that the density of the positive electrode active material layer became 2.7 g/cm$^3$ to obtain a positive electrode (P2) composed of the positive electrode active material layer and the positive electrode current collector.

(4-1-2) Fabrication of Ni-Based Positive Electrode (P3)

A composite oxide ($LiNi_{0.5}$ $Mn_{0.3}$ $Co_{0.2}O_2$) of lithium, nickel, manganese and cobalt as a positive electrode active material, and carbon black powder as a conductive aid, and polyvinylidene fluoride (PVDF) as a binder were mixed at a weight ratio of 94:3:3 to obtain a positive electrode mixture.

N-methyl-2-pyrrolidone as the solvent was added to the obtained positive electrode mixture, followed by further mixing to prepare a positive electrode mixture-containing slurry. While adjusting the basis weight of the positive electrode mixture-containing slurry to 10.2 mg/cm$^2$, the positive electrode mixture-containing slurry was coated on one side of an aluminum foil having a thickness of 20 μm, which serves as a positive electrode current collector, and then the solvent was removed by drying. Then, rolling was carried out by a roll press so that the density of the positive electrode active material layer became 2.8 g/cm$^3$ to obtain a positive electrode (P3) composed of the positive electrode active material layer and the positive electrode current collector.

(4-1-3) Fabrication of Ni-Based Positive Electrode (P4)

A composite oxide ($LiNi_{0.33}Mn_{0.33}Co_{0.33}$ $O_2$) of lithium, nickel, manganese and cobalt as a positive electrode active material, and carbon black powder as a conductive aid, and polyvinylidene fluoride (PVDF) as a binder were mixed at a weight ratio of 94:3:3 to obtain a positive electrode mixture.

N-methyl-2-pyrrolidone as the solvent was added to the obtained positive electrode mixture, followed by further mixing to prepare a positive electrode mixture-containing slurry. While adjusting the basis weight of the positive electrode mixture-containing slurry to 11.4 mg/cm$^2$, the positive electrode mixture-containing slurry was coated on one side of an aluminum foil having a thickness of 20 μm, which serves as a positive electrode current collector, and then the solvent was removed by drying. Then, rolling was carried out by a roll press so that the density of the positive electrode active material layer became 2.7 g/cm$^3$ to obtain a positive electrode (P4) composed of the positive electrode active material layer and the positive electrode current collector.

(4-2) Fabrication of Negative Electrode (N1)

In the same manner as in (2-2), a negative electrode (N1) was fabricated.

(4-3) Assembling of Ni-Based Positive Electrode-Including Portable Non-Aqueous Secondary Battery Each of the positive electrodes (P2 to P4) obtained as described above was punched in a disk shape having a diameter of 15.958 mm and the negative electrode (N1) obtained as described above was punched in a disk shape having a diameter of 16.156 mm were overlapped on both sides of a polyethylene microporous membrane separator (thickness of 21 μm, air permeability of 285 seconds/100 cm$^3$, porosity of 41%) to obtain a laminated body. The laminated body was inserted into a SUS disk-shaped battery casing. Then, each of 200 μL of non-aqueous electrolyte solutions (S07, S10, S20 and S23 to S36) was injected into the battery casing and the laminated body was immersed in the non-aqueous electrolyte solution, followed by sealing of the battery casing. After maintaining at a temperature of 25° C. for 12 hours to fully adapt the non-aqueous electrolyte solution to the laminated body to obtain a portable non-aqueous secondary battery.

(5) Evaluation of Ni-Based Positive Electrode-Including Portable Non-Aqueous Secondary Battery For the portable non-aqueous secondary batteries obtained as described above, first, an initial charging/discharging treatment and the initial charging/discharge capacity measurement were carried out according to the following procedure (5-1). Then, each portable non-aqueous secondary battery was evaluated according to the following procedure (5-2). In another evaluation, after carrying out the following (5-1), an output test was carried out according to the following procedure (5-3) or (5-4). The charging/discharging was carried out using a charging/discharging apparatus ACD-M01A (trade name) manufactured by Aska Electronic Co., Ltd., and a program thermostatic bath IN804 (trade name) manufactured by Yamato Scientific Co., Ltd.

As used herein, "1 C" means the current value at which a fully charged battery is expected to be discharged in one hour with a constant current to terminate discharging.

Specifically, in the portable non-aqueous secondary battery, "1 C" means the current value at which a battery fully charged to 4.2 V is expected to be discharged to 3.0 V in one hour with a constant current to terminate discharging.

The portable non-aqueous secondary battery assembled according to the above procedure (4-3) is a 3 mAh class cell, and the battery voltage at which the battery is fully charged is defined as 4.2 V, and a current value corresponding to 1 C is set at 3.0 mA. Hereinafter, unless otherwise specified, the notation of current value and the voltage is omitted for convenience.

(5-1) Initial Charging/Discharging Treatment

After setting the ambient temperature of the portable non-aqueous secondary battery at 25° C. and charging with a constant current corresponding to 0.1 C to reach the fully charged state, that is, 4.2 V, the battery was charged with a constant voltage for 1.5 hours. Then, the battery was discharged to 3.0 V with a constant current corresponding to 0.1 C. The initial efficiency was calculated by dividing this initial discharging capacity by the initial charging capacity. The initial discharging capacity at this time was defined as the initial capacity. To stably form thy negative electrode SEI, the same charging and discharging as described above was carried out twice.

(5-2) Cycle Test at 50° C.

For the portable non-aqueous secondary battery subjected to the initial charging/discharging treatment by the method described in section (5-1), the ambient temperature of the battery was set at 50° C. After charging with a constant current of 1.5 mA corresponding to 0.5 C to reach 4.2 V, the battery was charged with a constant voltage of 4.2 V for 1.5 hours. Then, the battery was discharged to 3.0 V with a constant current of 1.5 mA corresponding to 0.5 C. With this process of performing charging and discharging once each serving as one cycle, charging/discharging was carried out for 100 cycles. The cycle capacity retention rate at 50° C. was calculated based on the following formula.

$$\text{Cycle capacity retention rate at } 50°\text{ C} = \text{discharging capacity at 100th cycle in cycle test at } 50°\text{ C}/\text{discharging capacity at 1st cycle in cycle test at } 50°\text{ C}) \times 100\ [\%]$$

The initial efficiency indicates the ratio of the initial discharge capacity to the initial charge capacity, and is commonly lower than the charge/discharge efficiency after the second time. This is because Li ions are used to form the negative electrode SEI during the initial charging, thus reducing Li ions which can be discharged. Here, there is no problem if the initial efficiency is 84% or more.

The cycle capacity retention rate at 50° C. is an index of battery deterioration due to repeated use. It is considered that the larger this value is, the smaller a decrease in capacity due to repeated use is, and the battery can be used for applications intended for long-term use.

In addition, the cycle capacity retention rate at 50° C. can be used as an index of the magnitude of self-discharge at high temperature. It is considered that the larger this value, the smaller the self-discharge at high temperature, and the battery can be used for applications intended for more current than a battery having a rejectable quality of the cycle capacity retention rate at 50° C.

Therefore, the cycle capacity retention rate at 50° C. is preferably 80% or more.

The obtained evaluation results are shown in Table 3.

(5-3) Output Test at −40° C.

For the battery subjected to the initial charging/discharging treatment by the method described in (5-1), the ambient temperature of the battery was set at 25° C., and after charging with a constant current of 3 mA corresponding to 1 C to reach 4.2 V, the battery was charged with a constant voltage of 4.2 V for 1.5 hours in total. Thereafter, the battery was discharged to 3.0 V with a current value of 0.3 mA corresponding to 0.1 C. Then, the ambient temperature of the battery was set at 25° C., and after charging with a constant current of 3 mA corresponding to 1 C to reach 4.2 V, the battery was charged with a constant voltage of 4.2 V for 1.5 hours in total. Then, the ambient temperature of the battery was set at −40° C., and the battery was discharged to 3.0 V with a current value of 3 mA corresponding to 1 C, and the following capacity retention rate was calculated.

$$1\ C \text{ capacity retention rate} = (\text{capacity during } 1\ C \text{ discharging at } -40°\text{ C}/\text{capacity during } 0.1\text{ C discharging at } 25°\text{ C}) \times 100\ [\%]$$

The 1 C capacity retention rate is an index of output performance at −40° C. The larger this value, the smaller the internal resistance of the non-aqueous secondary battery at low temperature, and more current can be used. In the Ni-based positive electrode-containing non-aqueous secondary battery, the 1 C capacity retention rate is preferably 5% or more, and more preferably 10% or more.

The results of the output test at −40° C. are shown in Table 3.

(5-4) Output Test at 25° C.

For the battery subjected to the initial charging/discharging treatment by the method described in (5-1), the ambient temperature of the battery was set at 25° C., and after charging with a constant current of 3 mA corresponding to 1 C to reach 4.2 V, the battery was charged with a constant voltage of 4.2 V for 1.5 hours in total. Thereafter, the battery was discharged to 3.0 V with a current value of 0.3 mA corresponding to 0.1 C. In the same manner as above, except that the current value during constant current discharging was changed to 60 mA corresponding to 20 C, charging/discharging was carried out, and the following capacity retention rate was calculated.

$$20\ C \text{ capacity retention rate} = (\text{capacity during } 20\ C \text{ discharging}/\text{capacity during } 0.1\ C \text{ discharging}) \times 100\ [\%]$$

The 20 C capacity retention rate is an index of output performance at 25° C. The larger this value, the smaller the internal resistance of the non-aqueous secondary battery, and more current can be used. In the Ni-based positive electrode-containing non-aqueous secondary battery, the 20 C capacity retention rate is preferably 10% or more, and more preferably 20% or more.

The results of the output test at 25° C. are shown in Table 3.

TABLE 3

| | Positive electrode No. | Negative electrode No. | Electrolyte solution No. | Initial efficiency [%] | Cycle capacity retention rate at 50° C. [%] | 1 C capacity retention rate (−40° C.) [%] | 20 C capacity retention rate (25° C.) [%] |
|---|---|---|---|---|---|---|---|
| Example 19 | P2 | N1 | S23 | 86.8 | 80 | 13 | 26 |
| Example 20 | P2 | N1 | S24 | 86.2 | 85 | 11 | 24 |
| Example 21 | P2 | N1 | S25 | 86.2 | 87 | 8 | 19 |
| Example 22 | P2 | N1 | S26 | 86.2 | 85 | 13 | 23 |
| Example 23 | P2 | N1 | S27 | 86.3 | 85 | 13 | 24 |
| Example 24 | P2 | N1 | S07 | 85.9 | 86 | 17 | 32 |
| Example 25 | P2 | N1 | S28 | 86.1 | 83 | 6 | 14 |
| Example 26 | P3 | N1 | S29 | 85.6 | 92 | 12 | 25 |
| Example 27 | P3 | N1 | S30 | 86.8 | 91 | 20 | 32 |
| Example 28 | P3 | N1 | S31 | 86.7 | 92 | 21 | 30 |
| Example 29 | P4 | N1 | S32 | 86.3 | 88 | 25 | 35 |
| Example 30 | P4 | N1 | S10 | 86.6 | 90 | 25 | 35 |
| Example 31 | P4 | N1 | S33 | 86.2 | 86 | 27 | 39 |
| Comparative Example 5 | P4 | N1 | S34 | 85.5 | 75 | 31 | 42 |
| Comparative Example 6 | P2 | N1 | S35 | 85.7 | 79 | 18 | 32 |
| Comparative Example 7 | P2 | N1 | S36 | 86.5 | 79 | 24 | 24 |
| Comparative Example 8 | P2 | N1 | S20 | 86.1 | 85 | 1 | 8 |

As shown in Table 3, in Examples 19 to 31, the results of the initial efficiency showed a preferable numerical value or more.

In Examples 19 to 31, the cycle capacity retention rate at 50° C. in the cycle test at 50° C. was a preferable numerical value or more. Meanwhile, in Comparative Examples 5 to 7, the cycle capacity retention rate at 50° C. was less than 80%.

In Examples 19 to 31, the 1 C capacity retention rate in the −output test at −40° C. was a preferable numerical value or more. Meanwhile, Comparative Example 8 showed a value at which the 1 C capacity retention rate was less than 500.

In Examples 19 to 31, the 20 C capacity retention rate in the output test at 25° C. was a preferable numerical value or more. Meanwhile, Comparative Example 8 showed a value at which the 20 C capacity retention rate was less than 10%.

When comparing Example 19 with Comparative Example 6, the cycle capacity retention rate at 50° C. showed a value of 80% or more by replacing the lithium salt from LiFSI to the compound represented by the above formula (1-2). It is considered that this is because the use of a cyclic anion-containing lithium salt suppresses the elution of the positive electrode metal and the physical peeling between the positive electrode Al current collector and the positive electrode active material, which are problems of the acetonitrile-containing electrolyte solution, and the decomposition product of the cyclic anion act as a negative electrode SEI component.

When comparing Examples 19 to 21, the cycle capacity retention rate at 50° C. is improved as the amount of $LiPF_6$ is decreased. It is presumed that this is because the production of an acid component due to thermal decomposition of $LiPF_6$ at high temperature is suppressed and the amount of HF generated from $PF_6$ anions is reduced by abstracting hydrogen from the α-position of acetonitrile, thus making it possible to minimize the deterioration of the battery performance caused by the corrosion of the positive electrode active material layer and the positive electrode current collector, or the deterioration reaction of the electrolyte solution.

When comparing Example 20 with Example 21, the content of the cyclic anion-containing lithium salt falls within a range of 150 or less relative to the content of $LiPF_6$, so that the 1 C capacity retention rate in the output test at −40° C. showed a value of 10% or more, and the 20 C capacity retention rate in the output test at 25° C. showed a value of 20% or more. It is presumed that this is because the formation of a negative electrode SEI excellent in a balance between the organic component derived from the cyclic anion-containing lithium salt and the inorganic component derived from $LiPF_6$ facilitates intercalation and deintercalation of lithium ions at normal temperature and low temperature, and enables suppression of capacity deterioration due to shrinkage of the negative electrode SEI at low temperature.

When comparing Example 20 with Example 25, the content of the cyclic anion-containing lithium salt falls within a range of 0.79 or less, in terms of a molar ratio, relative to the content of acetonitrile, so that the 1 C capacity retention rate in the output test at −40° C. showed a value of 10% or more and a value of the 20 C capacity retention rate in the output test at 25° C. showed a value of 20% or more. It is presumed that this is because a decrease in ionic conductivity at normal temperature and low temperature was effectively suppressed.

(6) Fabrication of Portable Non-Aqueous Secondary Battery for Storage Test at 90° C.

(6-1) Fabrication of Positive Electrode (P1)

In the same manner as in (2-1), a positive electrode (P1) was fabricated.

(6-2) Fabrication of Negative Electrode (N1)

In the same manner as in (2-2), a negative electrode (N1) was fabricated.

(6-3) Assembling of Portable Non-Aqueous Secondary Battery for Evaluation at 90° C.

The positive electrode (P1) obtained as described above was punched in a disk shape having a diameter of 15.958 mm and the negative electrode (N1) obtained as described above was punched in a disk shape having a diameter of 16.156 mm were overlapped on both sides of a polyethylene microporous membrane separator (thickness of 21 μm, air permeability of 285 seconds/100 $cm^3$, porosity of 41%) to obtain a laminated body. The laminated body was inserted into a SUS disk-shaped battery casing. Then, each of 200 μL of non-aqueous electrolyte solutions (S20, S36, S37) was injected into the battery casing and, after immersing the laminated body in the non-aqueous electrolyte solution, the positive electrode current collector was pressed with an aluminum plunger, followed by sealing of the battery casing. After maintaining at a temperature of 25° C. for 12 hours to fully adapt the non-aqueous electrolyte solution to the laminated body to obtain a portable non-aqueous secondary battery.

(7) Evaluation of Portable Non-Aqueous Secondary Battery for Storage Test at 90° C.

For the portable non-aqueous secondary batteries obtained as described in section (6-3), first, an initial charging/discharging treatment and the initial charging/discharge capacity measurement were carried out according to the following procedure (7-1). Then, each portable non-aqueous secondary battery was evaluated according to the following procedure (7-2). The charging/discharging was carried out using a charging/discharging apparatus ACD-M01A (trade name) manufactured by Aska Electronic Co., Ltd., and a program thermostatic bath IN804 (trade name) manufactured by Yamato Scientific Co., Ltd.

As used herein, "1 C" means the current value at which a fully charged battery is expected to be discharged in one hour with a constant current to terminate discharging.

Specifically, in the portable non-aqueous secondary battery, "1 C" means the current value at which a battery fully charged to 3.5 V is expected to be discharged to 2.0 V in one hour with a constant current to terminate discharging.

The portable non-aqueous secondary battery assembled according to the above procedure (6-3) is a 3 mAh class cell, and the battery voltage at which the battery is fully charged is defined as 3.5 V, and a current value corresponding to 1 C is set at 3.0 mA. Hereinafter, unless otherwise specified, the notation of current value and the voltage is omitted for convenience.

(7-1) Initial Charging/Discharging Treatment

After setting the ambient temperature of the portable non-aqueous secondary battery at 25° C. and charging with a constant current corresponding to 0.1 C to reach 3.5 V, the battery was charged with a constant voltage for 1.5 hours. Then, the battery was discharged to 2.0 V with a constant current corresponding to 0.1 C. The initial efficiency was calculated by dividing this initial discharging capacity by the initial charging capacity. The initial discharging capacity at this time was defined as the initial capacity.

(7-2) Full-Charge Storage Test at 90° C. for 4 Hours

For the portable non-aqueous secondary battery subjected to the initial charging/discharging treatment by the method described in section (7-1), the ambient temperature of the battery was set at 25° C., and after charging with a constant current corresponding to 1 C to reach 3.5 V, the battery was charged with a constant voltage for 1.5 hours. Then, this portable non-aqueous secondary battery was stored in a thermostatic bath at 90° C. for 4 hours. Thereafter, the ambient temperature was returned to 25° C., and the battery was discharged to 2.0 V with a current value corresponding to 0.1 C. The remaining discharging capacity at this time was defined as the remaining discharging capacity after 4 hours. As the measured value of the full-charge storage test at 90° C. for 4 hours, the remaining capacity retention rate was calculated based on the following formula.

$$\text{Remaining capacity retention rate after 4 hours} = (\text{remaining discharging capacity after 4 hours/initial capacity}) \times 100\ [\%]$$

The remaining capacity retention rate is an index of the magnitude of self-discharge in the full-charge storage test at 90° C. The larger this value, the smaller the self-discharge at high temperature, and more current can be used. The remaining capacity retention rate after storage for 4 hours is preferably 85% or more, and more preferably 90% or more, and was evaluated according to the following criteria.

A: 85% or more

B: 75% or more and less than 85%

C: Less than 75%

The results of the full-charge storage test at 90° C. for 4 hours are shown in Table 4.

TABLE 4

| | Positive electrode No. | Negatvive electrode No. | Electrolyte solution No. | Remaining capacity retention rate after storage at 90° C. for 4 hours |
|---|---|---|---|---|
| Example 32 | P1 | N1 | S37 | A |
| Comparative Example 9 | P1 | N1 | S36 | C |
| Comparative Example 10 | P1 | N1 | S20 | B |

(8) Fabrication of Portable Non-Aqueous Secondary Battery for Evaluation at 100° C.

(8-1) Fabrication of Positive Electrode (P1)

In the same manner as in section (2-1), a positive electrode (P1) was fabricated.

(8-2) Fabrication of Negative Electrode (N1)

In the same manner as in section (2-2), a negative electrode (N1) was fabricated.

(8-3) Assembling of Portable Non-Aqueous Secondary Battery

The positive electrode (P1) obtained as described above was punched in a disk shape having a diameter of 15.958 mm and the negative electrode (N1) obtained as described above was punched in a disk shape having a diameter of 16.156 mm were overlapped on both sides of a polyethylene microporous membrane separator (thickness of 21 μm, air permeability of 285 seconds/100 $cm^3$, porosity of 41%) to obtain a laminated body. The laminated body was inserted into a SUS disk-shaped battery casing. Then, each of 200 μL of non-aqueous electrolyte solutions (S20, S36, S38, S39) was injected into the battery casing and, after immersing the laminated body in the non-aqueous electrolyte solution, the positive electrode current collector was pressed with an aluminum plunger, followed by sealing of the battery casing. After maintaining at a temperature of 25° C. for 12 hours to fully adapt the non-aqueous electrolyte solution to the laminated body to obtain a portable non-aqueous secondary battery.

(9) Portable Non-Aqueous Secondary Battery for Evaluation at 100° C.

For the portable non-aqueous secondary batteries obtained as described in section (8-3), first, an initial charging/discharging treatment and the initial charging/discharge capacity measurement were carried out according to the following procedure (9-1). Then, each portable non-aqueous secondary battery was evaluated according to the following procedure (9-2). The charging/discharging was carried out using a charging/discharging apparatus ACD-M01A (trade name) manufactured by Aska Electronic Co., Ltd., and a program thermostatic bath IN804 (trade name) manufactured by Yamato Scientific Co., Ltd.

As used herein, "1 C" means the current value at which a fully charged battery is expected to be discharged in one hour with a constant current to terminate discharging.

Specifically, in the portable non-aqueous secondary battery, "1 C" means the current value at which a battery fully charged to 3.5 V is expected to be discharged to 2.0 V in one hour with a constant current to terminate discharging.

The portable non-aqueous secondary battery assembled according to the above procedure (8-3) is a 3 mAh class cell, and the battery voltage at which the battery is fully charged is defined as 3.5 V, and a current value corresponding to 1 C is set at 3.0 mA. Hereinafter, unless otherwise specified, the notation of current value and the voltage is omitted for convenience.

(9-1) Initial Charging/Discharging Treatment

After setting the ambient temperature of the portable non-aqueous secondary battery at 25° C. and charging with a constant current corresponding to 0.1 C to reach 3.5 V, the battery was charged with a constant voltage for 1.5 hours. Then, the battery was discharged to 2.0 V with a constant current corresponding to 0.1 C. The initial efficiency was calculated by dividing this initial discharging capacity by the initial charging capacity. The initial discharging capacity at this time was defined as the initial capacity.

(9-2) Full-Charge Storage Test at 100° C. for 4 Hours

For the portable non-aqueous secondary battery subjected to the initial charging/discharging treatment by the method described in section (9-1), the ambient temperature of the battery was set at 25° C., and after charging with a constant current corresponding to 1 C to reach the fully charged state, that is, 3.5 V, the battery was charged with a constant voltage for 1.5 hours. Then, this portable non-aqueous secondary battery was stored in a thermostatic bath at 100° C. for 4 hours. Thereafter, the ambient temperature was returned to 25° C., and the battery was discharged to 2.0 V with a current value corresponding to 0.1 C. The remaining discharging capacity at this time was defined as the remaining discharging capacity after 4 hours. As the measured value of the full-charge storage test at 100° C. for 4 hours, the remaining capacity retention rate was calculated based on the following formula.

$$\text{Remaining capacity retention rate after 4 hours} = (\text{remaining discharging capacity after 4 hours/initial capacity}) \times 100\ [\%]$$

The remaining capacity retention rate is an index of the magnitude of self-discharge in the full-charge storage test at 100° C. The larger this value, the smaller the self-discharge at high temperature, and more current can be used. The remaining capacity retention rate after storage for 4 hours is preferably 85% or more, and more preferably 90% or more, and was evaluated according to the following criteria.

A: 85% or more

B: 75% or more and less than 85%

C: Less than 75%

The results of the full-charge storage test at 100° C. for 4 hours are shown in Table 5.

TABLE 5

| | Positive electrode No. | Negatvive electrode No. | Electrolyte solution No. | Remaining capacity retention rate after storage at 100° C. for 4 hours |
|---|---|---|---|---|
| Example 33 | P1 | N1 | S38 | A |
| Example 34 | P1 | N1 | S39 | A |
| Comparative Example 11 | P1 | N1 | S36 | C |
| Comparative Example 12 | P1 | N1 | S20 | B |

(10) Fabrication of Coin-Type Non-Aqueous Secondary Battery (10-1) Fabrication of Positive Electrode (P5)

A composite oxide of lithium, nickel, manganese and cobalt ($LiNi_{0.8}Mn_{0.1}Co_{0.1}O_2$) as a positive electrode active material, a carbon black powder as a conductive aid, and polyvinylidene fluoride (PVDF) as a binder were mixed at a weight ratio of 94:3:3 to obtain a positive electrode mixture.

N-methyl-2-pyrrolidone as the solvent was added to the positive electrode mixture thus obtained, followed by further mixing to prepare a positive electrode mixture-containing slurry. While adjusting the basis weight of the positive electrode mixture-containing slurry to 16.6 mg/cm$^2$, the positive electrode mixture-containing slurry was coated on one side of an aluminum foil having a thickness of 20 μm, which serves as a positive electrode current collector, and then the solvent was removed by drying. Then, rolling was carried out by a roll press so that the density of the positive electrode active material layer became 2.91 g/cm$^3$ to obtain a positive electrode (P5) composed of the positive electrode active material layer and the positive electrode current collector.

(10-2) Fabrication of Negative Electrode (N2)

A graphite powder as the negative electrode active material, a carbon black powder as a conductive aid and a polyvinylidene fluoride (PVDF) as a binder were mixed at a weight ratio of 90:3:7 to obtain a negative electrode mixture.

Water as the solvent was added to the negative electrode mixture thus obtained, followed by further mixing to prepare a negative electrode mixture-containing slurry. While adjusting the basis weight of the negative electrode mixture-containing slurry to 10.3 mg/cm$^2$, the slurry was coated on one side of a copper foil having a thickness of 8 μm, which serves as a negative electrode current collector, and then the solvent was removed by drying. Then, rolling was carried out by a roll press so that the density of the negative electrode active material layer became 1.36 g/cm$^3$ to obtain a negative electrode (N2) composed of the negative electrode active material layer and the negative electrode current collector.

(10-3) Assembling of Coin-Type Non-Aqueous Secondary Battery

A polypropylene gasket was set in a CR2032 type battery casing (SUS304), and the positive electrode (P5) obtained as described above was punched in a disk shape having a diameter of 15.958 mm was set in the center of the gasket while the positive electrode active material layer faces upward. A glass fiber filter paper (GA-100, manufactured by Advantech Co., Ltd.) punched in a disk shape having a diameter of 16.156 mm was set therein, and 150 μL of non-aqueous electrolyte solution (S33, S34, S40) was injected. Then, the negative electrode (N2) obtained as described above was punched in a disk shape having a diameter of 16.156 mm was set therein while the negative electrode active material layer faces downward. Further, a spacer and a spring were set, and a battery cap was fitted and crimped with a caulking machine. The overflowing non-aqueous electrolyte solution was wiped off with a waste cloth. After maintaining at a temperature of 25° C. for 12 hours to fully adapt the non-aqueous electrolyte solution to the laminated body to obtain a coin-type non-aqueous secondary battery.

(11) Evaluation of Coin-Type Non-aqueous Secondary Battery

For the coin-type non-aqueous secondary battery obtained as described in section (10-3), first, an initial charging/discharging treatment and the initial charging/discharging capacity measurement were carried out according to the following procedure (11-1). The charging/discharging was carried out using a charging/discharging apparatus ACD-M01A (trade name) manufactured by Aska Electronic Co., Ltd., and a program thermostatic bath IN804 (trade name) manufactured by Yamato Scientific Co., Ltd.

As used herein, "1 C" means the current value at which a fully charged battery is expected to be discharged in one hour with a constant current to terminate discharging. In the following evaluation (11-1), "1 C" specifically means the current value at which a fully charged battery of 4.2 V is expected to be discharged to 3.0 V in one hour with a constant current to terminate discharging.

The portable non-aqueous secondary battery assembled according to the above procedure (10-3) is a 6 mAh class cell, and the battery voltage at which the battery is fully charged is defined as 4.2 V, and a current value corresponding to 1 C is set at 6.0 mA. Hereinafter, unless otherwise specified, the notation of current value and the voltage is omitted for convenience.

(11-1) Initial Charging/Discharging Treatment

The ambient temperature of the coin-type non-aqueous secondary battery was set at 25° C., and after charging the battery with a constant current of 0.15 mA corresponding to 0.025 C to reach 3.1 V, the battery was charged with a constant voltage of 3.1 V for 1.5 hours. After resting for 3 hours, the battery was charged with a constant current of 0.3 mA corresponding to 0.05 C to reach 4.2 V, and then charged with a constant voltage of 4.2 V for 1.5 hours. Thereafter, the battery was discharged to 3.0 V with a constant current of 0.9 mA corresponding to 0.15 C. The initial efficiency was calculated by dividing this initial discharging capacity by the initial charging capacity.

times (7.92 mAh) or more were judged to be overcharged, and no discharging treatment was carried out.

(12) Analysis of Metal Elution Amount after Initial Charging/Discharging

The coin-type non-aqueous secondary battery after subjecting to the initial charging/discharging treatment in (11-1) above was disassembled and the removed negative electrode was placed in a Teflon (registered trademark) decomposition container, and then 3 mL of 68% nitric acid and 5 mL of 98% nitric acid were added, followed by thermal decomposition (first stage reaction) at 220° C. for 45 minutes using microwaves (output: 1,000 W). Thereafter, 2 mL of 68% nitric acid was additionally added, and after thermal decomposition by microwave (output: 1,000 W) again at 230° C. for 40 minutes (second stage reaction), the total amount was adjusted to about 100 g with ultrapure water. This sample was subjected to ICP atomic emission spectroscopy (ICP atomic emission spectroscopic analyzer: SPS3520UV-DD (manufactured by SII Co., Ltd.)) to calculate the amount of eluted metal per one negative electrode.

Fe, Ni, Mo, Co and Mn contained in SUS304, which is a component of the battery outer casing, were selected as the constituent components to be measured.

Here, the interpretation of each test will be described.

The initial efficiency indicates the ratio of the initial discharge capacity to the initial charge capacity, and is commonly lower than the charge/discharge efficiency after the second time. This is because Li ions are used to form the negative electrode SEI during initial charging. This reduces the Li ions that can be discharged. Here, the initial efficiency is preferably 80% or more, and more preferably 84% or more.

The amount of metal eluted from the negative electrode serves as an index of the amount of metal eluted from the metal exterior body during initial charging/discharging. When this value is large, the battery performance tends to deteriorate due to overcharging and SEI damage to the negative electrode due to continuous reductive deposition of metal ions eluted from the battery exterior body on the negative electrode side.

The results of the initial charging/discharging test and subsequent metal elution amount analysis are shown in Table 6.

TABLE 6

| | Positive electrode | Negative electrode | Electrolyte solution | Positive electrode potential during full-charge (on Li/Li$^+$ basis) | Initial charging/discharging test: Charge capacity | Dis-charge capacity | Initial effi-ciency | Amount of metal eluted on negative electrode [mg/kg]: Fe | Ni | Mo | Co | Mn |
|---|---|---|---|---|---|---|---|---|---|---|---|---|
| | No. | No. | No. | [V] | [mAh] | [mAh] | [%] | | | | | |
| Example 35 | P5 | N2 | S40 | 4.3 | 7.20 | 6.16 | 85.5 | 190 | 84 | 7.3 | 4.8 | 6.4 |
| Example 36 | P5 | N2 | S33 | 4.3 | 7.12 | 5.86 | 82.3 | 9,000 | 1,700 | 230 | 31 | 170 |
| Comparative Example 13 | P5 | N2 | S34 | 4.3 | 8.35 | — | — | 36,000 | 6,300 | 1,100 | 96 | 690 |

For the coin-type non-aqueous secondary battery fabricated in exactly the same manner as in (10-3) above, except that the battery casing was changed to SUS304/aluminum clad so that corrosion of the battery exterior does not occur, the initial capacity was 7.20 mAh, so that the non-aqueous secondary battery exhibiting an initial charge capacity of 1.1

As shown in Table 6, in Examples 35 and 36, the initial charging/discharging efficiency showed a preferable numerical value or more. Meanwhile, in Comparative Example 13, since overcharging occurred, the subsequent discharging treatment was not carried out.

In Comparative Example 13, it is presumed that since the amount of metal elution on the negative electrode is larger than that in Examples 35 and 36, overcharging occurred by continuous reductive deposition of metal ions eluted from the battery exterior body on the negative electrode side.

When comparing Examples 35 and 36, Example 35 showed higher initial efficiency than that in Example 36. It is presumed that this is because the amount of $LiPF_6$ decreased and the molar ratio of cyclic anion-containing lithium salt/$LiPF_6$ increased, thus making it possible to suppress the deterioration of the battery performance due to the suppression of the metal elution from the battery exterior body or contribution to the negative electrode SEI.

In Example 35, the metal elution amount on the negative electrode is smaller than that in Example 36. It is presumed that this is because the amount of $LiPF_6$ decreased and the molar ratio of cyclic anion-containing lithium salt/$LiPF_6$ increased, thus making it possible to suppress the deterioration of the battery performance due to overcharging or damage to the negative electrode SEI.

INDUSTRIAL APPLICABILITY

Since the non-aqueous electrolyte solution within the scope of structural elements of the present invention can be used in batteries that require achievement of all of excellent output characteristics, low-temperature characteristics and high-temperature durability, in particular, non-aqueous secondary batteries using the non-aqueous electrolyte solution of the present invention are expected to be used, for example, as rechargeable batteries for mobile devices such as mobile phones, small audio devices, personal computers and integrated circuit (IC) tags; rechargeable batteries for vehicles such as hybrid vehicles, plug-in hybrid vehicles and electric vehicles; low-voltage power sources such as 12 V-class power sources, 24 V-class power sources and 48 V-class power sources; residential power storage systems, IoT devices and the like. The non-aqueous secondary batteries using the non-aqueous electrolyte solution of the present invention can also be applied to applications in cold regions, outdoor applications in summer and the like.

REFERENCE SIGNS LIST

100: Non-aqueous secondary battery
110: Battery exterior
120: Battery exterior space
130: Positive electrode lead body
140: Negative electrode lead body
150: Positive electrode
160: Negative electrode
170: Separator

The invention claimed is:

1. A non-aqueous electrolyte solution comprising a non-aqueous solvent and a lithium salt, wherein the non-aqueous solvent contains acetonitrile in an amount of 3% by volume or more and 97% by volume or less relative to the total amount of the non-aqueous solvent, and the lithium salt contains a cyclic anion-containing lithium salt represented by the following formula (1):

[Chemical Formula 1]

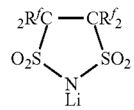

(1)

wherein $R^f$s may be the same or different and Rf each represents a fluorine atom or a perfluoro group having 4 or less carbon atoms, and the content of the cyclic anion-containing lithium salt represented by the formula (1) is 0.001 or more and 5 or less, in terms of a molar ratio, relative to the content of the acetonitrile.

2. The non-aqueous electrolyte solution according to claim 1, wherein the cyclic anion-containing lithium salt represented by the formula (1) contains one or more of cyclic anion-containing lithium salts represented by the following formulas (1-1) to (1-5)

[Chemical Formula 2]

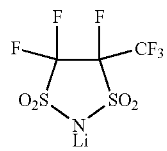

(1-1)

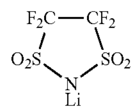

(1-2)

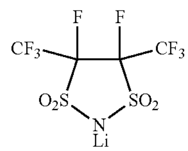

(1-3)

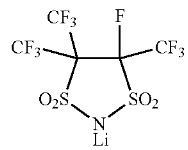

(1-4)

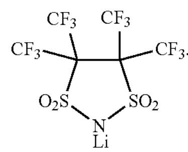

(1-5)

3. The non-aqueous electrolyte solution according to claim 1, wherein the content of the cyclic anion-containing lithium salt represented by the formula (1) is 0.08 or more and 0.79 or less, in terms of a molar ratio, relative to the content of the acetonitrile.

4. The non-aqueous electrolyte solution according to claim 1, wherein the content of the acetonitrile is 10% by volume or more and 66% by volume or less relative to the total amount of the non-aqueous solvent.

5. The non-aqueous electrolyte solution according to claim 1, wherein the lithium salt further contains $LiPF_6$, and $LiPF_6$ and the cyclic anion-containing lithium salt represented by the formula (1) are contained at a molar concentration satisfying the relationship: $LiPF_6 \leq$ cyclic anion-containing lithium salt.

6. The non-aqueous electrolyte solution according to claim 5, wherein the content of the cyclic anion-containing lithium salt represented by the formula (1) is more than 10, in terms of a molar ratio, relative to the content of $LiPF_6$.

7. The non-aqueous electrolyte solution according to claim 5, wherein the content of $LiPF_6$ is less than 0.01 mol as the amount per 1 L of the non-aqueous solvent.

8. The non-aqueous electrolyte solution according to claim 5, wherein the content of the cyclic anion-containing lithium salt represented by the formula (1) is 150 or less, in terms of a molar ratio, relative to the content of $LiPF_6$.

9. The non-aqueous electrolyte solution according to claim 1, wherein the lithium salt does not contain $LiPF_6$.

10. The non-aqueous electrolyte solution according to claim 1, wherein the non-aqueous electrolyte solution further comprises a nitrogen-containing cyclic compound represented by the following formula (2):

[Chemical Formula 3]

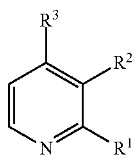

(2)

wherein substituents represented by $R^1$, $R^2$ and $R^3$ each independently represent a hydrogen atom, an alkyl group having 1 to 4 carbon atoms, a fluorine-substituted alkyl group having 1 to 4 carbon atoms, an alkoxy group having 1 to 4 carbon atoms, a fluorine-substituted alkoxy group having 1 to 4 carbon atoms, a phenyl group, a cyclohexyl group, a nitrile group, a nitro group, an amino group, an N,N'-dimethylamino group or an N,N'-diethylamino group, and two or more of these substituents are hydrogen atoms.

11. A non-aqueous secondary battery comprising a positive electrode containing a positive electrode active material, a negative electrode containing a negative electrode active material, and the non-aqueous electrolyte solution according to claim 1.

12. The non-aqueous secondary battery according to claim 11, wherein the positive electrode active material contains a lithium phosphorus metal oxide having an olivine crystal structure containing iron (Fe) atoms, regarding the non-aqueous electrolyte solution, the content of the cyclic anion-containing lithium salt represented by the formula (1) is 0.9 or more, in terms of a molar ratio, relative to the total content of the lithium salt, the lithium salt contains $LiPF_6$, the content of the cyclic anion-containing lithium salt represented by the formula (1) is 20 or more and 150 or less, in terms of a molar ratio, relative to the content of $LiPF_6$, the content of the cyclic anion-containing lithium salt represented by the formula (1) is 0.08 or more and 0.27 or less, in terms of a molar ratio, relative to the content of the acetonitrile, and the content of the acetonitrile is 30% by volume or more and 66% by volume or less relative to the total amount of the non-aqueous solvent.

13. The non-aqueous secondary battery according to claim 11, wherein the positive electrode active material contains a lithium-containing metal oxide represented by the following general formula ($a^t$):

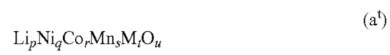

$$Li_pNi_qCo_rMn_sM_tO_u \quad (a^t)$$

wherein M is at least one metal selected from the group consisting of Al, Sn, In, Fe, V, Cu, Mg, Ti, Zn, Mo, Zr, Sr and Ba, and p, q, r, s, t and u are within the following ranges: $0<p<1.3$, $0<q<1.2$, $0<r<1.2$, $0\leq s<0.5$, $0\leq t<0.3$, $0.7\leq q+r+s+t\leq 1.2$ and $1.8<u<2.2$, and p is the value determined by the charging/discharging state of the battery, regarding the non-aqueous electrolyte solution, the lithium salt contains $LiPF_6$, the content of the cyclic anion-containing lithium salt represented by the formula (1) is 3 or more and 150 or less, in terms of a molar ratio, relative to the content of $LiPF_6$, the content of the cyclic anion-containing lithium salt represented by the formula (1) is 0.15 or more and 0.79 or less, in terms of a molar ratio, relative to the content of the acetonitrile, and the content of the acetonitrile is 10% by volume or more and 50% by volume or less relative to the total amount of the non-aqueous solvent.

14. The non-aqueous secondary battery according to claim 11, wherein the non-aqueous secondary battery comprises a battery exterior, and the battery exterior contains aluminum in at least a part of a liquid contact layer with the non-aqueous electrolyte solution on the positive electrode side.

15. The non-aqueous secondary battery according to claim 11, wherein at least a part of the contact portion with the non-aqueous electrolyte solution on the positive electrode side in the battery exterior body is made of iron or an iron alloy.

* * * * *